US008209628B1

(12) United States Patent  (10) Patent No.: US 8,209,628 B1
Davidson  (45) Date of Patent: Jun. 26, 2012

(54) PRESSURE-SENSITIVE MANIPULATION OF DISPLAYED OBJECTS

(75) Inventor: Philip L. Davidson, New York, NY (US)

(73) Assignee: Perceptive Pixel, Inc., New York, NY (US)

( * ) Notice: Subject to any disclaimer, the term of this patent is extended or adjusted under 35 U.S.C. 154(b) by 460 days.

(21) Appl. No.: 12/422,983

(22) Filed: Apr. 13, 2009

Related U.S. Application Data

(60) Provisional application No. 61/044,109, filed on Apr. 11, 2008.

(51) Int. Cl.
*G06F 3/048* (2006.01)

(52) U.S. Cl. ............... 715/790; 715/797; 715/800

(58) Field of Classification Search ............ 715/790
See application file for complete search history.

(56) References Cited

U.S. PATENT DOCUMENTS

| | | | |
|---|---|---|---|
| 5,113,251 A | 5/1992 | Ichiyanagi et al. | |
| 5,386,483 A | 1/1995 | Shibazaki | |
| 5,483,261 A | 1/1996 | Yasutake | |
| 5,844,547 A | 12/1998 | Minakuchi et al. | |
| 5,847,705 A | 12/1998 | Pope | |
| 5,864,342 A | 1/1999 | Kajiya et al. | |
| 6,147,684 A * | 11/2000 | Nielsen et al. ............... | 715/803 |
| 6,252,608 B1 | 6/2001 | Snyder et al. | |
| 6,275,615 B1 | 8/2001 | Ida et al. | |
| 6,292,194 B1 | 9/2001 | Powell, III | |
| 6,326,964 B1 | 12/2001 | Snyder et al. | |
| 6,958,749 B1 | 10/2005 | Matsushita et al. | |
| 7,197,718 B1 | 3/2007 | Westerman et al. | |
| 7,487,458 B2 | 2/2009 | Jalon et al. | |
| 7,519,223 B2 | 4/2009 | Dehlin et al. | |
| 7,610,563 B2 * | 10/2009 | Nelson et al. ............ | 715/839 |

(Continued)

FOREIGN PATENT DOCUMENTS

JP    2005-214730    8/2005

OTHER PUBLICATIONS

Agarawala, A. and Balakrishnan, R. 2006, "Keepin' it real: pushing the desktop metaphor with physics, piles and the pen," Proceedings of the SIGCHI Conference on Human Factors in Computing Systems, (Montréal, Québec, Canada, Apr. 22-27, 2006) CHI '06. ACM, New York, NY, 1283-1292.

(Continued)

*Primary Examiner* — Boris Pesin
*Assistant Examiner* — Matthew Ell
(74) *Attorney, Agent, or Firm* — Fish & Richardson P.C.

(57) ABSTRACT

First and second objects are displayed on a pressure-sensitive touch-screen display device. Contact with the display device by an input mechanism is detected in a region corresponding to empty space. The movement of the input mechanism is tracked while it remains in contact with the display device. Movement of the input mechanism is detected as it moves to a point along the boundary of the second displayed object. In response, the pressure applied to the display device by the input mechanism is sensed. It is determined that the sensed pressure exceeds a threshold pressure value. Movement of the input mechanism is then detected as it moves to a new position on the display device. As a consequence of detecting the movement of the input mechanism to the new position and determining that the sensed pressure exceeds the threshold pressure value, a fold operation is applied to the second displayed object.

20 Claims, 30 Drawing Sheets

U.S. PATENT DOCUMENTS

| | | | |
|---|---|---|---|
| 7,653,883 | B2 | 1/2010 | Hotelling et al. |
| 7,812,826 | B2 | 10/2010 | Ording et al. |
| 7,925,996 | B2 | 4/2011 | Hofmeister et al. |
| 7,956,847 | B2 | 6/2011 | Christie |
| 2002/0070944 | A1 | 6/2002 | Deering |
| 2003/0206179 | A1 | 11/2003 | Deering |
| 2005/0097161 | A1 | 5/2005 | Chiou et al. |
| 2005/0144189 | A1 | 6/2005 | Edwards et al. |
| 2005/0175251 | A1 | 8/2005 | Taketa et al. |
| 2005/0270311 | A1 | 12/2005 | Rasmussen et al. |
| 2006/0001650 | A1 | 1/2006 | Robbins et al. |
| 2006/0026536 | A1 | 2/2006 | Hotelling et al. |
| 2006/0181519 | A1 | 8/2006 | Vernier et al. |
| 2006/0274046 | A1 | 12/2006 | Hillis et al. |
| 2007/0096945 | A1 | 5/2007 | Rasmussen et al. |
| 2008/0015440 | A1 | 1/2008 | Shandas et al. |
| 2008/0301577 | A1* | 12/2008 | Onda et al. ............ 715/794 |
| 2009/0027418 | A1 | 1/2009 | Maru et al. |
| 2009/0031243 | A1* | 1/2009 | Kano et al. ............ 715/781 |
| 2009/0112452 | A1 | 4/2009 | Buck et al. |
| 2009/0216808 | A1 | 8/2009 | Wallace |
| 2009/0222724 | A1* | 9/2009 | Stewart et al. ......... 715/277 |
| 2011/0173566 | A1 | 7/2011 | Ubillos |

OTHER PUBLICATIONS

Beaudouin-Lafon, M. 2001, "Novel interaction techniques for overlapping windows," Proceedings of the 14th Annual ACM Symposium on User interface Software and Technology (Orlando, Florida, Nov. 11-14, 2001). UIST '01. ACM, New York, NY, 153-154.

Bier, E. A., Stone, M. C., Pier, K., Buxton, W., and DeRose, T. D. 1993, "Toolglass and magic lenses: the see-through interface," Proceedings of the 20th Annual Conference on Computer Graphics and Interactive Techniques SIGGRAPH '93. ACM, New York, NY, 73-80.

Buxton, W., Hill, R., and Rowley, P. 1985, "Issues and techniques in touch-sensitive tablet input," SIGGRAPH Comput. Graph. 19, 3 (Jul. 1985), 215-224.

Dragicevic, P. 2004, "Combining crossing-based and paper-based interaction paradigms for dragging and dropping between overlapping windows," Proceedings of the 17th Annual ACM Symposium on User interface Software and Technology (Santa Fe, NM, USA, Oct. 24-27, 2004). UIST '04. ACM, New York, NY, 193-196.

Gingold, Y. I., Davidson, P. L., Han, J. Y., and Zorin, D. 2006, "A direct texture placement and editing interface," Proceedings of the 19th Annual ACM Symposium on User interface Software and Technology (Montreux, Switzerland, Oct. 15-18, 2006). UIST '06. ACM, New York, NY, 23-32.

Han, J. Y. 2005, "Low-cost multi-touch sensing through frustrated total internal reflection," Proceedings of the 18th Annual ACM Symposium on User interface Software and Technology (Seattle, WA, USA, Oct. 23-26, 2005). UIST '05. ACM, New York, NY, 115-118.

Mander, R., Salomon, G., and Wong, Y. Y. 1992, "A 'pile' metaphor for supporting casual organization of information," Proceedings of the SIGCHI Conference on Human Factors in Computing Systems (Monterey, California, United States, May 3-7, 1992). P. Bauersfeld, J. Bennett, and G. Lynch, Eds. CHI '92. ACM, New York, NY, 627-634.

Ramos, G., Boulos, M., and Balakrishnan, R. 2004, "Pressure widgets," Proceedings of the SIGCHI Conference on Human Factors in Computing Systems (Vienna, Austria, Apr. 24-29, 2004). CHI '04. ACM, New York, NY, 487-494.

Ramos, G., Robertson, G., Czerwinski, M., Tan, D., Baudisch, P., Hinckley, K., and Agrawala, M. 2006, "Tumble! Splat! helping users access and manipulate occluded content in 2D drawings," Proceedings of the Working Conference on Advanced Visual interfaces (Venezia, Italy, May 23-26, 2006), AVI '06. ACM, New York, NY, 428-435.

Terrenghi, L., Kirk, D., Sellen, A., and Izadi, S. 2007, "Affordances for manipulation of physical versus digital media on interactive surfaces," Proceedings of the SIGCHI Conference on Human Factors in Computing Systems (San Jose, California, USA, Apr. 28-May 3, 2007). CHI '07. ACM, New York, NY, 1157-1166.

Wiley, K. And Williams, L. R. 2006, "Representation of interwoven surfaces in 2 1/2 D drawing," Proceedings of the SIGCHI Conference on Human Factors in Computing Systems CHI '06. ACM, New York, NY, 65-74.

Non-final Office Action issued in U.S. Appl. No. 12/420,480, mailed Sep. 28, 2011, 9 pages.

Non-final Office Action issued in U.S. Appl. No. 12/420,493, mailed Oct. 7, 2011, 11 pages.

Non-final Office Action issued in U.S. Appl. No. 12/420,501, mailed Oct. 7, 2011, 24 pages.

Adobe® Illustrator® CS3, User Guide, Copyright 2007 Adobe Systems Incorporated, 495 pages.

Using FreeHand MX, Macromedia FreeHand MX, Copyright 1988-2003 Macromedia, Inc., 412 pages.

A Guide to QuarkXPress™: Using QuarkXPress™, Copyright 2002 by Quark Technology Partnership, 674 pages.

MacDraw Pro, Computer Desktop Encyclopedia copyright 1981-2011 by the Computer Language Company Inc., downloaded from http://encyclopedia2.thefreedictionary.com/p/MacDraw%20Pro, 1 page.

ClarisDraw: Description, Article: TA43075, Last modified Oct. 4, 2008, 3 pages.

* cited by examiner

PRESSURE-SENSITIVE MANIPULATION OF DISPLAYED OBJECTS

CROSS-REFERENCE TO RELATED APPLICATION

This application claims priority to U.S. Provisional Patent Application Ser. No. 61/044,109 entitled "Extending 2D Object Arrangement with Pressure-Sensitive Layering Cues" filed Apr. 11, 2008, which is incorporated herein by reference in its entirety.

TECHNICAL FIELD

This disclosure relates to pressure-sensitive manipulation of objects displayed on a display device, especially a display device configured to support multi-touch or multi-point controls.

BACKGROUND

Rotate-Scale-Translate (RST) transform controls provide four degrees of freedom for performing a transformation on a two-dimensional displayed object.

SUMMARY

In one general aspect, a scene is caused to be displayed on a pressure-sensitive touch-screen display device. The scene includes empty space and first and second displayed objects. The second displayed object is layered above the first displayed object and occludes at least a part of the first displayed object. Contact with the pressure-sensitive touch-screen display device is detected by an input mechanism in a region of the pressure-sensitive touch-screen display device that corresponds to empty space. Thereafter, movement of the input mechanism is tracked while the input mechanism remains in contact with the pressure-sensitive touch-screen display device. Based on tracking movement of the input mechanism while the input mechanism remains in contact with the pressure-sensitive touch-screen display device, it is detected that the input mechanism has moved from contacting the pressure-sensitive touch-screen display device in the region that corresponds to empty space to contacting the pressure-sensitive touch-screen display device at a position that corresponds to a point along the boundary of the second displayed object. In response, the pressure applied to the pressure-sensitive touch-screen display device by the input mechanism is sensed. The sensed pressure applied to the pressure-sensitive display device by the input mechanism is then compared to a threshold pressure value. Based on a result of comparing the sensed pressure applied to the pressure-sensitive display device by the input mechanism to the threshold pressure value, it is determined that the sensed pressure applied to the pressure-sensitive display device by the input mechanism exceeds the threshold pressure value. Based on tracking movement of the input mechanism while the input mechanism remains in contact with the pressure-sensitive touch-screen display device, it is detected that the input mechanism has moved to a new position on the pressure-sensitive touch-screen display device. Thereafter, as a consequence of detecting that the input mechanism has moved to the new position on the pressure-sensitive touch-screen display device and determining that the sensed pressure applied to the pressure-sensitive display device by the input mechanism exceeds the threshold pressure value, a fold operation to perform on the second displayed object to fold a part of the second displayed object including the point along the boundary of the second displayed object back on top of itself is calculated as a function of the movement of the input mechanism such that the point along the boundary of the second displayed object is moved to a position substantially at the new location of the input mechanism. The calculated fold operation then is applied to the second displayed object. In addition, when the fold operation is applied to the second displayed object, it is determined that a portion of the folded part of the second displayed object that previously occluded a portion of the occluded part of the first displayed object does not occlude the portion of the occluded part of the first displayed object. The display of the scene is caused to be updated to reflect the folding operation applied to the second displayed object. In particular, the second displayed object is caused to he displayed in accordance with the applied fold operation such that the point along the boundary of the second displayed object is located substantially at the new location of the input mechanism and the previously occluded portion of the occluded part of the first displayed object is revealed.

Implementations may include one or more of the following features. For example, it may detected that the input mechanism no longer is contacting the pressure-sensitive display device. In response, the fold operation applied to the second displayed object may be undone, and the display of the scene may he caused to be updated to reflect that the fold operation applied to the second displayed object has been undone.

Alternatively, in other implementations, the fold operation applied to the second displayed object may be preserved after detecting that the input mechanism no longer is contacting the pressure-sensitive display device. In such implementations, after detecting that the input mechanism no longer is contacting the pressure-sensitive display device, it may be detected that the input mechanism is contacting the pressure-sensitive display device in a region of the pressure-sensitive touch-screen display device that corresponds to the folded part of the second displayed object. Movement of the input mechanism then may be tracked while the input mechanism remains in contact with the pressure-sensitive touch-screen display device. Based on tracking movement of the input mechanism while the input mechanism remains in contact with the pressure-sensitive touch-screen display device, it may be detected that the input mechanism has moved from contacting the pressure-sensitive touch-screen display device in the region that corresponds to the folded part of the second displayed object to contacting the pressure-sensitive touch-screen display device in a region that corresponds to empty space. In response, the fold operation applied to the second displayed object may be undone and the display of the scene may be caused to be updated to reflect that the fold operation applied to the second displayed object has been undone.

Contact with the pressure-sensitive touch-screen display device by another input mechanism may be detected in a region of the pressure-sensitive touch-screen display device that corresponds to empty space. Movement of the other input mechanism may he tracked while the other input mechanism remains in contact with the pressure-sensitive touch-screen display device. Based on tracking movement of the other input mechanism while the other input mechanism remains in contact with the pressure-sensitive touch-screen display device, it may be detected that the other input mechanism has moved from contacting the pressure-sensitive touch-screen display device in the region that corresponds to empty space to contacting the pressure-sensitive touch-screen display device at a position that corresponds to a point along the boundary of the first displayed object. In response, the pressure applied to the pressure-sensitive touch-screen display device by the other input mechanism may be sensed. The sensed pressure applied to the pressure-sensitive display device by the other input mechanism may be compared to another threshold pressure value that is greater than the threshold pressure value. Based on a result of comparing the sensed pressure applied to the pressure-sensitive display device by the other input mechanism to the other threshold pressure value, it may be determined that the sensed pressure applied to the pressure-sensitive display device by the other input mechanism exceeds the other threshold pressure value. Based on tracking movement of the other input mechanism while the other input mechanism remains in contact with the pressure-sensitive touch-screen display device, it may be detected that the other input mechanism has moved to a new position on the pressure-sensitive touch-screen display device. As a consequence of detecting that the other input mechanism has moved to the new position on the pressure-sensitive touch-screen display device and determining that the sensed pressure applied to the pressure-sensitive display device by the other input mechanism exceeds the other threshold pressure value, a fold operation to perform on the first displayed object to fold a part of the first displayed object including the point along the boundary of the first displayed object back on top of itself may be calculated as a function of the movement of the other input mechanism to the new position such that the point along the boundary of the first displayed object is moved to a position substantially at the new location of the other input mechanism. In addition, the display of the scene may be caused to he updated to reflect the folding operation applied to the first displayed object. For example, the first displayed object may be caused to be displayed in accordance with the applied fold operation such that the point along the boundary of the first displayed object is located substantially at the new location of the other input mechanism.

A third object may be caused to be displayed on the pressure-sensitive touch-screen display device. After applying the calculated fold operation to the second displayed object and causing the display of the scene to he updated to reflect the folding operation applied to the second displayed object, contact with the pressure-sensitive touch-screen display device by another input mechanism may be detected in a region of the pressure-sensitive touch-screen display device that corresponds to the third displayed object. Movement of the other input mechanism while the input mechanism remains in contact with the pressure-sensitive touch-screen display device may be tracked. Based on tracking movement of the other input mechanism while the other input mechanism remains in contact with the pressure-sensitive touch-screen display device, it may be detected that the other input mechanism has moved from contacting the pressure-sensitive touch-screen display device in the region that corresponds to third displayed object to contacting the pressure-sensitive touch-screen display device at a different position. In response to detecting that the other input mechanism has moved from contacting the pressure-sensitive touch-screen display device in the region that corresponds to the third displayed object to contacting the pressure-sensitive touch-screen display device at the different position, the third displayed object may he transformed such that a portion of the third displayed object occupies the region that previously was occupied by the folded part of the second displayed object. Thereafter, the fold operation applied to the second displayed object may be undone, and it may be detected that the portion of the third displayed object occupies the region that previously was occupied by the folded part of the second displayed object. As a consequence, data may be stored indicating that the second displayed object overlaps the third displayed object and the display of the scene may to be caused to be updated to reflect that the folding operation applied to the second displayed object has been undone such that the second displayed object is overlapping the third displayed object. Alternatively, an intersection between the folded part of the second displayed object and the third displayed object may be detected as a consequence of undoing the fold operation applied to the second displayed object. In response to detecting the intersection between the folded part of the second displayed object and the third displayed object, an overlap list that is associated with the third displayed object may he accessed, and it may be determined, based on the overlap list, that the third displayed object overlaps the second displayed object. Thereafter, data indicating that the third displayed object overlaps the second displayed object may be stored, and the display of the scene may be caused to be updated to reflect that the fold operation applied to the second displayed object has been undone and the third displayed object overlaps the second displayed object.

After applying the calculated fold operation to the second displayed object and causing the display of the scene to be updated to reflect the folding operation applied to the second displayed object, contact with the pressure-sensitive touch-screen display device by another input mechanism may be detected in a region of the pressure-sensitive touch-screen display device that corresponds to the third displayed object. Movement of the other input mechanism may he tracked while the input mechanism remains in contact with the pressure-sensitive touch-screen display device. Based on tracking movement of the other input mechanism while the other input mechanism remains in contact with the pressure-sensitive touch-screen display device, it may be detected that the other input mechanism has moved from contacting the pressure-sensitive touch-screen display device in the region that corresponds to the third displayed object to contacting the pressure-sensitive touch-screen display device at a different position. An intersection may be detected between the first displayed object and the third displayed object as a consequence of translating the third displayed object. In response, data may be stored indicating that the third displayed object overlaps the first displayed object, and the display of the scene may be caused to he updated to reflect that the third displayed object is overlapping the first displayed object.

In some implementations, an overlap list may be maintained for the third displayed object for recording other displayed objects that are overlapped by the third displayed object. After applying the calculated fold operation to the second displayed object and causing the display of the scene to he updated to reflect the folding operation applied to the second displayed object, contact with the pressure-sensitive touch-screen display device by another input mechanism may be detected in a region of the pressure-sensitive touch-screen display device that corresponds to the third displayed object. Movement of the other input mechanism may be tracked while the input mechanism remains in contact with the pressure-sensitive touch-screen display device. Based on tracking movement of the other input mechanism while the other input mechanism remains in contact with the pressure-sensitive touch-screen display device, it may be detected that the other input mechanism has moved from contacting the pressure-sensitive touch-screen display device in the region that corresponds to the third displayed object to contacting the pressure-sensitive touch-screen display device at a different position. In response, the third displayed object may be transformed such that a portion of the third displayed object occupies a region that previously was occupied by the folded part of the second displayed object. The fold operation applied to the second displayed object may be undone, and, as a consequence of undoing the fold operation applied to the second displayed object, an intersection between the folded part of the second displayed object and the third displayed object may be detected. In response to detecting the intersection between the folded part of the second displayed object and the third displayed object, the overlap list for the third displayed object may be accessed and it may he determined that the third displayed object overlaps the second displayed object. Thereafter, data indicating that the third displayed object overlaps the second displayed object may he stored, and the display of the scene may be caused to be updated to reflect that the fold operation applied to the second displayed object has been undone and the third displayed object overlaps the second displayed object.

In some implementations, it may be detected that the input mechanism has moved to a new position on the pressure-sensitive touch-screen display device that is across the original boundary of the second displayed object.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program stored on a tangible, computer-readable storage medium. The tangible, computer-readable storage medium may include, for example, instructions that, when executed, cause a computer to perform acts specified by the instructions.

The details of one or more implementations are set forth in the accompanying drawings and the description below. Other features will be apparent from the description and the drawings, and from the claims.

DETAILED DESCRIPTION

Figure 1A:
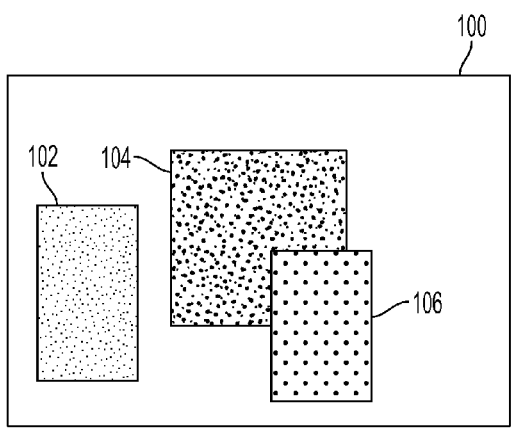
FIG. 1 is a series of diagrams of a multi-touch display device that illustrate use of a pressure-sensitive tilt control provided by the multi-touch display device to pet form layering operations on objects displayed by the multi-touch display device.

A multi-touch display device is configured to detect contact with the surface of the multi-touch display device by one or more fingers (or other input mechanisms, hereinafter) and to interpret such contact as input to a computing system. Among other operations, the multi-touch display device is configured to enable users to directly manipulate displayed objects by contacting the multi-touch display device with one or more fingers in locations that correspond to a target object. For example, when the multi-touch display device detects that a displayed object has been contacted by two or more fingers, the multi-touch display device tracks movements of the two or more fingers while they remain in contact with the multi-touch display device and rotates, scales, and/or translates the displayed object in two dimensions as a function of the tracked movements of the fingers such that the points on the displayed object originally contacted by the fingers remain substantially underneath the contacting fingers as they move about the multi-touch display device.

Beyond merely detecting points of contact, the multi-touch display device also is configured to detect the pressure applied by a finger (or other input mechanism) at each point of contact on the surface of the multi-touch display device. Detecting the pressure applied by a finger (or other input mechanism) at each point of contact on the multi-touch display device enables the multi-touch display device to provide a pressure-sensitive tilt control that enables users to visibly tilt displayed objects relative to the plane on which the displayed objects are displayed by contacting displayed objects with varying amounts of pressure. For example, in response to detecting that a user is applying a relatively heavy pressure to one corner of a displayed object, the multi-touch display device may visibly tilt the displayed object such that the depressed corner of the displayed object is pushed below the plane of the display while the opposite corner of the displayed object is raised above the plane of the display.

The multi-touch display device implements a two-and-one-half (2½) dimensional rendering style that enables a layered, two-dimensional composition of displayed objects. In addition, the multi-touch display device provides a pressure-sensitive layering control that enables users to manipulate the layering of displayed objects by, for example, arranging displayed objects above or below one another in an under/overlapping fashion. In order to facilitate layering operations, the multi-touch display device incorporates the pressure-sensitive tilt control as a component of this pressure-sensitive layering control. For example, as the multi-touch display device performs changes to the shape or location of the displayed objects (perhaps under user control), the multi-touch display device monitors the boundaries of the displayed objects to identify new intersections between displayed objects, which potentially trigger a new pair-wise sorting operation. If the multi-touch display device detects a new intersection between two displayed objects as a consequence of changes to the shape or location of one or both of the displayed objects, the multi-touch display device determines whether either of the two objects currently is tilted relative to the plane of the display as a result of activation of the pressure-sensitive tilt control. If so, the multi-touch display device determines the relative depths of the two displayed objects in the intersecting region and then layers the two objects as a function of the relative depths of the two displayed objects in the intersecting region.

In this manner, the multi-touch display device enables a user to arrange a first object beneath a second object by, for example, tilting the first object off of the plane of the display device such that a side of the first object is depressed below the plan of the display by contacting the first object with appropriate in appropriate locations. Similarly, the multi-touch display device enables a user to arrange the first object above the second object by, for example, tilting the first object off of the plane of the display device such that a side of the first object is raised off of the plane of the display by contacting the first object with appropriate amounts of pressure in appropriate locations.

FIG. 1 is a series of diagrams of a multi-touch display device 100 that illustrate use of a pressure-sensitive tilt control provided by the multi-touch display device 100 to perform layering operations on objects 102, 104, and 106 displayed by the multi-touch display device 100.

As illustrated in FIG. 1(a), the multi-touch display device 100 is displaying objects 102, 104, and 106 such that displayed object 102 is isolated from displayed objects 104 and 106 and such that displayed object 106 is overlapping displayed object 104.

Figure 1B:
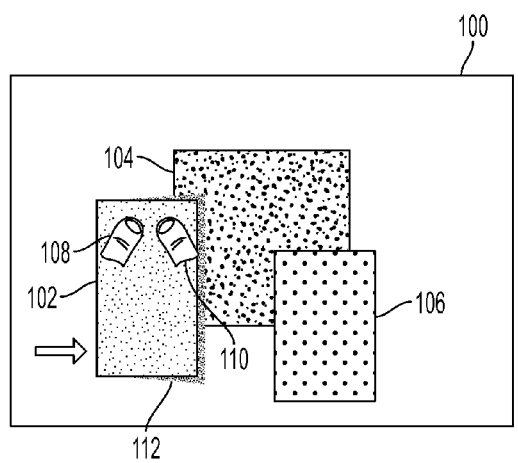

In FIG. 1(b), a user has contacted displayed object 102 with two fingers 108 and 110 and moved fingers 108 and 110 in a rightward path across the multi-touch display device 100. In response to detecting the rightward movement of fingers 108 and 110, the multi-touch display device 100 translated displayed object 102 in a rightward path accordingly.

In addition to detecting the contact made by fingers 108 and 110 with displayed object 102, the multi-touch display device 100 also detects the pressure applied by fingers 108 and 110 at their respective contact points and controls the tilt of displayed object 102 relative to the plane of the display as a function of the pressure applied by fingers 108 and 110. As illustrated in FIG. 1(b), the multi-touch display device has tilted displayed object 102 as a function of the pressure applied by fingers 108 and 110 such that the right side of displayed object 102 is raised above the plane of the display. In some implementations, the multi-touch display device 100 may provide various different visual cues to reflect that an object has been tilted off of the plane of the display. For example, as illustrated in FIG. 1(b), the multi-touch display device 100 has provided a drop shadow 112 around the right-side boundary of object 102 to reflect that displayed object 102 has been tilted off of the plane of the display such that the right side of displayed object 102 is raised above the plane of the display.

As the multi-touch display device 100 translates displayed object 102 to the right as a function of the tracked movement of fingers 108 and 110, the multi-touch display device 100 detects that the right-side edge of displayed object 102 is approaching the left-side edge of displayed object 104. As a result, the multi-touch display device 100 detects a potential new intersection between displayed objects 102 and 104 and compares the relative depths of displayed objects 102 and 104 in the intersecting region in order to determine how to layer displayed objects 102 and 104. Due to the fact that the right-side edge of displayed object 102 is raised above the plane of the display, the multi-touch display device 100 determines that the depth of the left-side edge of displayed object 104 is below the depth of the right-side edge of 102(a) object 102. Consequently, the multi-touch display device 100 determines that displayed object 102 should be layered above displayed object 104 such that displayed object 102 overlaps displayed object 104. Thus, as the multi-touch display device 100 continues to translate displayed object 102 to the right, the multi-touch display device 100 displays displayed object 102 above displayed object 104 such that it appears that the user is dragging displayed object 102 over displayed object 104.

Figure 1C:
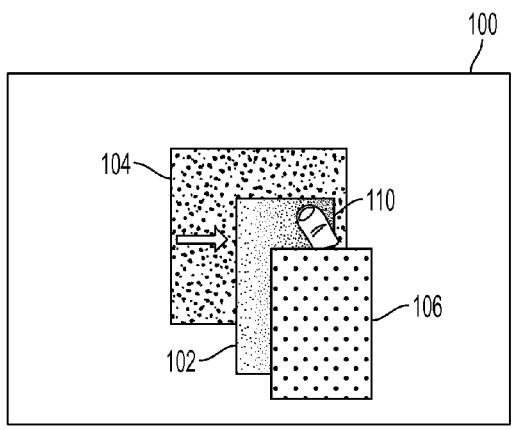

Referring to FIG. 1(c), finger 108 has disengaged displayed object 102 such that displayed object 102 is only being contacted by finger 110. While finger 110 remains in contact with displayed object 102, the multi-touch display device 100 continues to track the movement of finger 110 and the pressure applied by finger 110 to the multi-touch display device 100. As finger 110 continues to move to the right, the multi-touch display device 100 detects the rightward movement of finger 110 and translates displayed object 102 to the right in response. When the multi-touch display device 100 detects that the right-side edge of displayed object 102 is approaching the left-side edge of displayed object 106, the multi-touch display device 100 compares the relative depths of displayed objects 102 and 106 in the intersecting region in order to determine how to layer displayed objects 102 and 106. As a result of the pressure applied by finger 110, the multi-touch display device 100 has tilted object 102 off of the plane of the display such that the right side of object 102 is below the plane of the display. In order to reflect the applied tilt visually, the multi-touch display device 100 has applied shading to displayed object 102 to suggest that the right side of displayed object 102 has been pressed below the plane of the display. Due to the fact that the right side of displayed object 102 has been tilted below the plane of the display, a comparison of the depth of the right-side edge of displayed object 102 to the left-side edge of displayed object 106 by the multi-touch display device 100 reveals that the depth of the right-side edge of displayed object 102 is below the depth of the left-side edge of displayed object 106. Consequently, the multi-touch display device 100 determines that displayed object 102 should be layered below displayed object 106 such that displayed object 106 overlaps displayed object 102. Thus, as the multi-touch display device 100 continues to translate displayed object 102 to the right, the multi-touch display device 100 displays displayed object 102 beneath displayed object 106 such that it appears that the user is dragging displayed object 102 beneath displayed object 106.

Figure 1D:
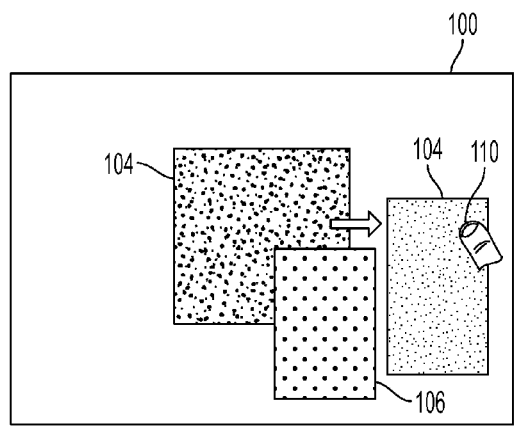

Referring to FIG. 1(d), finger 110 has moved further to the right across the multi-touch display device 100, and the multi-touch display device 100 has translated displayed object 102 to the right accordingly such that displayed object 102 is again isolated from displayed objects 104 and 106. As illustrated in the sequence of diagrams presented in FIG. 1, the multi-touch display device 100 tracked the movement of and the pressure applied by fingers 108 and 110 as fingers 108 and 110 controlled displayed object 102, thereby enabling the user to drag displayed object 102 over displayed object 104 and under displayed object 106 by moving fingers 108 and 110 across the screen in a rightward trajectory while varying the pressure applied to the contacts points on displayed object 102.

In sum, then, as illustrated in FIG. 1, the pressure-sensitive tilt control provided by the multi-touch display device 100 is used as a placement suggestion for layering operations. That is to say, as a user begins to create a new intersection between two displayed objects, the user can utilize the pressure-sensitive tilt control to apply a tilt to one or both of the displayed objects to instruct the multi-touch display device 100 how to layer the two objects. After the multi-touch display device 100 has interpreted the user's intention and layered the two displayed objects appropriately, the multi-touch display device 100 preserves the layering of the two objects without requiring the user to continue to engage the pressure-sensitive tilt control through further manipulation of the displayed object. Furthermore, the pressure-sensitive tilt control, also functions as a direct manipulation metaphor that enables a user to control the tilt of an object relative to the plane of the display without requiring a separate graphical user interface control component that, while invoked, likely would obscure the visual perception of or the ability to manipulate a portion of the multi-touch display device 100 that it covers or displaces. That is to say, the multi-touch display device 100 enables a user to control the tilt of a displayed object by direct interaction with the displayed object without requiring a secondary control widget or other interface for toggling into and out of a "tilt mode." Instead, the pressure-sensitive tilt control may he understood as an inherent property of a displayed object, and the absence of such a mode switch may allow a user to move quickly between object manipulation and other control tasks, especially when operations are shared between two hands.

Like the pressure-sensitive tilt control, the pressure-sensitive layering control provided by the multi-touch display device 100 also functions as a direct manipulation metaphor that enables a user to manipulate the layering of displayed objects without requiring a separate graphical user interface control component or other interface. To facilitate layering operations, secondary visual properties of displayed objects may he modified to provide a user with visual cues regarding the relative depths of objects rather than providing a separate graphical user interface control component or other interface for controlling layering operations.

Pressure-Sensitive Multi-point Display Device

Various different multi-touch display device configurations are capable of sensing pressure applied at contact points. For example, various pressure-sensitive multi-touch display device configurations are described in Han, J.Y. 2005, "Low-cost Multi-touch Sensing Through Frustrated. Total Internal Reflection," Proceedings of the 18th Annual ACM Symposium on User interface Software and Technology (Seattle, Wash., USA, Oct. 23-26, 2005), UIST '05. ACM, New York, N.Y., 115-118, and commonly-owned co-pending U.S. patent application Ser. Nos. 11/833,908 (published as U.S. Patent Application Publication No. 2008/0179507) and 12/185,782 (published as U.S. Patent Application Publication No. 2008/0284925), each of which is incorporated herein by reference in its entirety.

Figure 2A:
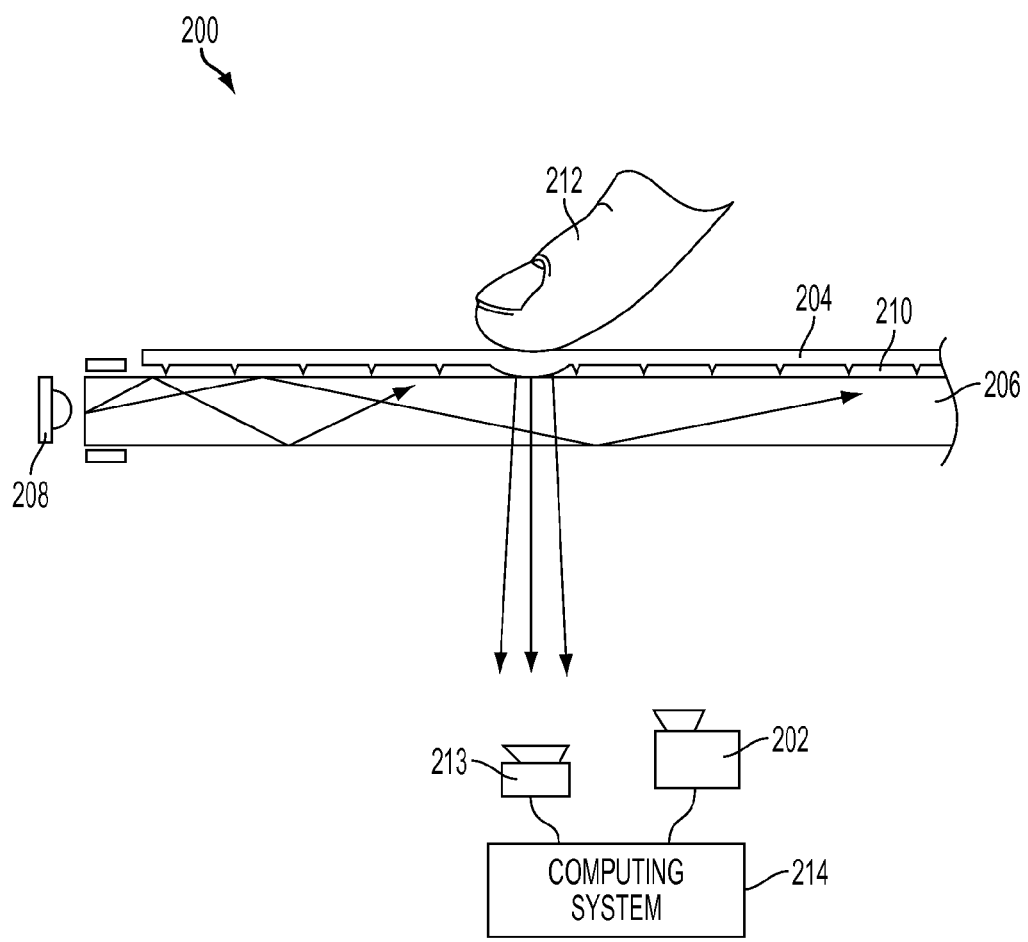
FIG. 2A is a schematic diagram of an example of a pressure-sensitive multi-touch display device.

FIG. 2A is a schematic diagram of an example of a pressure-sensitive multi-touch display device 200. Of course, other pressure-sensitive multi-touch display devices also may he used. Referring to FIG. 2A, the pressure-sensitive multi-touch display device 200 includes a rear-projector 202 for projecting images onto a display surface 204 of the pressure-sensitive multi-touch display device 200. As illustrated in FIG. 2A, the display surface 204 is disposed on an exterior surface of the multi-touch display device 200, but configurations where the display surface 204 is not disposed on the exterior surface of the multi-touch display device 200 also are possible.

The pressure-sensitive multi-touch display device 200 also includes a light-guide 206 (e.g., a sheet of acrylic) and a light source 208 (e.g., an array of light-emitting diodes (LEDs)) for injecting light (e.g., infrared (IR) radiation) into the light guide 206. Light emitted from the light source 208 undergoes total internal reflection (TIR) within the light guide 206, thus causing the emitted light to remain trapped within the light guide 206. When an appropriate object comes into contact with the light guide 206, TIR is frustrated causing some of the light within the light guide 206 to escape. This phenomenon is aptly named frustrated total internal reflection (FTIR).

The display surface 204 of the pressure-sensitive multi-touch display device 200 is composed of a deformable material that frustrates TIR in the light guide 206 when the display surface 204 contacts the light guide 206. Therefore, a small air gap 210 is maintained between the display surface 204 and the light guide 206 to prevent the display surface 204 from unintentionally contacting the light guide 206 and causing FTIR to occur.

When a finger 212 (or other input mechanism) contacts the display surface 204, the display surface 204 is deformed, causing the display surface 204 to contact the light guide 206. The contact between the display surface 204 and the light guide results in FTIR, and a portion of the light that escapes from the light guide 206 as a consequence of the resultant FTIR is directed back into the multi-touch display device 200. An imaging sensor 213 (e.g., a camera) captures images of the light that escapes from the light guide 206 as a result of FTIR such that points of contact on the multi-touch display device 200 appear as discriminable spots of light in images captured by the imaging sensor 213.

Images captured by imaging sensor 213 are processed by computing system 214 to identify points on the multi-touch display device 200 that have been contacted by a finger (or other input mechanism) by resolving spots of light in the captured images to corresponding points on the display surface 204. Computing system 214 may include one or more processors as well as one or more memory storage units. The one or more memory storage units may store instructions that, when executed by the one or more processors, cause the one or more processors to perform operations described throughout this disclosure.

When multiple fingers make contact with the display surface 204 simultaneously, FTIR occurs at each contact point. Consequently, light escapes from the light guide 206 at each contact point. The result is that multiple spots of light appear in images captured by the imaging sensor 213. The computing system 214 processes these images, discriminates the spots of light, and identifies the multiple points of contact by resolving the discriminated spots of light in the images to corresponding points on the display surface 204.

The computing system 214 generally treats detected points of contact on the display surface 204 as input and controls images displayed by the projector 202 according to such detected input.

In addition to detecting points of contact on the display surface 204, the multi-touch display device 200 also is capable of sensing the pressure applied by a finger (or other input mechanism) at each point of contact. In some implementations, when a relatively light amount of pressure is applied at a contact point, the region of the light guide 206 from which light escapes is relatively small. In contrast, when a relatively heavy amount of pressure is applied at a contact point, the region of the light guide 206 from which light escapes is relatively large. The result is that contact points where relatively light pressure is applied appear as relatively small spots of light in images captured by the imaging sensor 213, while contact points where relatively heavy pressure is applied appear as relatively large spots of light in images captured by the imaging sensor 213. In such implementations, the relationship between the amount of pressure applied at a contact point and the size of the resultant spot of light in an image captured by the imaging sensor 213 may be mapped, thereby enabling the computing system 214 to determine the amount of pressure applied at a contact point by calculating the size of the spot of light corresponding to the contact point in a captured image.

Figure 2B:
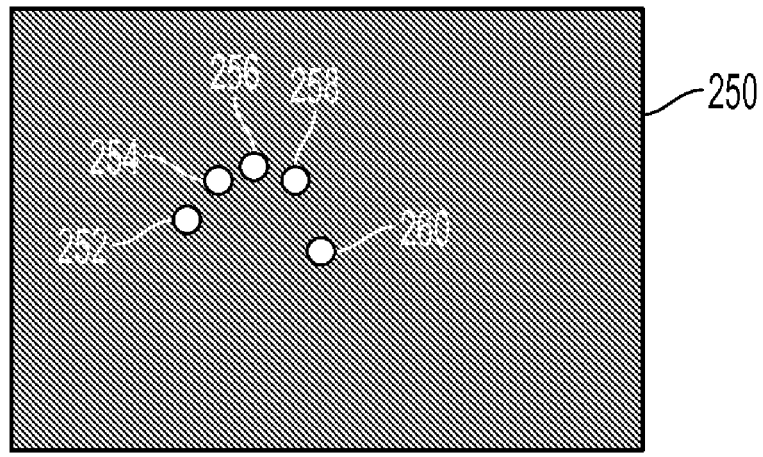
FIGS. 2B(a) and 2B(b) are examples of images captured by an imaging sensor of the multi-touch display device of FIG. 2A.
Figure 2B:
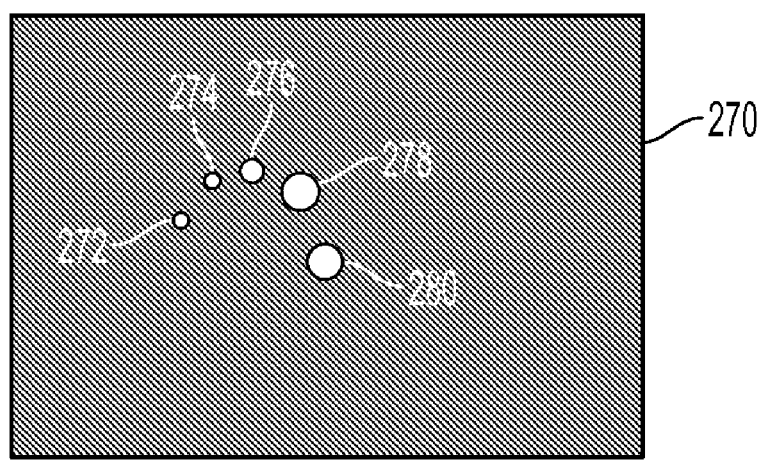

FIG. 2B is illustrative. FIGS. 2B(a) and 2B(b) are, examples of images 250 and 270 captured by the imaging sensor 213 of the multi-touch display device 200 of FIG. 2A. Referring to FIG. 2B(a), image 250 includes 5 discriminable spots of light 252, 254, 256, 258, and 260 corresponding to points of contact on the multi-touch display device 200. For example, a user may be contacting the multi-touch display device 200 with the five digits of the user's right hand, and each individual spot of light 252, 254, 256, 258, and 260 may correspond to one of the five digits of the user's right hand.

As illustrated in FIG. 2B(a), the five spots of light 252, 254, 256, 258, and 260 are of substantially the same size. Because the size of the area from which light escapes from the light guide 206 at a point of contact on the multi-touch display device 200 is a function of the amount of pressure applied at the contact point by a finger (or other input mechanism), it can be determined from the five spots of light 252, 254, 256, 258, and 260 captured in image 250 that the five digits of the user's right hand are all contacting the multi-touch display device 200 with substantially the same amount of pressure.

Referring to FIG. 2B(b), image 270 also includes live spots of light 272, 274, 276, 278, and 280. As with the spots of light 252, 254, 256, 258, and 260 captured in image 250, the spots of light 272, 274, 276, 278, and 280 captured in image 270 correspond to live points of contact on the multi-touch display device 200 made, for example, by the five digits of a user's right hand. In contrast to image 250 of FIG. 2B(a), however, the live spots of light 272, 274, 276, 278, and 280 captured in image 270 do not all have substantially the same size. The different sizes of the five spots of light 272, 274, 276, 278, and 280 may he attributed to the fact that the user is applying unequal amounts of pressure at the contact points on the multi-touch display device 200 with the five digits of the user's right hand. In particular, the user may be applying the greatest amount of pressure with the user's thumb and index finger (corresponding to spots of light 280 and 278 respectively) while applying slightly less pressure with the user's middle finger (corresponding to spot of light 276) and even less pressure with the user's ring and pinky fingers (corresponding to spots of light 274 and 272) respectively.

In some implementations, the intensity of light that escapes from the light guide and that is received by the imaging sensor may vary as a function of the amount of pressure applied at a contact point. In such implementations, contact points where relatively light pressure is applied appear as relatively faint spots of light in images captured by the imaging sensor, while contact points where relatively heavy pressure is applied appear as relatively bright spots of light in images captured by the imaging sensor. In such implementations, the relationship between the amount of pressure applied at a contact point and the intensity of the resultant spot of light in an image captured by the imaging sensor may be mapped (in addition to or as an alternative to mapping the size of the resultant spot of light), thereby enabling the computing system to determine the amount of pressure applied at a contact point by calculating the intensity and/or the size of the spot of light corresponding to the contact point in a captured image.

Pressure-Sensitive Tilt Control

The ability of a pressure-sensitive multi-touch display device to sense the amount of pressure applied at contact points on the surface of the multi-touch display device can be utilized to provide a pressure-sensitive tilt control for tilting displayed objects off of the plane of the display.

Figure 3A:
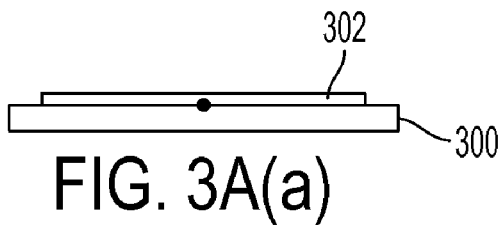
FIG. 3A is a series of diagrams that illustrate pressure-sensitive tilt control manipulations.
Figure 3A:
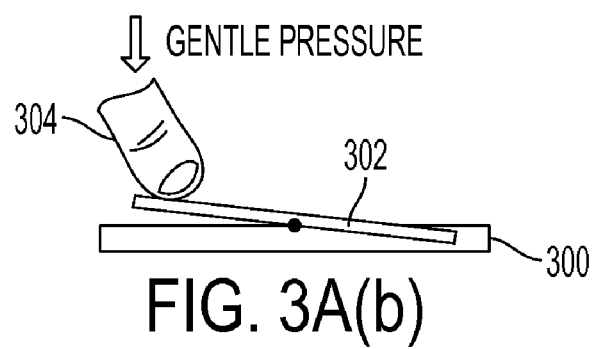
Figure 3A:
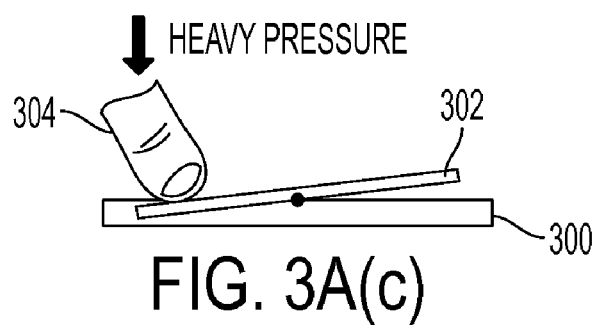
Figure 3A:
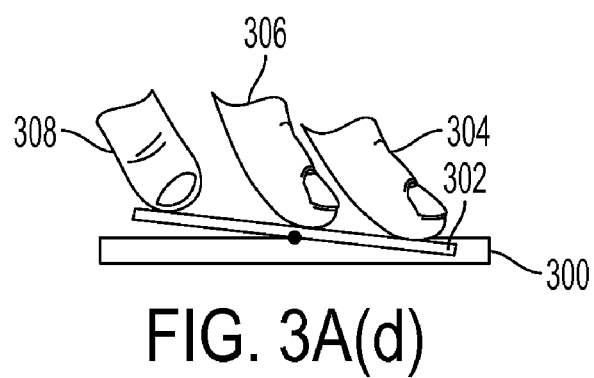

FIG. 3A is a series of diagrams that illustrate pressure-sensitive tilt control manipulations. Referring to FIG. 3A(a), a pressure-sensitive multi-touch display device 300 is displaying an object 302 and the displayed object 302 is at rest (i.e., not engaged by a finger or any other input mechanism). Because displayed object 302 is at rest, the multi-touch display device 300 displays object 302 on the same plane as the display.

The multi-touch display device 300 is configured to sense the pressure applied to the multi-touch display device at contact points by fingers. When one or more fingers contact the multi-touch display device 300 in positions corresponding to a displayed object, the multi-touch display device 300 senses the pressure applied at each contact point in a position corresponding to the displayed object and interprets the sensed pressure at each contact point as a depth relative to the display surface. In some implementations, the multi-touch display device 300 maps the zero-depth of the display surface to a non-zero threshold amount of pressure. In such implementations, the multi-touch display device 300 interprets detected pressure that is less than the non-zero threshold as corresponding to a depth that is above the display surface. In this manner, the multi-touch display device 300 enables a user to lift a portion of an object above the display surface (and/or another object) by contacting the displayed object with a relatively light amount of pressure. Similarly, the multi-touch display device 300 interprets detected pressure that is greater than the non-zero threshold as corresponding to a depth that his below the display surface. After the multi-touch display device 300 has determined the depth relative to the display surface for each contact point that is in a position corresponding to the displayed object, the multi-touch display device 300 solves for a plane (e.g., a "best-fit" plane) that approximately intersects the contact points at their determined depths. The multi-touch display device 300 then displays the displayed object on the calculated plane.

In FIG. 3A(b), a finger 304 is applying a relatively light amount of pressure to the multi-touch display device 300 in a region corresponding to the left side of displayed object 302. The multi-touch display device 300 has sensed that the pressure applied by the finger 304 to the multi-touch display device 300 is relatively light (e.g., less than a threshold amount) and, in response, tilted displayed object 302 off of the plane of the display such that the left side of displayed object 302 is raised slightly above the plane of the display while the right side of displayed object 304 is depressed slightly below the plane of the display.

Referring to FIG. 3A(c), the finger 304 is applying a relatively heavy amount of pressure to the multi-touch display device 300 in a region corresponding to the left side of displayed object 304. In response to detecting that the finger 304 is applying a relatively heavy amount of pressure to the left side of displayed object 304, the multi-touch display device 300 has visibly tilted displayed object 304 off of the plane of the display such that the left side of displayed object 304 is depressed slightly below the plane of the display while the right side of displayed object 302 is raised slightly above the plane of the display surface.

Finally, referring to FIG. 3A(d), three fingers 304, 306, and 308 are contacting the multi-touch display device 300 in positions corresponding to displayed object 302 with varying amounts of pressure. In response, the multi-touch display device 300 has interpreted the pressure applied by each of fingers 304, 306, and 308 as a depth relative to the display surface, solved for a plane that attempts to fit each of the contact points to its determined depth, and visibly tilted displayed object 302 such that it lies on the solved for plane.

Various different techniques may be employed by a pressure-sensitive multi-point display device to provide a pressure-sensitive tilt control such as those described above in connection with FIG. 3A. For example, Gingold, Y. I., Davidson, P. L., Kan, J. Y., and Zorin, D. 2006, "A Direct Texture Placement and Editing Interface," Proceedings of the 19th Annual ACM Symposium on User Interface Software and Technology (Montreux, Switzerland, Oct. 15-18, 2006), UIST '06, ACM, New York, N.Y., 23-32, which is incorporated herein by reference in its entirety, describes an isometric tilt control that can be employed by a pressure-sensitive multi-point display device.

Figure 3B:
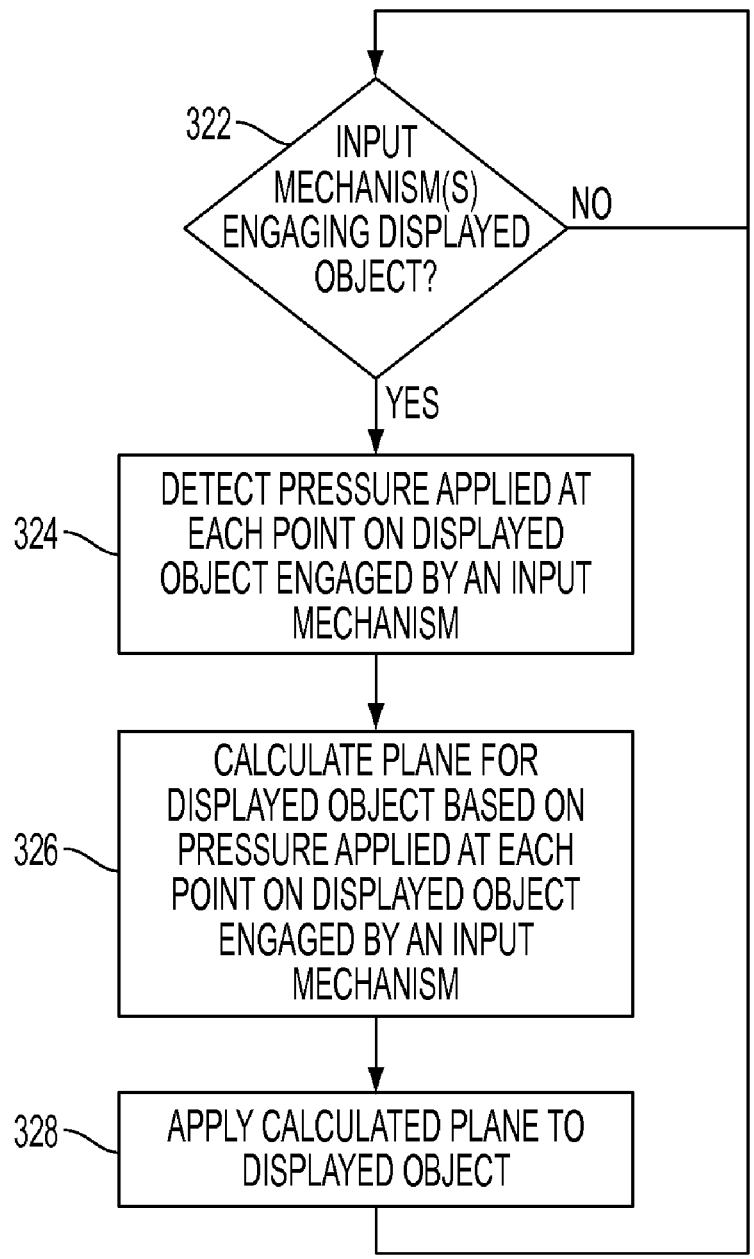
FIG. 3B is a flow chart of a process for implementing a pressure-sensitive tilt control.

FIG. 3B is a flow chart 320 of a process for implementing a pressure-sensitive tilt control. The process illustrated in flow chart 320 of FIG. 3B may be implemented by a pressure-sensitive multi-point display device such as, for example, the pressure-sensitive multi-touch display device 200 of FIG. 2A with logical operations in the process being performed by, for example, the computing system 214.

The process begins when one or more input mechanisms (e.g., fingers) are detected as engaging a displayed object (322). When one or more input mechanisms are detected as engaging a displayed object, the pressure-sensitive multi-touch display device detects the pressure applied by the input mechanisms at each contact point (324).

Based on the detected pressure applied by the input mechanisms at each contact point, the pressure-sensitive multi-touch display device then calculates a tilt plane for the displayed object (326). In some implementations, the pressure-sensitive multi-touch display device defines a set of weak constraints around a unit circle centered at the center of the displayed object. As a result, the pressure-sensitive multi-touch display device may be able to calculate a tilt plane that is well defined for less than three input points. Furthermore, these constraints also may have the added effect of creating a soft "pivot point" at the center of the displayed object. In some implementations, the radius for these constraints may be defined to be approximately 90% smaller than that of the maximum inscribed circle for the convex hull of the displayed object. In such implementations, pressure applied by an input mechanism near the center of the displayed object generally causes the displayed object to be raised up or pushed down evenly, while pressure applied by an input mechanism closer to the boundary of the displayed object generally results in a tilt in the direction of the contact point.

After calculating the tilt plane for the displayed object, the multi-touch display device applies the calculated plane to the displayed object including applying various visual cues to the displayed object such that the displayed object appears to be lying along the calculated plane. The process illustrated in the flow chart 320 of FIG. 3B may be repeated successively while input mechanisms continue to engage the displayed object allowing the tilt of the displayed object to be continually updated to reflect varying amounts of pressure being applied to the displayed object by the input mechanism.

A pressure-sensitive multi-point display device that provides a pressure-sensitive tilt control may provide a variety of visual cues to indicate the relative tilt of a displayed object to a user. For example, a pressure-sensitive multi-point display device may apply a slight out-of-plane rotation that correlates to the tilt value calculated by the multi-touch display device and that alters the visible outline of the displayed object to the displayed object.

Figure 3C:
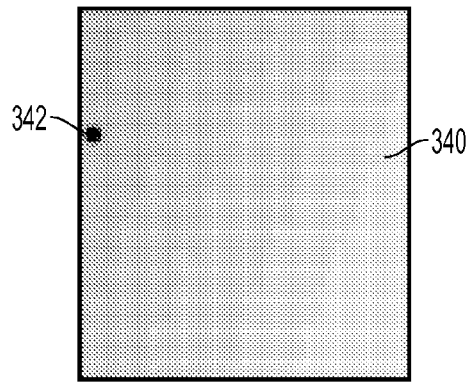
FIG. 3C is a set of diagrams illustrating examples of different shading effects applied by a pressure-sensitive multi-touch display device to a displayed object to reflect a tilt applied to the displayed object.
Figure 3C:
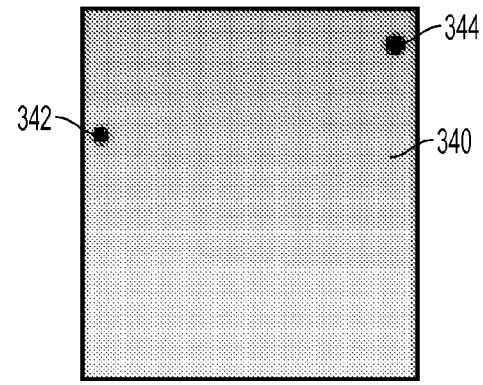
Figure 3C:
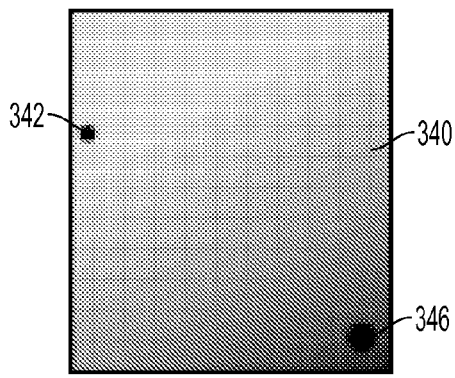
Figure 3C:
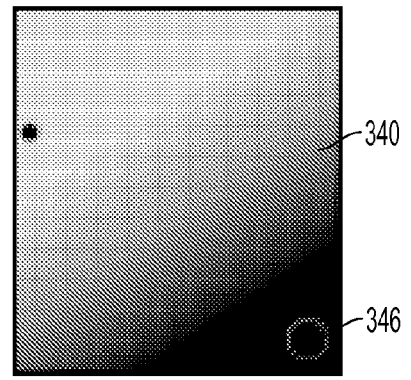

Additionally or alternatively, the multi-touch display device may use a lighting model that provides subtle shading effects on a displayed object to reflect a tilt applied to the displayed object. FIG. 3C is a set of diagrams illustrating examples of different shading effects applied by a pressure-sensitive multi-touch display device to a displayed object 340 to reflect a tilt applied to the displayed object 340.

FIG. 3C(a) illustrates shading effects applied to displayed object 340 to reflect the tilt applied to the displayed object 340 based on the pressure applied to the displayed object 340 at contact point 342. FIG. 3C(b) illustrates shading effects applied to displayed object 340 to reflect the tilt applied to the displayed object 340 based on the pressure applied at contact points 342 and 344. FIG. 3C(c) illustrates shading effects applied to displayed object 340 to reflect the tilt applied to the displayed object 340 based on the pressure applied at contact points 342 and 346. FIG. 3C(d) illustrates the shading effects applied to displayed object 340 to reflect the tilt applied to the displayed object 340 based on the pressure applied at contact points 342 and 346 when the pressure applied at contact point 346 is greater than the pressure applied at contact point 346 as illustrated in FIG. 3C(c). Comparing FIG. 3C(c) to FIG. 3C(d), the lower right corner of object 340 in FIG. 3C(d) is shaded more darkly than the lower right corner of object 340 in FIG. 3C(c) to reflect that the lower right corner of object 340 is depressed deeper into the display in FIG. 3C(d) than in FIG. 3C(c).

A pressure-sensitive multi-point display device also may apply hardware-based depth attenuation techniques to reflect a tilt applied to a displayed object in addition to or as an alternative to the other visual cues described above. For example, a pressure-sensitive multi-point display device may apply hardware-based depth attenuation techniques to darken portions of a displayed object as it is depressed deeper into the surface.

Additionally or alternatively, a pressure-sensitive multi-point display device may employ a drop shadow as a visual clue to reflect a tilt applied to a displayed object. For example, a multi-point display device may render a drop shadow around portions of a displayed object that are calculated as being raised above the plane of the display. As the portion of a displayed object is lifted higher above the plane of the display, the multi-point display device may increase the size and penumbral width of the drop shadow to reflect the increased tilt applied to the displayed object.

Figure 3D:
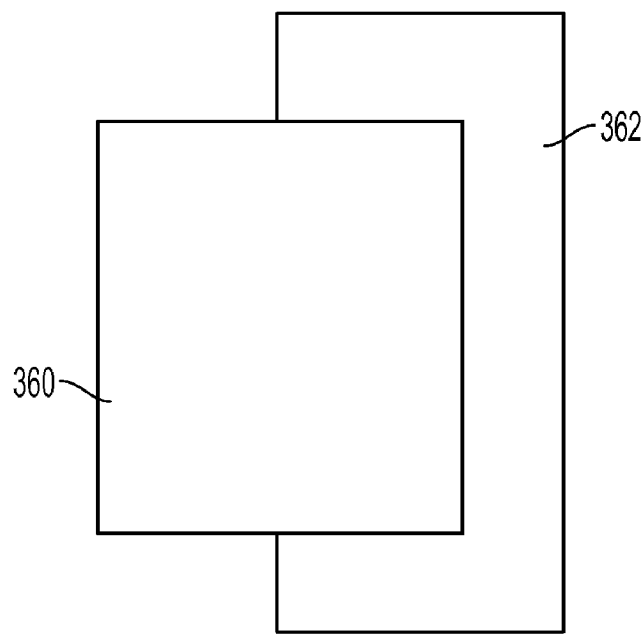
FIG. 3D is a set of diagrams illustrating the application of a drop shadow to a displayed object to reflect a tilt applied to the displayed object.
Figure 3D:
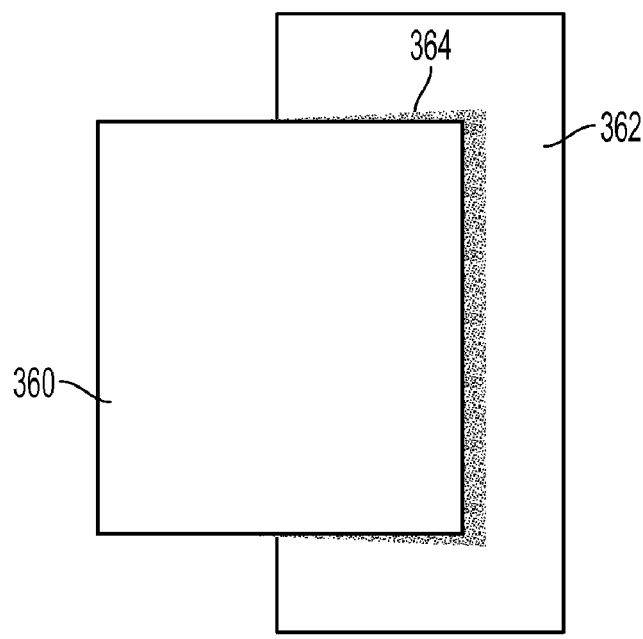

FIG. 3D is a set of diagrams illustrating the application of a drop shadow to a displayed object 360 by a pressure-sensitive multi-point display device to reflect a tilt applied to the displayed object 360. As illustrated in FIG. 3D(a), both displayed object 360 and displayed object 362 are at rest, and displayed object 360 is overlapping displayed object 362. In contrast, in FIG. 3D(b), the pressure-sensitive multi-point display device has applied a tilt to displayed object 360 such that the right side of displayed object 360 is visibly tilted above the plane of the display. To reflect this applied tilt visually, the multi-touch display device has rendered a drop shadow 364 around the right-side boundary of displayed object 360. In some implementations, the multi-touch display device may render a drop shadow around the entire boundary of a titled object in order to visually reflect the tilt applied to the displayed object. In other implementations, the multi-touch display device may render a drop shadow only around certain portions of a titled object, such as, for example, the portion of the titled object that is raised above the plane of the display as illustrated in FIG. 3D(b).

A pressure-sensitive multi-point display device that provides a pressure-sensitive tilt control, such as described above, may compose the pressure-sensitive tilt control with other controls for two-dimensional transformation (e.g., RST, RT, ST, T). Due to the fact that these two-dimensional transformation controls generally operate using position alone, sensed pressure values may be used exclusively for tilt calculation, enabling the pressure-sensitive tilt control and the two-dimensional transformation controls to remain relatively orthogonal.

Pressure-Sensitive Layering Operations

The order in which a multi-point display device renders displayed objects is defined by a global ordering index. Displayed objects are rendered from back to front with lower-ordered objects being displayed at virtual layers that are lower than higher-ordered objects. As a result, the multi-point display device is capable of displaying objects in an under/overlapping fashion. For example, when an object displayed at a higher virtual layer than another displayed object overlaps a portion of the other displayed object, the multi-point display device renders the two displayed objects such that the overlapping portion of the higher-layer object occludes the overlapped portion of the other object.

Figure 4A:
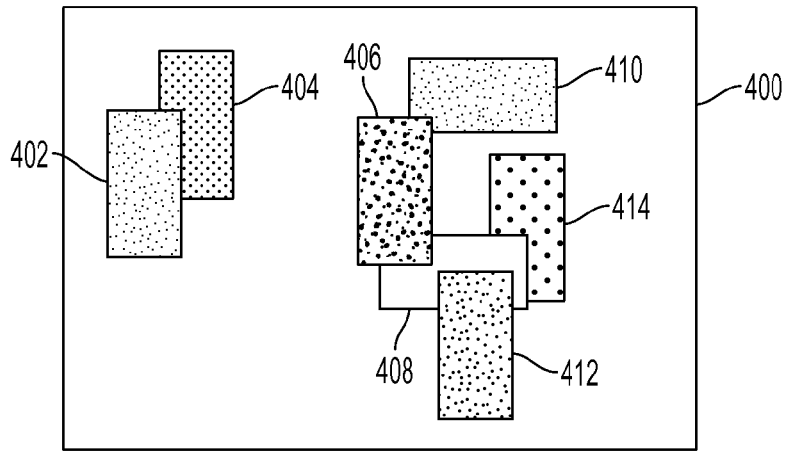
FIG. 4 is a set of diagrams of a multi-touch display device displaying objects in an under/overlapping fashion.
Figure 4B:
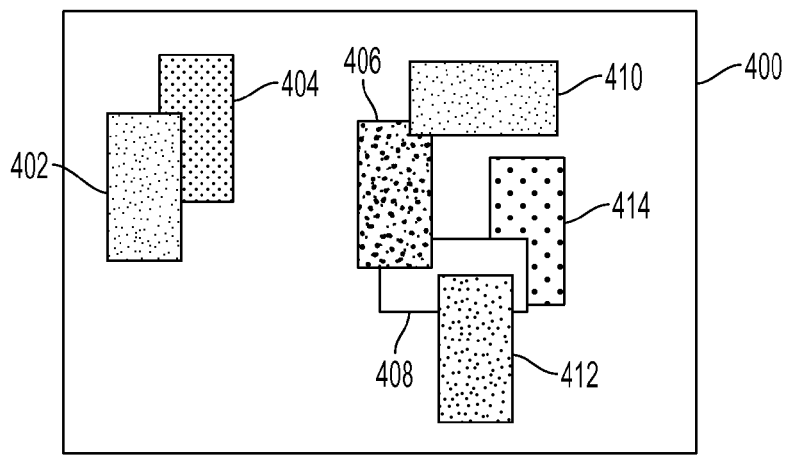
Figure 4C:
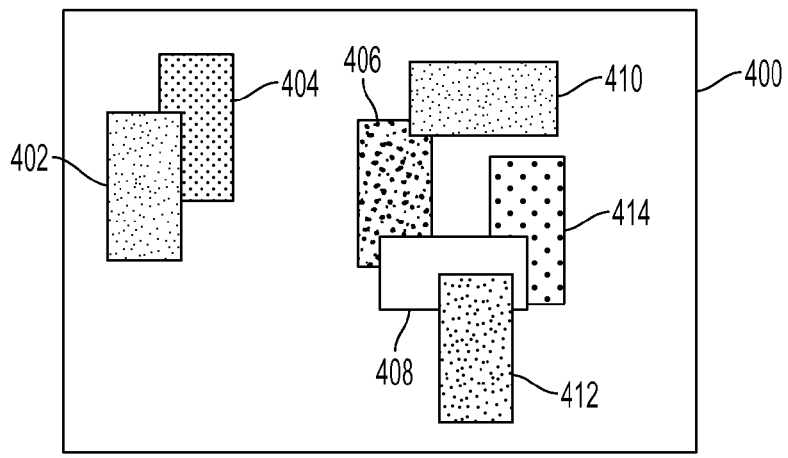

FIG. 4 is a set of diagrams of a multi-touch display device 400 displaying objects in an under/overlapping fashion. As illustrated in FIG. 4(a), the multi-touch display device 400 is displaying objects 402, 404, 406, 408, 410, 412, and 414 such that some of displayed objects 402, 404, 406, 408, 410, 412, and 414 are under/overlapping others of displayed objects 402, 404, 406, 408, 410, 412, and 414. In addition, the multi-touch display device 400 is displaying objects 402, 404, 406, 408, 410, 412, and 414 such that displayed objects 402, 404, 406, 408, 410, 412, and 414 are arranged in two disjoint clusters of under/overlapping objects. In particular, displayed objects 402 and 404 are arranged in a first cluster of under/overlapping displayed objects while displayed objects 406, 408, 410, 412, and 414 are arranged in a second, disjoint cluster of under/overlapping objects.

The order in which the multi-touch display device 400 renders displayed objects 402, 404, 406, 408, 410, 412, and 414 is defined by a global ordering index maintained by the multi-touch display device 400. The multi-touch display device 400 may store the global ordering index in a table, a database, or any other suitable data structure. Table 1 is an example of a table in which a global ordering index is stored defining the order in which the multi-touch display device 400 rendered displayed objects 402, 404, 406, 408, 410, 412, and 414.

TABLE 1

| Object | Index |
|--------|-------|
| 402    | 7     |
| 404    | 1     |
| 406    | 6     |
| 408    | 4     |
| 410    | 3     |
| 412    | 5     |
| 414    | 2     |

As illustrated in FIG. 4(a), the multi-touch display device 400 renders displayed objects 402, 404, 406, 408, 410, 412, and 414 in order from lowest index to highest index such that objects having lower-order indices are rendered at virtual layers that are below the virtual layers at which objects having higher-order indices are rendered. That is to say, objects having lower-order indices are rendered closer to the background of the display while objects having higher-order indices are rendered closer to the foreground of the display. As an alternative, it will be appreciated that the multi-touch display device 400 could render displayed objects 402, 404, 406, 408, 410, 412, and 414 in order from highest index to lowest index such that objects having higher-order indices are rendered at virtual layers below the virtual layers at which objects having lower-order indices are rendered. For consistency and ease of explanation, however, it is assumed throughout that objects are rendered in order from lowest index to highest index.

The multi-touch display device 400 provides two-dimensional RST controls that enable a user to freely rotate, scale, and/or translate any of displayed objects 402, 404, 406, 408, 410, 412, and 414 about the two-dimensional canvas. Furthermore, and as described in greater detail below, the multi-touch display device 400 also provides a layering control that enables a user to manipulate the layering of displayed objects. For example, as illustrated in FIG. 4(b), the layering control provided by the multi-touch display device 400 enables a user to bring displayed object 410 forward from its position in FIG. 4(a) where it is underlapping displayed object 406 to its position in FIG. 4(b) where it is overlapping displayed object 406.

In some implementations, in order to facilitate layering operations, a multi-touch display device maintains a pair of lists for each displayed object, one list that records all other objects that the displayed object overlaps and one list for all other objects that, the displayed object underlaps. The multi-touch display device may store such overlap and underlap lists in a table, a database, or any other suitable data structure. For example, Tables 2-8 illustrate examples of overlap and underlap lists maintained by multi-touch display device for the purpose of recording the under/overlap relationships of displayed objects 402, 404, 406, 403, 410, 412, and 414 as displayed on FIG. 4(a).

TABLE 2

| Object | Index | Overlaps | Underlaps |
|---|---|---|---|
| 402 | 7 | 404 | |

TABLE 3

| Object | Index | Overlaps | Underlaps |
|---|---|---|---|
| 404 | 1 | | 402 |

TABLE 4

| Object | Index | Overlaps | Underlaps |
|---|---|---|---|
| 406 | 6 | 408 | |
| | | 410 | |

TABLE 5

| Object | index | Overlaps | Underlaps |
|---|---|---|---|
| 408 | 4 | 414 | 406 |
| | | | 412 |

TABLE 6

| Object | Index | Overlaps | Underlaps |
|---|---|---|---|
| 410 | 3 | | 406 |

TABLE 7

| Object | Index | Overlaps | Underlaps |
|---|---|---|---|
| 412 | 5 | 408 | |
| | | 414 | |

TABLE 8

| Object | Index | Overlaps | Underlaps |
|---|---|---|---|
| 414 | 2 | | 408 |
| | | | 412 |

As is evident from Tables 2-8, the overlap list for any given displayed object includes to any other displayed object that the displayed object overlaps, not just the overlapped object most directly below the displayed object. For example, as reflected in Table 7, both objects 408 and 414 are included in the overlap list of displayed object 412 notwithstanding that displayed object 412 overlaps displayed object 408 more directly than displayed object 414. Similarly, the underlap list for any given displayed object includes any other displayed object that the displayed object underlaps, not just the overlapping object most directly above the displayed object.

When the layering of displayed objects is modified, the multi-touch display device 400 updates the underlap and overlap lists for each impacted object to reflect the new under/overlap relationships between the impacted objects. For example, as a result of bringing displayed object 410 forward from its position in FIG. 4(a) where it is underlapping displayed object 406 to its position in FIG. 4(b) where it is overlapping displayed object 406, the multi-touch display device 400 may update the overlap and underlap lists maintained for displayed objects 406 and 410 to reflect the new under/overlap relationship between displayed objects 406 and 410 as illustrated in Tables 9-10.

TABLE 9

| Object | Overlaps | Underlaps |
|---|---|---|
| 406 | 408 | 410 |

TABLE 10

| Object | Overlaps | Underlaps |
|---|---|---|
| 410 | 406 | |

Furthermore, and as will be described in greater detail below, after the underlap and overlap lists for each impacted object have been updated, the multi-touch display device 400 rebuilds the global ordering index to appropriately reflect the new under/overlap relationships between the impacted displayed objects based on the updated underlap and overlap lists for the displayed objects. For example, Table 11 illustrates an updated global to ordering index defining a new order for rendering displayed objects 402, 404, 406, 408, 410, 412, and 414 so as to reflect the new under/overlap relationship between displayed objects 402, 404, 406, 408, 410, 412, and 414.

TABLE 11

| Object | Index |
|---|---|
| 402 | 7 |
| 404 | 1 |
| 406 | 4 |
| 408 | 3 |
| 410 | 6 |
| 412 | 5 |
| 414 | 2 |

It should be noted that rebuilding the global ordering index for displayed objects after a layering operation has been performed to change the under/overlap relationship between two objects may not always he as simple as merely swapping the ordering indices for the two displayed objects. In fact, simply swapping the ordering indices for the two displayed objects may result in other under/overlap relationships between displayed objects being disrespected, which may be an undesirable result.

For example, considering the global ordering index defined in Table 1 for displaying objects 402, 404, 406, 408, 410, 412, and 414 as illustrated in FIG. 4(a), displayed object 406 is assigned ordering index 6 and displayed object 410 is assigned ordering index 3. If, as suggested in Table 12, the ordering indices for displayed objects 406 and 410 simply were swapped in response to the layering operation in which displayed object 410 was brought forward from its position in FIG. 4(*a*) where it is underlapping displayed object 406 to its position in FIG. 4(*b*) where it is overlapping displayed object 406, the pre-existing under/overlap relationship between displayed objects 406 and 408 would be violated.

TABLE 12

| Object | Index |
|--------|-------|
| 402 | 7 |
| 404 | 1 |
| 406 | 3 |
| 408 | 4 |
| 410 | 6 |
| 412 | 5 |
| 414 | 2 |

In particular, simply swapping the global ordering indices for displayed objects 406 and 410 would result in the multi-touch display device 400 rendering displayed objects 402, 404, 406, 408, 410, 412, and 414 as illustrated in FIG. 4(*c*), in which displayed object 408 overlaps displayed object 406 notwithstanding that displayed object 406 previously overlapped displayed object 406 and no layering operation has been performed to modify the under/overlap relationship between displayed objects 406 and 408. Because this result may be undesirable, the multi-touch display device 400 rebuilds the global ordering index based on the updated overlap and underlap lists for the displayed objects rather than merely swapping the global ordering indices for two displayed objects for which the under/overlap relationship has been modified. In some implementations, the entire global ordering index may not be rebuilt. Rather, only those elements of the global ordering index whose ordering within the global ordering index are impacted by a layering operation may he rebuilt, while other elements are preserved within the global ordering index undisturbed.

For layering operations in which the local layering of displayed objects is more important than the global ordering of displayed objects, the pressure-sensitive tilt control described above can be coupled with the techniques for layering displayed objects also described above to create a powerful pressure-sensitive layering control for layering objects on a pressure-sensitive multi-point display device. The semantic of an edge or corner of a displayed object being visibly tilted into or out of the screen provided by the pressure-sensitive tilt control elegantly conveys the intended orientation of a displayed object as it is moved relative to neighboring displayed objects. If two elements are nearly intersecting, a user can judge their relative depth to one another based on their respective tilt angles. Thus the user is able to infer which of the two elements will be placed on top of the other when the two displayed objects are brought into intersecting positions.

Figure 5A:
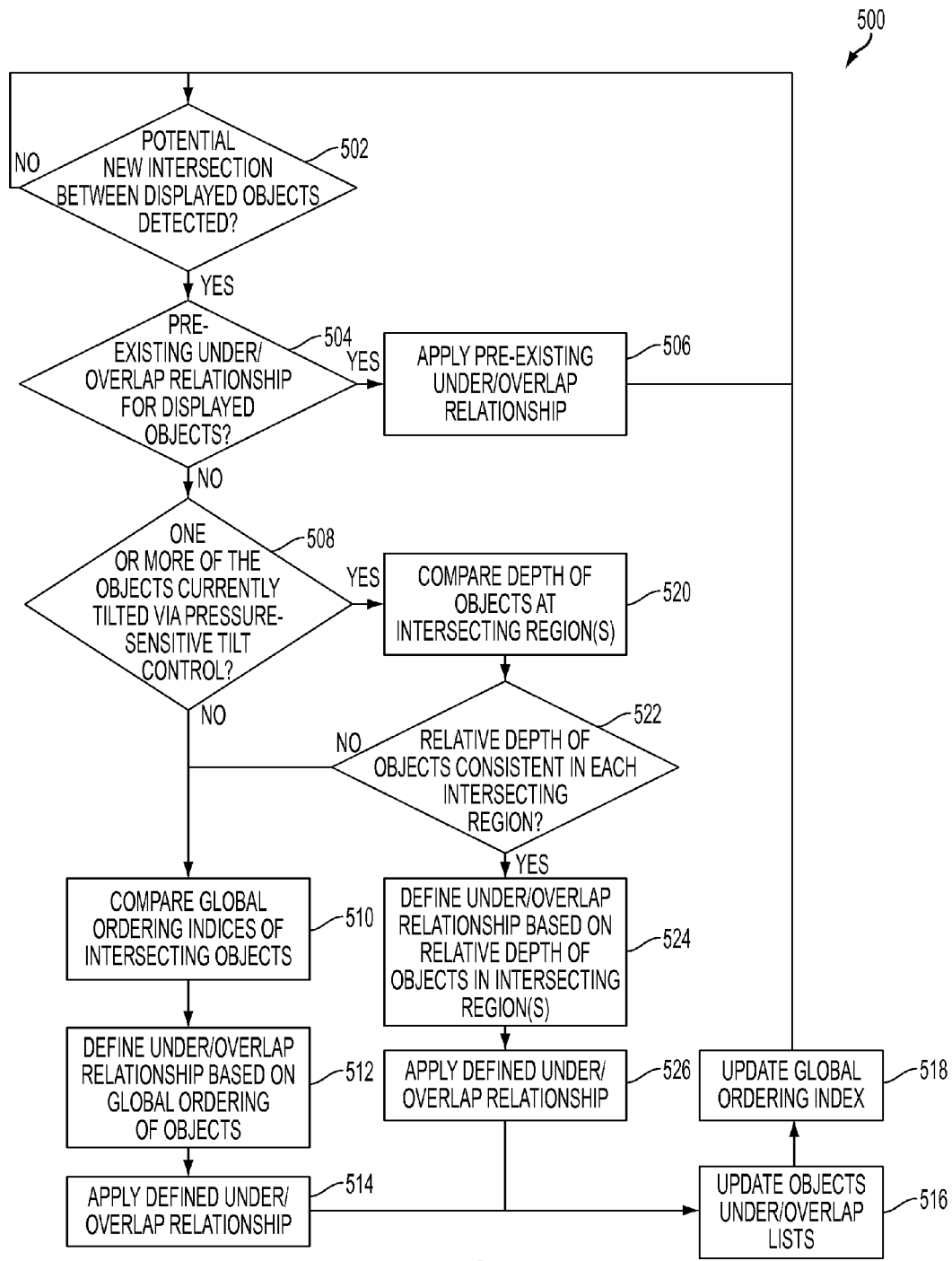
FIG. 5A is a flowchart of a process for implementing a pressure-sensitive layering control.

FIG. 5A is a flowchart 500 of a process for implementing a pressure-sensitive layering control. The process illustrated in flow chart 500 of FIG. 5A may he implemented by a pressure-sensitive multi-point display device such as, for example, the pressure-sensitive multi-touch display device 200 of FIG. 2A with logical operations in the process being performed by, for example, the computing system 214.

The process begins when the pressure-sensitive multi-touch display device detects a potential new visible intersection between two displayed objects (502). In some implementations, the multi-touch display device may detect a potential new visible intersection between two displayed objects by detecting that the two-dimensional boundaries of the two displayed objects visually have abutted one another and/or that the two-dimensional boundaries of the two displayed objects have intersected each other by more than a threshold distance or area. Alternatively, in other implementations, the multi-touch display device may detect a potential new visible intersection between two displayed objects by detecting that the two-dimensional boundaries of the two displayed objects have come within a threshold distance of one another but have not yet actually interested one another.

In response to detecting the potential new intersection between the two displayed objects, the multi-touch display device determines whether a pre-existing under/overlap relationship exists between the two objects (504). For example, any symmetric intersection test may he used to determine whether an under/overlap relationship already exists for the two objects. In some implementations, the multi-touch display device determines whether an under/overlap relationship already exists between the two displayed objects based on analyzing the underlap and/or overlap lists maintained for the two displayed objects. If one of the displayed objects can be reached via a strict downward or upward search of the underlap or overlap lists of the other displayed object, then a pairwise under/overlap relationship already is defined for the two objects. Therefore, the multi-touch display device applies the pre-existing under/overlap relationship to the two objects, and the process returns to operation 502 where it awaits a detection of another potential new intersection between two displayed objects. Determining whether an under/overlap relationship already exists between the two displayed objects before taking other actions may prevent cycles from appearing in the graph. In addition, it also may prevent depth comparisons that conflict with the current order.

Figure 5B:
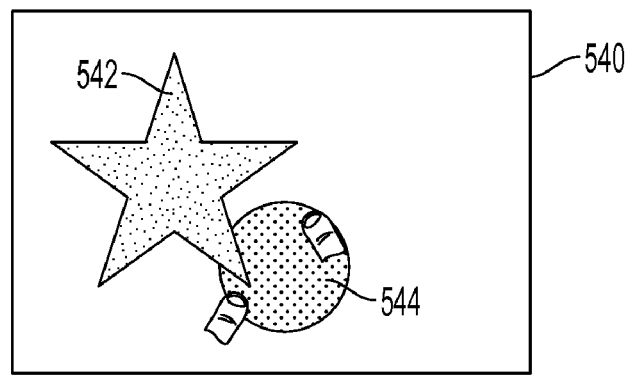
FIG. 5B is a series of diagrams of a multi-touch display device that illustrate a layering operation being performed between two displayed objects for which a direct under/overlap relationship exists prior to performance of the layering operation.
Figure 5B:
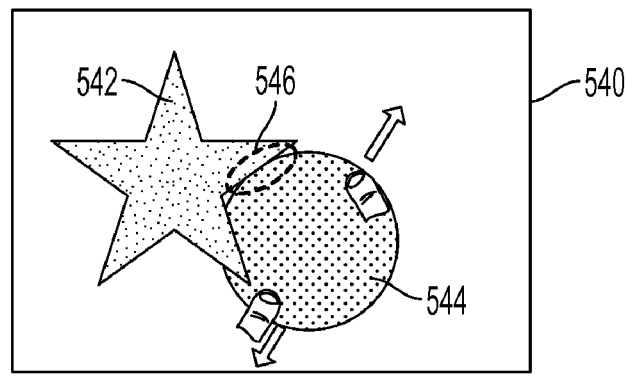
Figure 5B:
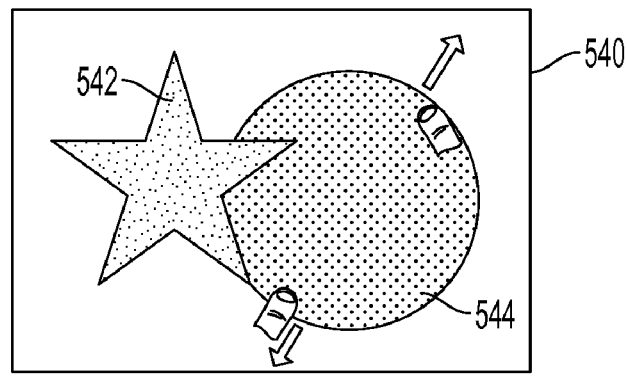

A determination that an under/overlap relationship already exists between two objects for which a potential new intersection has been detected may be based on a direct under/overlap relationship between the two objects or an indirect under/overlap relationship between the two objects. FIG. 5B is a series of diagrams of a multi-touch display device 540 that illustrate a layering operation being performed between two displayed objects 542 and 544 for which a direct under/overlap relationship exists prior to performance of the layering operation. Meanwhile, FIG. 5C is a series of diagrams of a multi-touch display device 540 that illustrate a layering operation being performed between two displayed objects 548 and 550 for which an indirect under/overlap relationship exists prior to performance of the layering operation.

Referring to FIG. 5B(*a*), a direct under/overlap relationship exists between displayed objects 542 and 544. Namely, displayed object 542 directly overlaps displayed object 544 because a portion of displayed object 542 is positioned directly above displayed object 544. In addition to reflecting this direct under/overlap relationship visually, multi-touch display device 540 also records this under/overlap relationship by listing displayed object 544 in displayed object 542's overlap list and by listing displayed object 544 in displayed object 542's underlap list.

As multi-touch display device 540 increases the scale of displayed object 544 under user control as illustrated in FIG. 5B(*b*), the multi-touch display device 540 detects a potential new intersection 546 between displayed objects 542 and 544. In response to detecting the potential new intersection 546, the multi-touch display device 540 determines whether an under/overlap relationship already exists for displayed objects 542 and 544. Due to the fact that displayed object 542 already has been defined as overlapping displayed object 544, the multi-touch display device 540 applies the pre-existing under/overlap relationship between displayed objects 542 and 544 at the potential new intersection 546 between displayed objects 542 and 544. Thus, as illustrated in FIG. 5B(*c*), as the multi-touch display device 540 continues to increase the scale of displayed object 544 under user control, the multi-touch display device 540 maintains the pre-existing under/overlap relationship between displayed objects 542 and 544.

Figure 5C:
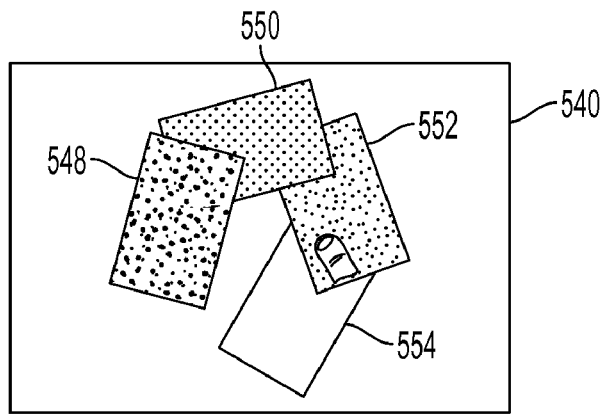
FIG. 5C is a series of diagrams of a multi-touch display device that illustrate a layering operation being performed between two displayed objects for which an indirect under/overlap relationship exists prior to performance of the layering operation.
Figure 5C:
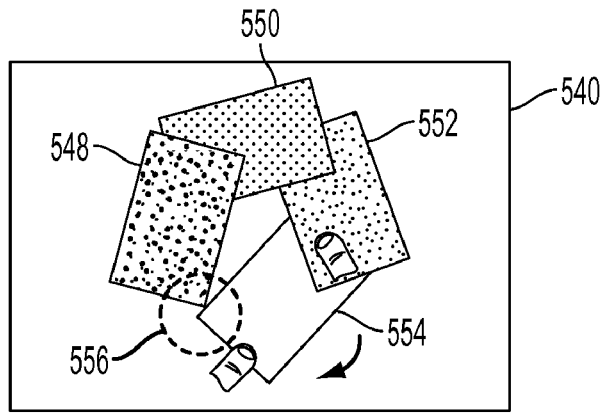
Figure 5C:
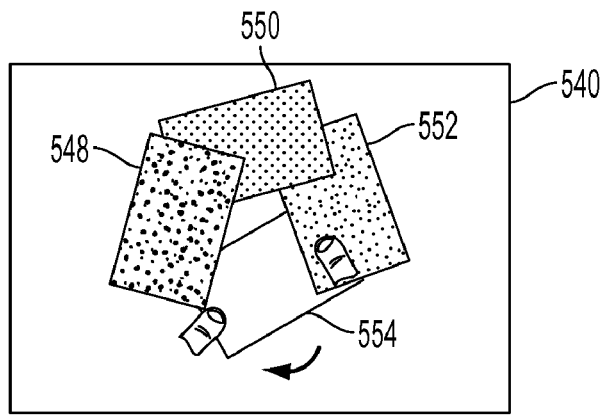

Referring now to FIG. 5C(*a*), multi-touch display device 540 is displaying objects 548, 550, 552, and 554. Because no portion of either displayed object is positioned directly above or below the other displayed object, a direct under/overlap relationship does not exist between displayed objects 548 and 554. However, an indirect under/overlap relationship exists between displayed objects 548 and 554 by virtue of their under/overlap relationships with displayed objects 550 and 552.

In particular, displayed object 548 directly overlaps displayed object 550. As a result, displayed object 550 is listed in displayed object 548's overlap list and displayed object 548 is listed in displayed object 550's underlap list. Meanwhile, displayed object 550 directly overlaps displayed object 552. Therefore, displayed object 552 is listed in displayed object 550's overlap list while displayed object 550 is listed in displayed object 552's underlap list. Similarly, displayed object 552 directly overlaps displayed object 554. Consequently, displayed object 554 is listed in displayed object 552's overlap list and displayed object 552 is listed in displayed object 554's underlap list.

Due to the under/overlap relationships between displayed objects 548, 550, 552, and 554, displayed object 554 can be reached by performing a strictly downward search of displayed object 548's overlap list while displayed object 548 can be reached by performing a strictly upward search of displayed object's 554 underlap list. As such, displayed objects 548 and 554 may be said to have an indirect under/overlap relationship.

As multi-touch display device 540 rotates displayed object 554 toward displayed object 548 under user control as illustrated in FIG. 5C(*b*), the multi-touch display device 540 detects a potential new intersection 556 between displayed objects 548 and 554. In response to detecting the potential new intersection 556, the multi-touch display device 540 determines whether an under/overlap relationship already exists for displayed objects 548 and 554. Due to the fact that an indirect under/overlap relationship already exists between displayed objects 548 and 554, the multi-touch display device 540 applies the pre-existing under/overlap relationship between displayed objects 548 and 554 at the potential new intersection 556 between displayed objects 548 and 554. Thus, as illustrated in FIG. 5C(*c*), as the multi-touch display device 540 continues to rotate displayed object 554 toward displayed object 548 under user control, the multi-touch display device 540 maintains the pre-existing under/overlap relationship between displayed objects 548 and 554.

Referring again to FIG. 5A, if the multi-touch display device detects a potential new intersection between two displayed objects (502) and there is no previously-existing under/overlap relationship between the two objects (504), the multi-touch display device determines whether either of the displayed objects currently is being tilted under the control of the pressure-sensitive tilt control.

If the multi-touch display device determines that neither displayed object currently is being tilted under the control of the pressure sensitive tilt control, the multi-touch display device compares the global ordering indices of the two intersecting objects (510) and defines an under/overlap relationship for the two objects based on the global ordering indices for the two objects (510). In particular, the multi-touch display device defines the displayed object having the higher ordering index as the overlapping object and the displayed object having the lower ordering index as the underlapping object.

After the multi-touch display device has defined the under/overlap relationship between the two displayed objects, the under/overlap relationship is applied to the two displayed objects (514), the appropriate overlap and underlap lists for the two objects are updated to reflect the applied under/overlap relationship between the two displayed objects (516), and the global ordering index is rebuilt (if appropriate) based on the underlap and overlap lists for the displayed objects (518).

Various different techniques can be employed to rebuild the global ordering index. In some implementations, the exact global ordering of displayed objects is not critical, so long as a valid partial ordering is respected within individual clusters of under/overlapping displayed objects. As will be appreciated, disjoint clusters of under/overlapping displayed objects can be identified by analyzing the pair-wise under/overlap information stored for each displayed object in its overlap and underlap lists. As such, after the underlap and overlap lists have been updated for objects involved in a layering operation, all of the disjoint clusters of under/overlapping displayed objects can be identified by analyzing the pair-wise under/overlap information stored for each displayed object in its underlap and overlap lists. Then, a full ordering for each cluster can be determined using the partial ordering defined via the underlap and/or overlap lists. The construction of the underlap and/or overlap lists produces a directed acyclic graph (DAG). Such a graph can be used to generate a full sort using a standard depth-first-search traversal of underlap and/or overlap relations. Based on the determined local orderings for each cluster of under/overlapping displayed objects, the displayed objects are rearranged within the global ordering index such that the local ordering within each disjoint cluster is respected. Furthermore, in some implementations, to the extent that it is possible, the global ordering index is rearranged so as to preserve relative ordering between disjoint clusters. It will be appreciated that a valid solution for the global ordering of all of the displayed objects may not necessarily be unique, but that any valid solution that respects the local ordering of the displayed objects within each disjoint cluster should he visually indistinguishable from any other valid solution.

After rebuilding the global ordering index (518), the process returns to operation 502 where it awaits detection of another potential new intersection between displayed objects.

Figure 5D:
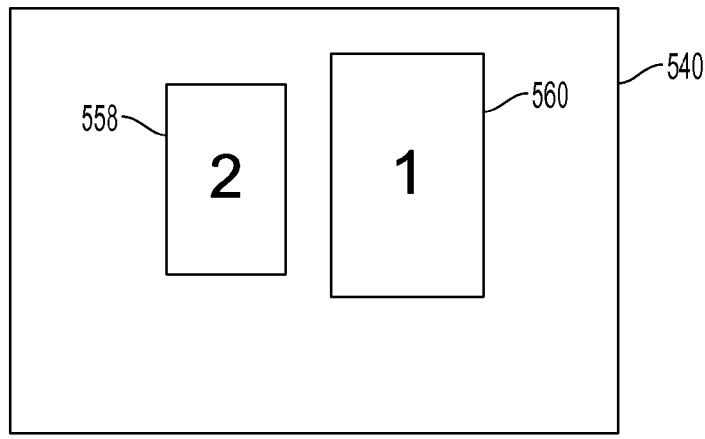
FIG. 5D is a series of diagrams of a multi-touch display device that illustrate a layering operation being performed between two displayed objects for which no pervious under/overlap relationship exists when neither displayed object is tilted under control of a pressure-sensitive tilt control.
Figure 5D:
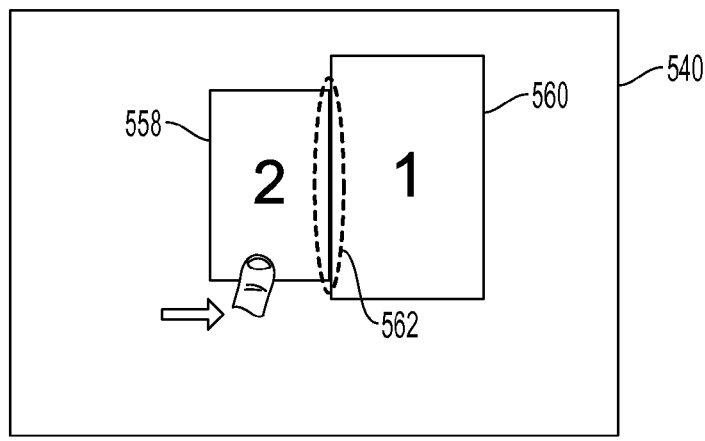
Figure 5D:
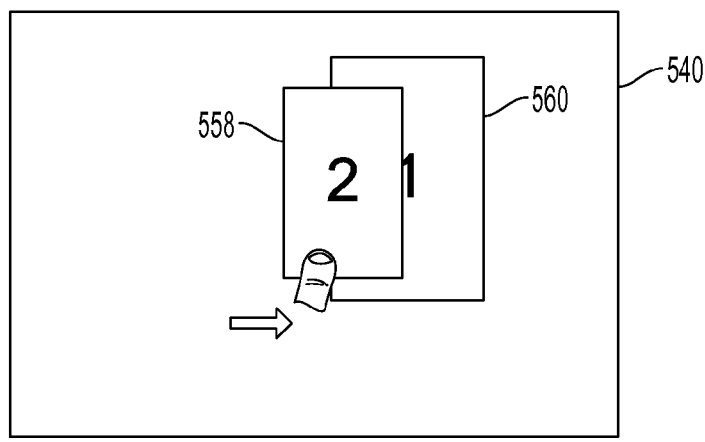

FIG. 5D is a series of diagrams of a multi-touch display device 540 that illustrate a layering operation being performed between two displayed objects 558 and 560 when neither displayed object 558 or 560 is tilted under control of a pressure-sensitive tilt control. As illustrated in FIG. 5D(*a*), the multi-touch display device 540 is displaying objects 558 and 560, and no under/overlap relationship exists between displayed objects 558 and 560. In addition, the multi-touch display device 540 has assigned a global ordering index of "2" to displayed object 558 and a global ordering index of "1" to displayed object 560. As such, when the multi-touch display device 540 renders objects 558 and 560 as illustrated in FIG. 5D(*a*), the multi-touch display device 540 renders displayed object 560 before rendering displayed object 558.

As multi-touch display device 540 translates displayed object 558 toward displayed object 560 under user control as illustrated in FIG. 5D(*b*), the multi-touch display device 540 detects a potential new intersection 562 between displayed objects 558 and 560. In response to detecting the potential new intersection 562, the multi-touch display device 540 determines whether an under/overlap relationship already exists for displayed objects 558 and 560. Because there is no previously-existing under/overlap relationship between displayed objects 558 and 560, the multi-touch display device 540 then determines whether either of displayed objects 558 and 560 currently is being tilted under operation of the pressure-sensitive tilt control. Although the multi-touch display device 540 currently is translating displayed object 558 under user control, neither displayed object 558 or 560 currently is being tilted under operation of the pressure-sensitive tilt control.

Consequently, the multi-touch display device 540 determines that neither displayed object 558 or 560 currently is being tilted under operation of the pressure-sensitive tilt control. Because neither displayed object 558 or 560 currently is being tilted under operation of the pressure-sensitive tilt control, the multi-touch display device 540 compares the global ordering indices of displayed objects 558 and 560 in order to determine how to layer displayed objects 558 and 560. Because displayed object 558 has a higher global ordering index than displayed object 560, the multi-touch display device 540 defines displayed object 558 as the overlapping object and displayed object 560 as the underlapping objects.

Thus, as illustrated in FIG. 5D(c), as the multi-touch display device 540 continues to translate displayed object 558 toward displayed object 560 under user control, the multi-touch display device 558 displays objects 558 and 560 such that displayed object 558 overlaps displayed object 560. The visual effect is that displayed object 558 appears to be being pulled across displayed object 560.

Returning again to FIG. 5A, if the multi-touch display device determines that either of the intersecting displayed objects currently is being tilted under control of the pressure-sensitive tilt control (e.g., if either of the displayed objects has a tilt-value above the specified dead-band threshold) (508), then the multi-touch display device compares the relative depths of the displayed objects in each of their intersecting regions (520). Various different techniques may be employed by the multi-touch display device to compare the depths of the displayed objects in each of their intersecting regions. For example, the multi-touch display device may employ "identity buffer" read-back methods to compare the depths of the displayed objects in each of their intersecting regions. Additionally or alternatively, the multi-touch display device may employ simple geometric analysis to compare the depths of the displayed objects in each of their intersecting regions.

Figure 5E:
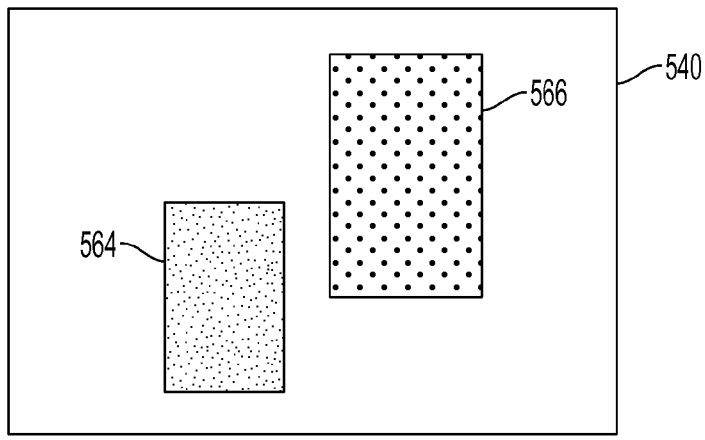
FIGS. 5E-5G are series of diagrams of a multi-touch display device that illustrate layering operations being performed between two displayed objects for which no previous under/overlap relationship exists when either or both of the displayed objects are tilted under control of a pressure-sensitive tilt control and the relative depths of the displayed objects in their intersecting region are consistent.
Figure 5E:
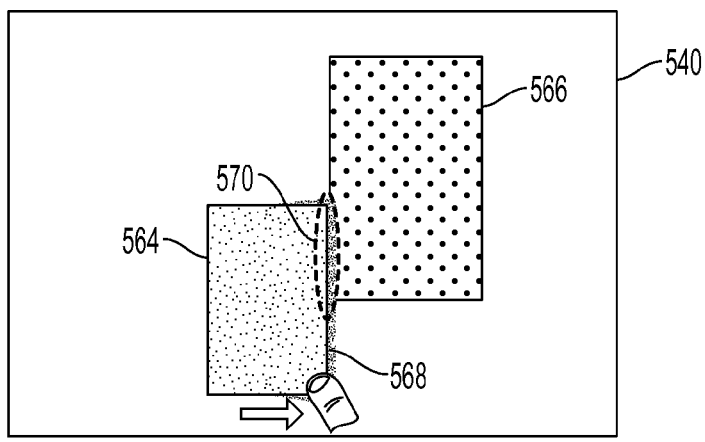
Figure 5E:
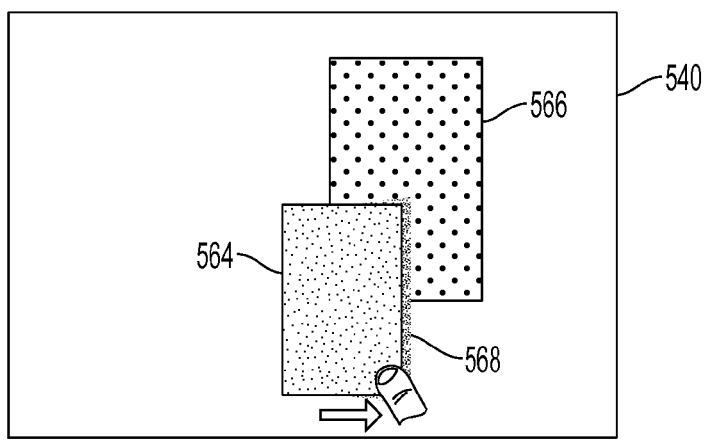
Figure 5F:
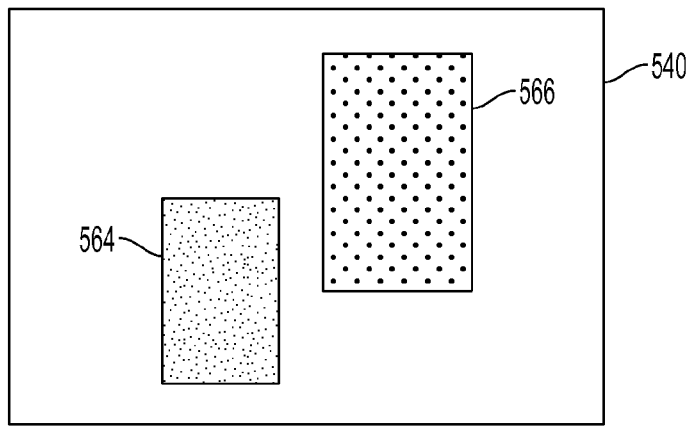
Figure 5F:
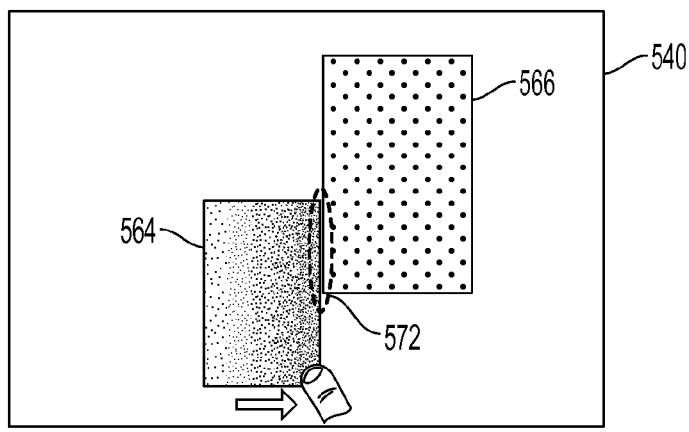
Figure 5F:
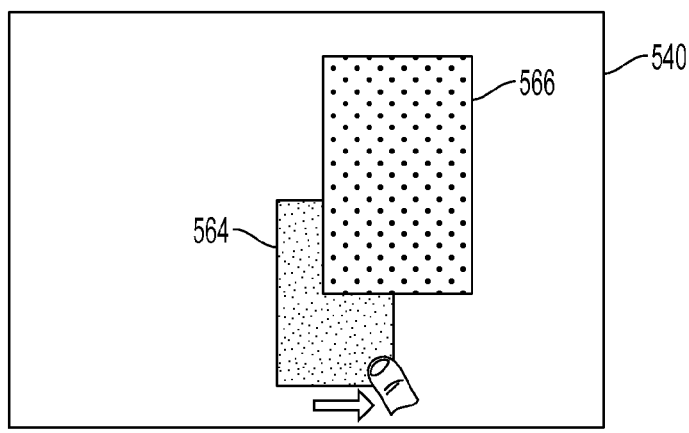
Figure 5G:
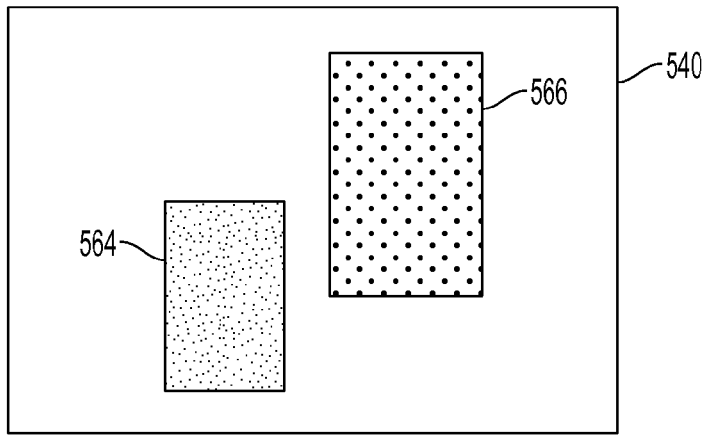
Figure 5G:
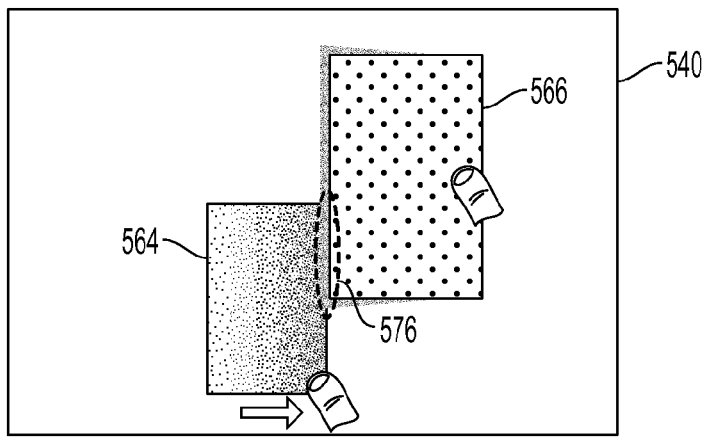
Figure 5G:
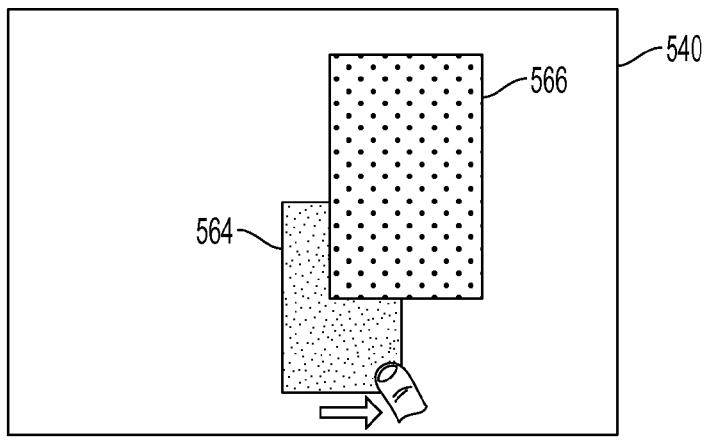

If the relative depths of the two objects are consistent in each of the intersecting regions, the multi-touch display device defines the new under/overlap relationship for the two objects based on the relative depths of the two displayed objects in the intersecting regions. FIGS. 5E-5G are series of diagrams of a multi-touch display device 540 that illustrate layering operations being performed between two displayed objects 564 and 566 when either or both of the displayed objects 564 and 566 are tilted under control of a pressure-sensitive tilt control and the relative depths of the displayed objects 564 and 566 in their intersecting region are consistent.

As illustrated in FIG. 5E(a), the multi-touch display device 540 is displaying objects 564 and 566, and no under/overlap relationship exists between displayed objects 564 and 566. Proceeding to FIG. 5E(b), the multi-touch display device 540 is translating displayed object 564 towards displayed object 566 under user control. In addition, as a function of the pressure being applied to the displayed object 564, the multi-touch display device 540 also is visibly tilting displayed object 564 under the operation of the pressure-sensitive tilt control such that the right-side edge of displayed object 564 is being visibly raised above the plane of the display. To provide a visual cue to the user that the multi-touch display device 540 is visibly tilting displayed object 564 such that the right side of displayed object 564 is raised above the plane of the display, the multi-touch display device applies drop shadow 568 to displayed object 564.

As the multi-touch display device 540 translates tilted displayed object 564 toward displayed object 566 under user control as illustrated in FIG. 5E(b), the multi-touch display device 540 detects a potential new intersection 570 between displayed objects 564 and 566. Because there is no pre-existing under/overlap relationship between displayed objects 564 and 566 and because displayed object 564 currently is being tilted under control of the pressure-sensitive tilt control, the multi-touch display device 540 compares the relative depths of displayed objects 564 and 566 at their intersection 570 to determine how to layer the two displayed objects 564 and 566. Due to the fact that the multi-touch display device 540 is tilting displayed object 564 such that its right side is raised off of the plane of the display, the multi-touch display device determines that the depth of displayed object 564 is higher than the depth of displayed object 566 at their intersection 570. Therefore, the multi-touch display device 540 defines displayed object 564 as the overlapping object and displayed object 566 as the underlapping object.

Thus, as illustrated in FIG. 5E(c), as the multi-touch display device 540 continues to translate displayed object 564 toward displayed object 566 under user control, the multi-touch display device 540 displays objects 564 and 566 such that displayed object 564 overlaps displayed object 566. The visual effect is that displayed object 564 appears to be being pulled across displayed object 566. The user may find this interaction intuitive as it seems to resemble the motion of dragging one piece of paper over another piece of paper.

Referring now to FIG. 5F(a), the multi-touch display device 540 is displaying objects 564 and 566, and no under/overlap relationship exists between displayed objects 564 and 566. Proceeding to FIG. 5F(b), the multi-touch display device 540 is translating displayed object 564 towards displayed object 566 under user control. In addition, as a function of the pressure being applied to the displayed object 564, the multi-touch display device 540 also is visibly tilting displayed object 564 under the operation of the pressure-sensitive tilt control such that the right edge of displayed object 564 is being visibly tilted below the plane of the display.

As the multi-touch display device 540 translates tilted displayed object 564 toward displayed object 566 under user control as illustrated in FIG. 5F(b), the multi-touch display device 540 detects a potential new intersection 572 between displayed objects 564 and 566. Because there is no pre-existing under/overlap relationship between displayed objects 564 and 566 and because displayed object 564 currently is being tilted under control of the pressure-sensitive tilt control, the multi-touch display device 540 compares the relative depths of displayed objects 564 and 566 at their intersection 572 to determine how to layer the two displayed objects 564 and 566. Due to the fact that the multi-touch display device 540 is tilting displayed object 564 such that its right side is pressed below the plane of the display, the multi-touch display device 540 determines that the depth of displayed object 564 is lower than the depth of displayed object 566 at their intersection 572. Therefore, the multi-touch display device 540 defines displayed object 566 as the overlapping object and displayed object 564 as the underlapping object.

Thus, as illustrated in FIG. 5F(c), as the multi-touch display device 540 continues to translate displayed object 564 toward displayed object 566 under user control, the multi-touch display device 540 displays objects 564 and 566 such that displayed object 566 overlaps displayed object 564. The visual effect is that displayed object 564 appears to be being pulled beneath displayed object 566. As with the interaction illustrated in FIG. 5E, the user may find this interaction intuitive as it seems to resemble the motion of dragging one piece of paper over beneath another piece of paper.

Referring now to FIG. 5G(a), the multi-touch display device 540 is displaying objects 564 and 566, and no under/overlap relationship exists between displayed objects 564 and 566. Proceeding to FIG. 5G(b), the multi-touch display device 540 is translating displayed object 564 towards displayed object 566 under user control. In addition, as a function of the pressure being applied to the displayed object 564, the multi-touch display device 540 also is visibly tilting displayed object 564 under the operation of the pressure-sensitive tilt control such that the right edge of displayed object 564 is being visibly tilted below the plane of the display. At the same time, the multi-touch display device 540 also is visibly tilting displayed object 566 as a function of the pressure being applied to displayed object 566 such that the left edge of displayed object 566 is being raised above the plane of the display.

As the multi-touch display device 540 translates tilted displayed object 564 toward displayed object 566 under user control as illustrated in FIG. 5G(b), the multi-touch display device 540 detects a potential new intersection 576 between displayed objects 564 and 566. Because there is no pre-existing under/overlap relationship between displayed objects 564 and 566 and because displayed objects 564 and 566 both currently are being tilted under control of the pressure-sensitive tilt control, the multi-touch display device 540 compares the relative depths of displayed objects 564 and 566 at their intersection 576 to determine how to layer the two displayed objects 564 and 566. Due to the fact that the multi-touch display device 540 is tilting displayed object 564 such that its right side is depressed below the plane of the display while also tilting displayed object 566 such that its left side is raised above the plane of the display, the multi-touch display device 540 determines that the depth of displayed object 564 is lower than the depth of displayed object 566 at their intersection 576. Therefore, the multi-touch display device 540 defines displayed object 566 as the overlapping object and displayed object 564 as the underlapping object.

Thus, as illustrated in FIG. 5G(c), as the multi-touch display device 540 continues to translate displayed object 564 toward displayed object 566 under user control, the multi-touch display device 540 displays objects 564 and 566 such that displayed object 566 overlaps displayed object 564. The visual effect is that displayed object 564 appears to be being pulled beneath displayed object 566. As with the interactions illustrated in FIGS. 5E and 5F, the user may find this interaction intuitive as it seems to resemble the motion of raising on piece of paper and dragging another piece of paper beneath the raised piece of paper.

Returning again to FIG. 5A, if the multi-touch display device determines that the relative depths of the two objects are not consistent in all of the intersecting regions between the two regions (522), the multi-touch display device compares the global ordering indices of the two intersecting objects (510) and defines an under/overlap relationship for the two objects based on the global ordering indices for the two objects (510). In particular, the multi-touch display device defines the displayed object having the higher-order index as the overlapping object and the displayed object having the lower-order index as the underlapping object. In addition, the multi-touch display device may provide some sort of feedback (e.g., visual feedback, audio feedback, audiovisual feedback, etc.) to alert the user to the potential that the layering operation performed by the multi-touch display device may not have been the layering operation that the user intended.

After the multi-touch display device has defined the under/overlap relationship between the two displayed objects, the under/overlap relationship is applied to the two displayed objects (514), the appropriate overlap and underlap lists for the two objects are updated to reflect the applied under/overlap relationship between the two displayed objects (516), and the global ordering index is updated (if appropriate) based on the underlap and overlap lists for the displayed objects (518). Thereafter, the process returns to operation 502 where it awaits detection of another potential new intersection between displayed objects.

Figure 5H:
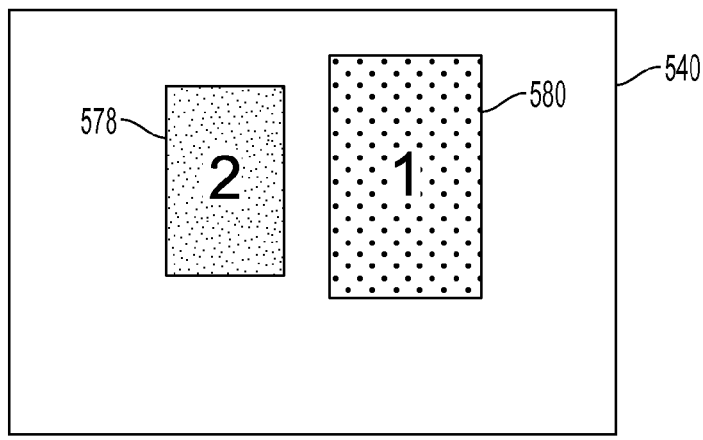
FIG. 5H is a series of diagrams of a multi-touch display device that illustrate a layering operation being performed between two displayed objects for which no previous under/overlap relationship exists when both of the displayed objects are tilted under control of a pressure-sensitive tilt control and the relative depths of the displayed objects are not consistent in their intersecting region.
Figure 5H:
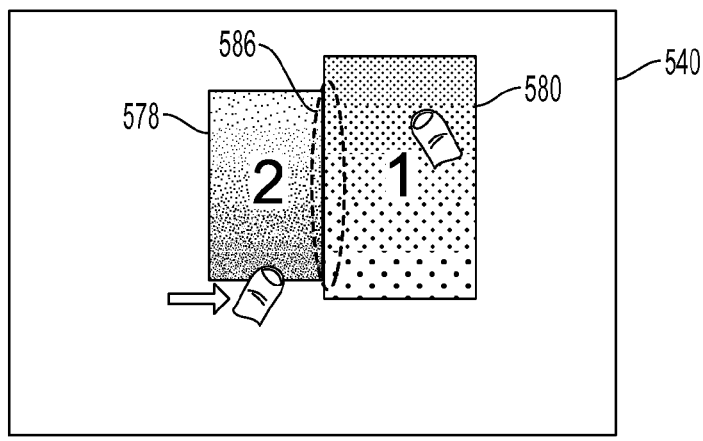
Figure 5H:
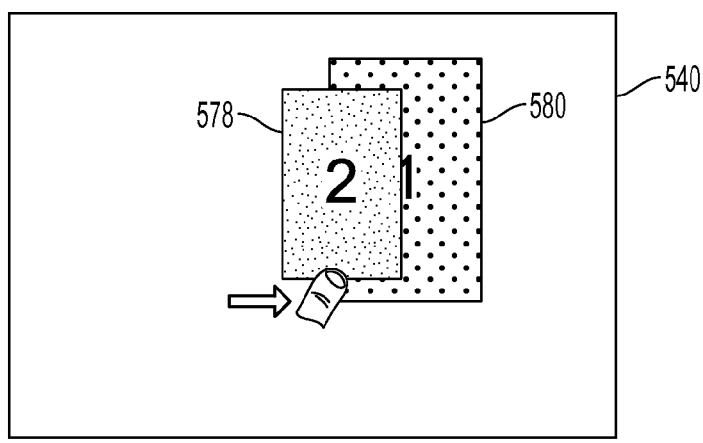

FIG. 5H is a series of diagrams of a multi-touch display device 540 that illustrate a layering operation being performed between two displayed objects 578 and 580 when both of the displayed objects 578 and 580 are tilted under control of a pressure-sensitive tilt control and the relative depths of the displayed objects 578 and 580 are not consistent in their intersecting region. As illustrated in FIG. 5H(a), the multi-touch display device 540 is displaying objects 578 and 580, and no under/overlap relationship exists between displayed objects 578 and 580. In addition, the multi-touch display device 540 has assigned a global ordering index of "2" to displayed object 578 and a global ordering index of "1" to displayed object 580. As such, when the multi-touch display device 540 renders objects 578 and 580 as illustrated in FIG. 5H(a), the multi-touch display device 540 renders displayed object 580 before rendering displayed object 578.

Proceeding to FIG. 5H(b), the multi-touch display device 540 is translating displayed object 578 towards displayed object 580 under user control. In addition, as a function of the pressure being applied to the displayed object 578, the multi-touch display device 540 also is visibly tilting displayed object 578 under the operation of the pressure-sensitive tilt control such that the upper edge of displayed object 578 is being visibly tilted above the plane of the display and the bottom edge of displayed object 578 is depressed below the plane oldie display. At the same time, the multi-touch display device 540 also is visibly tilting displayed object 580 as a function of the pressure being applied to displayed object 580 such that the bottom edge of displayed object 580 is being raised above the plane of the display and the top edge of displayed object 580 is depressed below the plane of the display.

As the multi-touch display device 540 translates tilted displayed object 578 toward tilted displayed object 580 under user control as illustrated in FIG. 5H(b), the multi-touch display device 540 detects a potential new intersection 586 between displayed objects 578 and 580. Because there is no pre-existing under/overlap relationship between displayed objects 578 and 580 and because displayed objects 578 and 580 both currently are being tilted under control of the pressure-sensitive tilt control, the multi-touch display device 540 compares the relative depths of displayed objects 578 and 580 at their intersection 586 to determine how to layer the two displayed objects 578 and 580.

Due to the fact that the multi-touch display device 540 is tilting displayed object 578 such that its top side is raised off of the plane of the display and its bottom side is depressed below the plane of the display while concurrently tilting displayed object 580 such that its bottom side is raised off of the plane of the display and its top side is depressed below the plane of the display, the multi-touch display device 540 determines that the depths of displayed objects 578 and 580 are not consistent in their intersecting region 586. In particular, displayed objects 578 and 580 are tilted such that, in the upper portion of their intersection 586, displayed object 578 is at a lower depth than displayed object 580 and, in the lower portion of their intersection 586, displayed object 580 is at a lower depth than displayed object 578. Due to this inconsistency of the depths of displayed objects 578 and 580 in the region of their intersection 586, the multi-touch display device 540 compares the global ordering indices of displayed objects 578 and 580 in order to determine how to layer displayed objects 578 and 580. Because displayed object 578 has a higher global ordering index than displayed object 580, the multi-touch display device 540 defines displayed object 578 as the overlapping object and displayed object 580 as the underlapping objects.

Thus, as illustrated in FIG. 5H(c), as the multi-touch display device 540 continues to translate displayed object 578 toward displayed object 580 under user control, the multi-touch display device 540 displays objects 578 and 580 such that displayed object 578 overlaps displayed object 580. In addition, in order to alert the user to the potential that the layering operation performed by the multi-touch display device may not have been the layering operation that the user intended, the multi-touch display device 540 may provide some sort of feedback (e.g., visual feedback, audio feedback, audiovisual feedback, etc.) to the user.

As illustrated in FIGS. 5B-5H, potential new intersections are formed between two displayed objects as a result of a two-dimensional RST transformation (e.g., translation) being applied to one of the two displayed objects. It will be appreciated, however, that potential new intersections between two displayed objects also can be formed as a result of two-dimensional RST transformations being applied to both of the displayed objects.

Figure 6A:
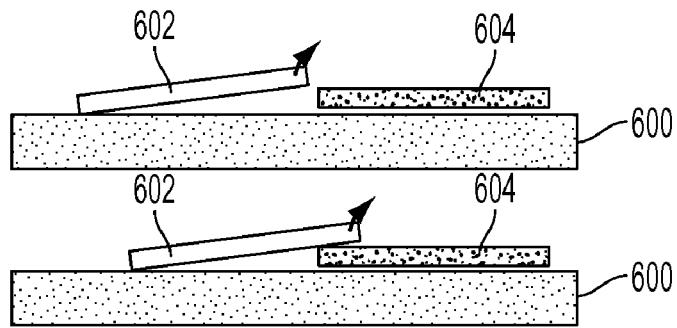
FIG. 6A is a set of diagrams that illustrate examples of three different manipulations enabled by a pressure-sensitive layering control provided by a multi-touch display device for layering one displayed object above another displayed object.
Figure 6A:
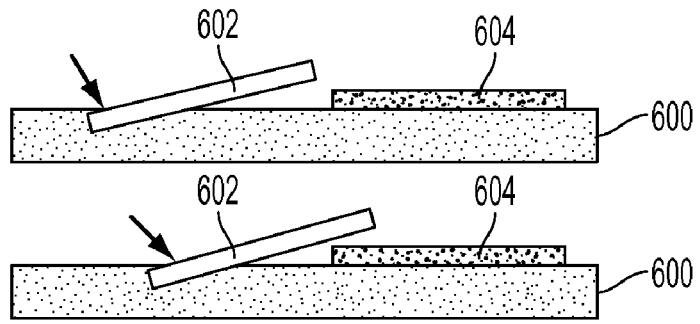
Figure 6A:
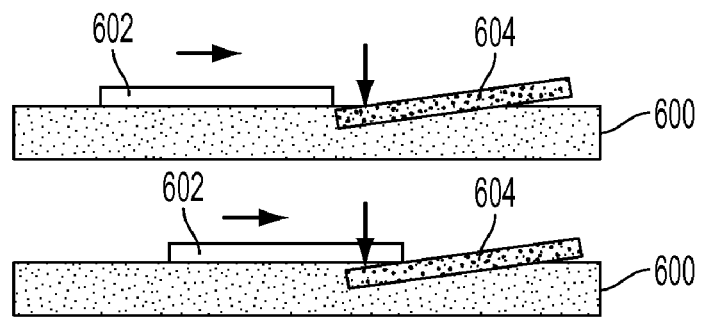

FIG. 6A is a set of diagrams that illustrate examples of three different manipulations enabled by a pressure-sensitive layering control provided by a multi-touch display device 600 for layering one displayed object 602 above another displayed object 604. Referring to FIG. 6A(a), the pressure-sensitive layering control enables a user to layer displayed object 602 over displayed object 604 by first engaging the right side of displayed object 602 with a relatively light amount of pressure so as to raise the right side of displayed object 602 above the plane of the surface and then dragging displayed object 602 over displayed object 604.

Similarly, referring to FIG. 6A(b), the pressure-sensitive layering control enables a user to layer displayed object 602 over displayed object 604 by first engaging the left side of displayed object 602 with a relatively heavy amount of pressure so as to depress the left side of displayed object 602 below the plane of the display consequently raising the right side of displayed object 602 above the plane of the display and then push displayed object 602 over displayed object 604.

FIG. 6A(c) illustrates a third manipulation enabled by the pressure-sensitive layering control to layer displayed object 602 over displayed object 604. As illustrated in FIG. 6A(c), the pressure-sensitive layering control enables a user to layer displayed object 602 over displayed object 604 by first engaging the left side of displayed object 604 with a relatively heavy amount of pressure so as to depress the left side of displayed object 604 below the plane of the display and then dragging displayed object 602 over displayed object 604.

Figure 6B:
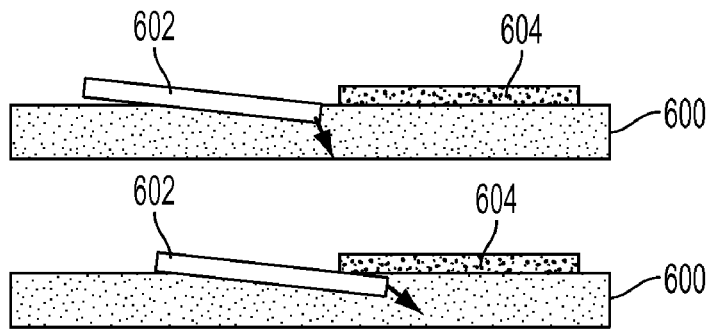
FIG. 6B is a set of diagrams that illustrate examples of three different manipulations enabled by a pressure-sensitive layering control provided by a multi-touch display device for layering one displayed object below another displayed object.
Figure 6B:
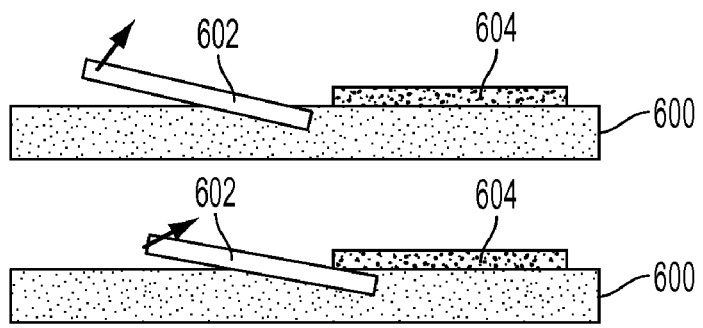
Figure 6B:
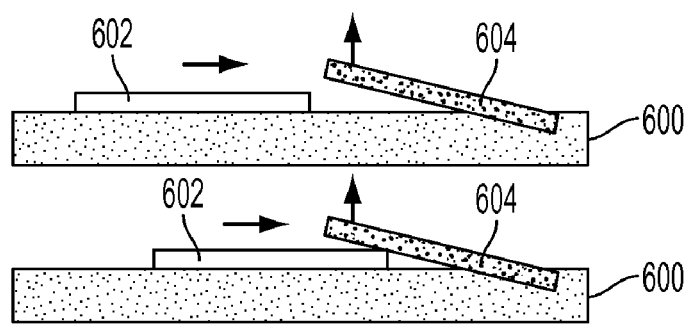

FIG. 6B is a set of diagrams that illustrate examples of three different manipulations enabled by a pressure-sensitive layering control provided by a multi-touch display device 600 for layering one displayed object 602 below another displayed object 604. Referring to FIG. 6B(a), the pressure-sensitive layering control enables a user to layer displayed object 602 below displayed object 604 by first engaging the right side of displayed object 602 with a relatively heavy amount of pressure so as to depress the right side of displayed object 602 below the plane of the surface and then dragging the depressed right side of displayed object 602 below displayed object 604.

Similarly, referring to FIG. 6B(b), the pressure-sensitive layering control enables a user to layer displayed object 602 below displayed object 604 by first engaging the left side of displayed object 602 with a relatively light amount of pressure so as to raise the left side of displayed object 602 above the plane of the display consequently depressing the right side of displayed object 602 below the plane of the display and then push the depressed side of displayed object 602 below displayed object 604.

FIG. 6B(c) illustrates a third manipulation enabled by the pressure-sensitive layering control to layer displayed object 602 below displayed object 604. As illustrated in FIG. 6B(c), the pressure-sensitive layering control enables a user to layer displayed object 602 below displayed object 604 by first engaging the left side of displayed object 604 with a relatively light amount of pressure so as to raise the left side of displayed object 604 above the plane of the display and then dragging displayed object 602 beneath the raised side of displayed object 604.

Depending on the two-dimensional positioning of displayed objects, it may be possible for a user to utilize the pressure-sensitive layering control to layer a displayed object relative to two other displayed objects at substantially the same time. FIG. 7 is a series of diagrams of a multi-touch display device 700 that illustrate the layering of a displayed object 702 above two other displayed objects 704 and 706 at substantially the same time.

Figure 7A:
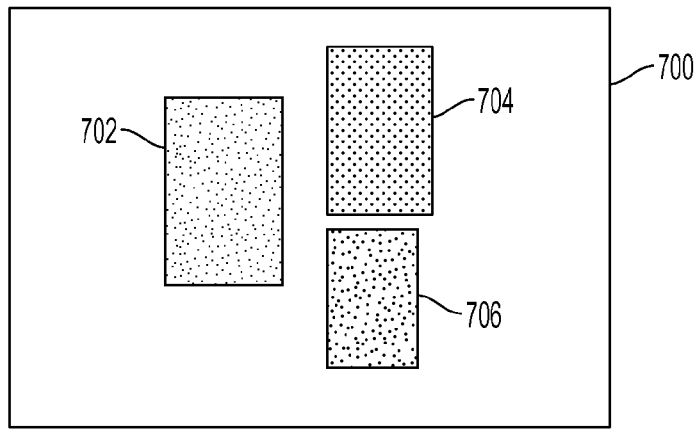
FIG. 7 is a series of diagrams of a multi-touch display device that illustrate the layering of a displayed object above two other displayed objects at substantially the same time.

As illustrated in FIG. 7(a), the multi-touch display device 700 is displaying objects 702, 704, and 706. No under/overlap relationships exist between any of displayed objects 702, 704, and 706, and displayed objects 704 and 706 are positioned such that their left boundaries are substantially aligned.

Figure 7B:
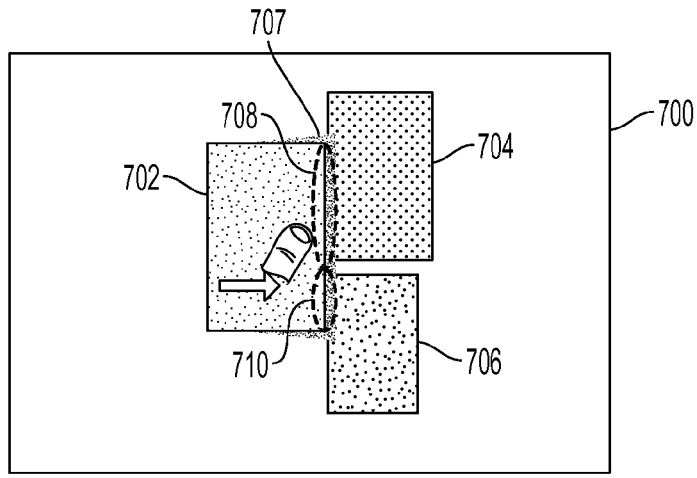
Figure 7C:
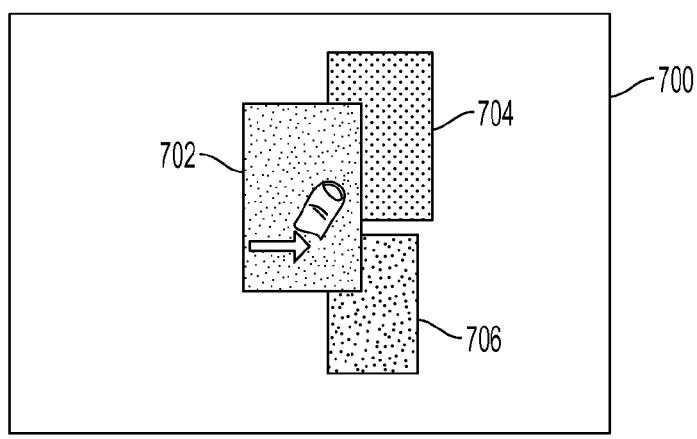
Figure 8A:
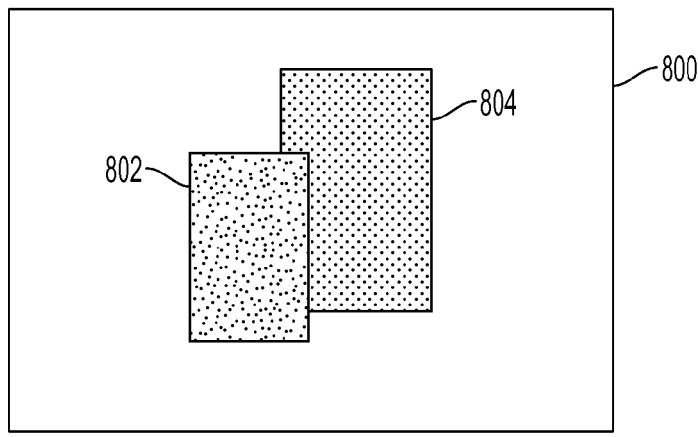
FIG. 8 is a series of diagrams of a multi-touch display device that illustrate a layering operation being performed on two displayed objects such that the order of the layering of the two objects is changed without modifying the two-dimensional positioning of the two displayed objects.
Figure 8B:
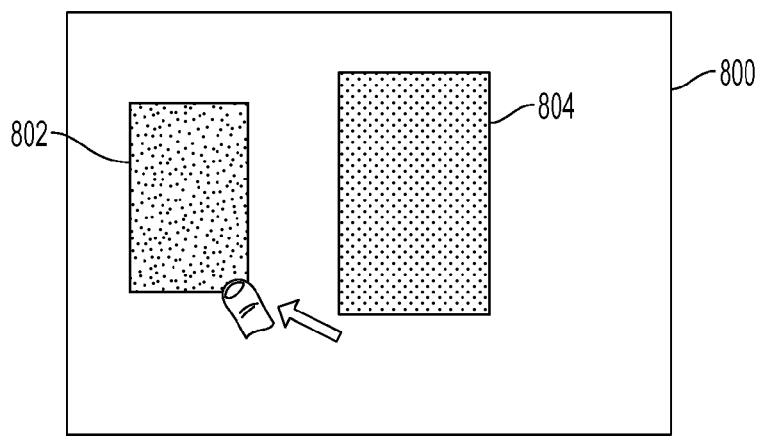
Figure 8C:
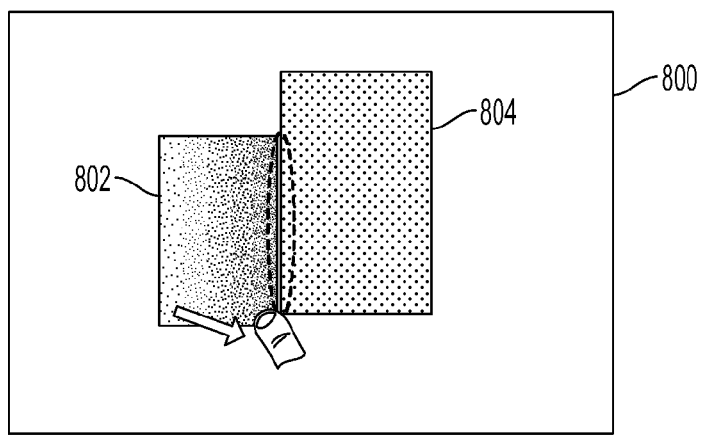
Figure 8D:
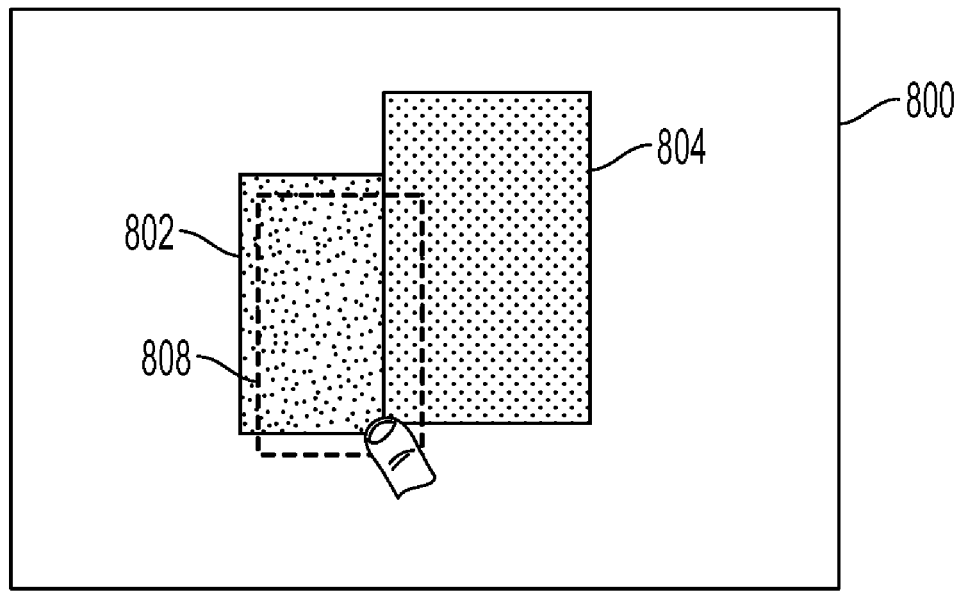
Figure 8E:
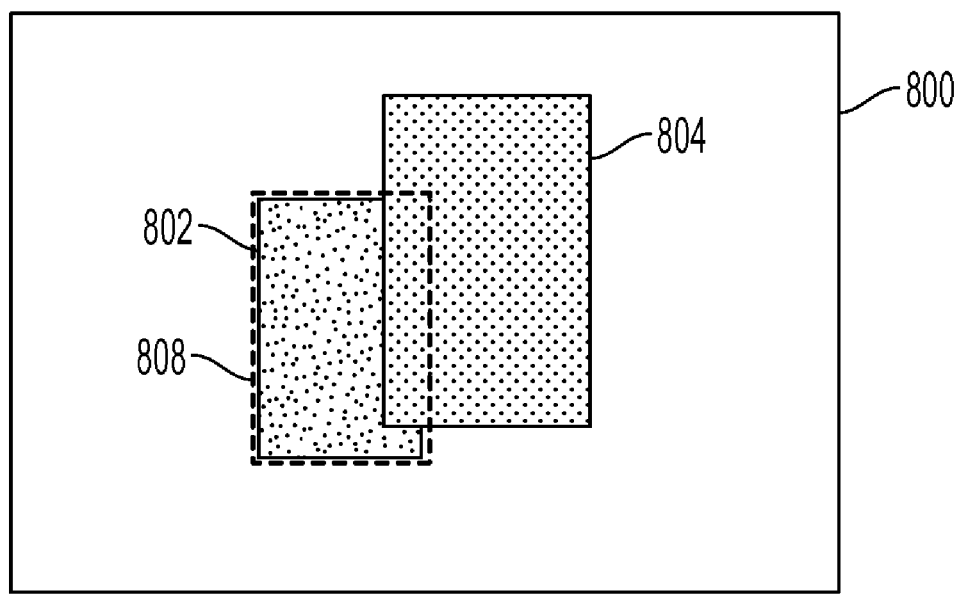

Proceeding to FIG. 7(b), the multi-touch display device 700 is translating displayed object 702 towards displayed objects 704 and 706 under user control. In addition, as a function of the pressure being applied to the displayed object 702, the multi-touch display device 700 also is visibly tilting displayed object 702 under the operation of the pressure-sensitive tilt control such that the right side of displayed object 702 is being visibly tilted above the plane of the display. To provide a visual cue to the user that the multi-touch display device is visibly tilting displayed object 702 such that the right side of displayed object 702 is raised above the plane of the display, the multi-touch display device applies drop shadow 707 to displayed object 702.

As the multi-touch display device 700 translates tilted displayed object 702 toward displayed objects 704 and 706 under user control as illustrated in FIG. 7(b), the multi-touch display device 700 detects potential new intersections 708 and 710 between displayed object 702 and displayed objects 704 and 706 at substantially the same time because the left boundaries of displayed objects 704 and 706 are substantially aligned. Because there is no pre-existing under/overlap relationship between displayed object 702 and either of displayed objects 704 and 706, and because displayed object 702 currently is being tilted under control of the pressure-sensitive tilt control, the multi-touch display device 700 compares the relative depth of displayed object 702 to the relative depths of displayed objects 704 and 706 at their intersections 708 and 710 to determine how to layer displayed object 702 and displayed objects 704 and 706. Due to the fact that the multi-touch display device 700 is tilting displayed object 702 such that its right side is raised above the plane of the display, the multi-touch display device 700 determines that the depth of displayed object 702 is higher than the depths of displayed objects 704 and 706 at their intersections 708 and 710. Therefore, the multi-touch display device 700 defines displayed object 702 as overlapping both displayed objects 704 and 706.

Thus, as illustrated in FIG. 7(*c*), as the multi-touch display device 700 continues to translate displayed object 702 toward displayed objects 704 and 706 under user control, the multi-touch display device 700 displays objects 702, 704, and 706 such that displayed object 702 overlaps displayed objects 704 and 706. The visual effect is that displayed object 702 appears to be being pulled across displayed objects 704 and 706.

As illustrated in FIG. 7, the multi-touch display device 700 layered displayed object 702 above both displayed object 704 and displayed object 706 at substantially the same time. This layering operation is due at least in part to the tilt applied to displayed object 702 such that the right side of displayed object 702 is raised above the plane of the display. It will be appreciated that the multi-touch display device 700 also can layer displayed object 702 below both displayed object 704 and displayed object 706 at substantially the same time. For example, if displayed object 702 is tilted such that the right side of displayed object 702 is pressed below the plane of the display and displayed objects 704 and 706 remain unfilled, the multi-touch display device 700 would layer displayed object 702 beneath both displayed object 704 and displayed object 706 at substantially the same time. Furthermore, the multi-touch display device 700 also can layer displayed object 702 above one of displayed objects 704 and 706 while layering displayed object 702 below the other of displayed objects 704 and 706 at substantially the same time. For example, if displayed object 702 is tilted such that the portion of displayed object 702 that intersects with displayed object 704 is pressed beneath the plane of the display while the portion of displayed object 702 that intersects with displayed object 706 is raised above the plane of the display, the multi-touch display device would layer displayed object 702 beneath displayed object 704 while at substantially the same time laying displayed object 702 above displayed object 706.

As described so far, the pressure-sensitive layering control makes decisions about how to layer two displayed objects relative to each other in response to detecting a potential new intersection between the two displayed objects. This aspect of the pressure-sensitive layering control may prove problematic when two displayed objects already are arranged in an under/overlapping fashion, and the user desires to reorder the layering of the two displayed objects without otherwise modifying the two-dimensional positioning of the two displayed objects. In particular, in order to reorder the layering of the two objects using the pressure-sensitive tilt control, the user may have to modify the two-dimensional positioning of one or both of the two objects to create a potential new intersection between the two displayed objects in order to achieve the desired reordering of the layering of the two displayed objects. The problem that may arise is that after the user has modified the two-dimensional positioning of the two displayed objects and achieved the desired reordering of the layering of the two displayed objects, the user may not remember the precise two-dimensional positioning of the two objects. Thus, although the user has achieved the desired reordering of the layering of the two displayed objects, doing so potentially comes at the cost of having changed the two-dimensional positioning of the two displayed objects.

Various techniques may be employed to mitigate this potential drawback of the pressure-sensitive layering tool. For example, when a displayed object originally at rest is engaged by a finger (or other input mechanism) and brought under user control, the multi-touch display device may store an indication of the two-dimensional position occupied by the displayed object before the displayed object came under user control until such time as the displayed object is relinquished from user control and returned to rest. Then, as the displayed object is translated about the display, if the multi-touch display device detects that the displayed object has been translated hack to a two-dimensional position that is within a threshold displacement of the original two-dimensional position of the displayed object just prior to being released from user control, the multi-touch display device may infer that the user intended for the displayed object to be returned to its original two-dimensional position prior to being brought under control. As a result, when the user relinquishes control of the displayed object, the multi-touch display device may automatically return the displayed object to its original two-dimensional position notwithstanding that the displayed object is not positioned precisely at its original two-dimensional position. FIG. 8 is illustrative.

FIG. 8 is a series of diagrams of a multi-touch display device 800 that illustrate a layering operation being performed on two displayed objects 802 and 804 such that the order of the layering of the two objects 802 and 804 is changed without modifying the two-dimensional positioning of the two displayed objects 802 and 804. As illustrated in FIG. 8(*a*), multi-touch display device 800 is displaying objects 802 and 804 such that displayed object 802 overlaps displayed object 804. Consider the case when a user desires to reorder the layering of displayed objects 802 and 804 such that displayed object 804 overlaps displayed object 802 without otherwise modifying the two-dimensional positioning of displayed objects 802 and 804.

As illustrated in the progression of FIGS. 8(*b*)-8(*c*), in order to reorder the layering of displayed objects 802 and 804, the user takes control of displayed object 802 and translates displayed object 802 away from displayed object 804 such that no under/overlap relationship exists between displayed objects 802 and 804 anymore. Meanwhile, in response to the user taking control of displayed object 802, the multi-touch display device 800 records the original two-dimensional position of displayed object 802 before the user took control of displayed object 802. After ending the previous under/overlap relationship between displayed objects 802 and 804 by translating displayed object 802 away from displayed object 804, the user then translates displayed object 802 back towards displayed object 804 in order to accomplish the desired reordering of the layering between displayed objects 802 and 804.

As the multi-touch display device 800 translates displayed object 802 hack toward displayed object 804 under user control as illustrated in FIG. 8(*c*), the multi-touch display device 800 also visibly tilts displayed object 802 under the operation of the pressure-sensitive tilt control such that the right side of displayed object 802 is depressed below the plane of the display as a function of the pressure being applied by the user to displayed object 802. As will he appreciated, the pressure applied by the user to cause the multi-touch display device 800 to tilt displayed object 802 such that the right side of displayed object 802 is depressed below the plane of the display is an indication of the user's intent that the multi-touch display device 800 layer displayed object 802 beneath displayed object 804.

As the multi-touch display device 800 translates tilted displayed object 802 toward displayed object 804 under user control as illustrated in FIG. 8(*c*), the multi-touch display device 800 detects a potential new intersection 806 between displayed objects 802 and 804. Because the previous under/overlap relationship between displayed objects 802 and 804 no longer exists and because displayed object 802 currently is being tilted under control of the pressure-sensitive tilt control, the multi-touch display device 800 compares the relative depths of displayed objects 802 and 804 at their intersection 806 to determine how to layer the two displayed objects 802 and 804. Due to the fact that the multi-touch display device 800 is tilting displayed object 802 such that its right side is depressed below the plane of the display, the multi-touch display device 800 determines that the depth of displayed object 802 is lower than the depth of displayed object 804 at their intersection 806. Therefore, the multi-touch display device 800 defines displayed object 804 as the overlapping object and displayed object 802 as the underlapping object.

Thus, as illustrated in FIG. 8(*d*), as the multi-touch display device 800 continues to translate displayed object 802 toward displayed object 804 under user control, the multi-touch display device 800 displays objects 802 and 804 such that displayed object 804 now overlaps displayed object 802. As such, the user has successfully achieved the desired reordering of the layering of displayed objects 802 and 804. However, displayed object 802 still remains displaced from the original two-dimensional position that it occupied before being brought under control by the user.

In order to facilitate the repositioning of displayed object 802 in its original two-dimensional position before being brought under control by the user, the multi-touch display device 800 monitors the two-dimensional position of displayed object 802, and, when the multi-touch display device 800 detects that displayed object 802 has been returned to within a threshold displacement of its original two-dimensional position, the multi-touch display device 800 renders a visual cue indicating the original two-dimensional position of displayed object 802. Thus, as illustrated in FIG. 8(*d*), as the multi-touch display device 800 translates displayed object 802 hack toward its original two-dimensional position, the multi-touch display device 800 renders dashed outline 808 indicating the original two-dimensional position of displayed object 802.

The dashed outline 808 not only indicates to the user the original two-dimensional position of displayed object 802, but the dashed outline 808 also serves as a visual cue to the user that if the user relinquishes control of displayed object 802 while the multi-touch display device 800 is displaying the dashed outline 808 (i.e., while the displayed object 802 is within a threshold displacement of its original two-dimensional position), the multi-touch display device 800 automatically will return displayed object 802 to its original two-dimensional position without requiring the user to precisely position displayed object 802 in its original two-dimensional position.

Thus, as illustrated in FIG. 8(*e*), in response to the user relinquishing control of displayed object 802 while displayed object 802 is within a threshold displacement of its original two-dimensional position and while dashed outline 808 remains displayed, the multi-touch display device 800 automatically has returned displayed object 802 to its original two-dimensional position without the user having had to precisely position displayed object 802 in its original two-dimensional position. The net effect of the manipulations illustrated in FIG. 8 and described above is that the user was able to achieve the desired reordering of the layering of displayed objects 802 and 804 using the pressure-sensitive layering control without altering the original two-dimensional positioning of displayed objects 802 and 804.

In some implementations, the multi-touch display device 800 may require that a displayed object (e.g., displayed object 802) be displaced from its original two-dimensional position by some threshold distance before displaying a visual cue (e.g., dashed outline 808) indicating the displayed object's original two-dimensional position and/or before automatically returning the displayed object to its original two-dimensional position upon the user relinquishing control of the displayed object. Otherwise, fine-tuned manipulations of the two-dimensional position of the displayed object may be difficult or impossible to achieve.

As described and illustrated throughout, the pressure-sensitive layering control can be utilized by a user to perform layering operations on displayed objects while concurrently performing other multi-point RST transformations on the same displayed objects. Moreover, the pressure-sensitive layering control and the multi-point RST orientation controls are capable of being activated from similar hand positions, thereby enabling a user to switch from one control to the next without the cognitive load of having to change the pose of his/her hand or rearranging of his/her fingers on a displayed object. The result may be to encourage the use of natural bimanual manipulation behaviors and staging patterns that occur in real-world arrangement tasks.

Techniques for Revealing Occluded Content

The object to object layering operations described above were described and illustrated in the context of displayed objects having boundaries that are visible and/or accessible. However, as scenes displayed on a multi-point display device grow more and more complex, not all of the objects displayed on the multi-point display may have visible and/or accessible boundaries. That is to say, objects displayed on a multi-point display device may be partially or fully occluded by other displayed objects. Nevertheless, a user still may be interested in viewing and/or reordering the layering of objects that are partially or fully occluded by other displayed objects. Therefore, techniques are disclosed for revealing occluded content on a multi-point display device. As described more fully below, these techniques can be coupled with the pressure-sensitive tilt and layering controls described above.

As will be demonstrated in the following description, object folding and peeling provide simple metaphors for searching through and revealing occluded content. Furthermore, such folding and peeling metaphors are consistent with the pressure-sensitive layering metaphor described above. A pressure-sensitive object folding/peeling control provided by a multi-touch display device may enable a user to fold back or peel away an edge of an occluding object to reveal other objects below the occluding object by contacting an empty region of the screen with a finger (or other input mechanism) with a sufficient amount of pressure to depress "below" the occluding object and then dragging the user's finger across a boundary of the occluding object. When the user's finger (or other input mechanism) intersects the boundary of the occluding object while maintaining sufficient pressure to depress "below" the occluding object, the multi-touch display device folds/peels back the boundary of the occluding object as a function of the path traced by the user's finger (or other input mechanism).

Figure 9A:
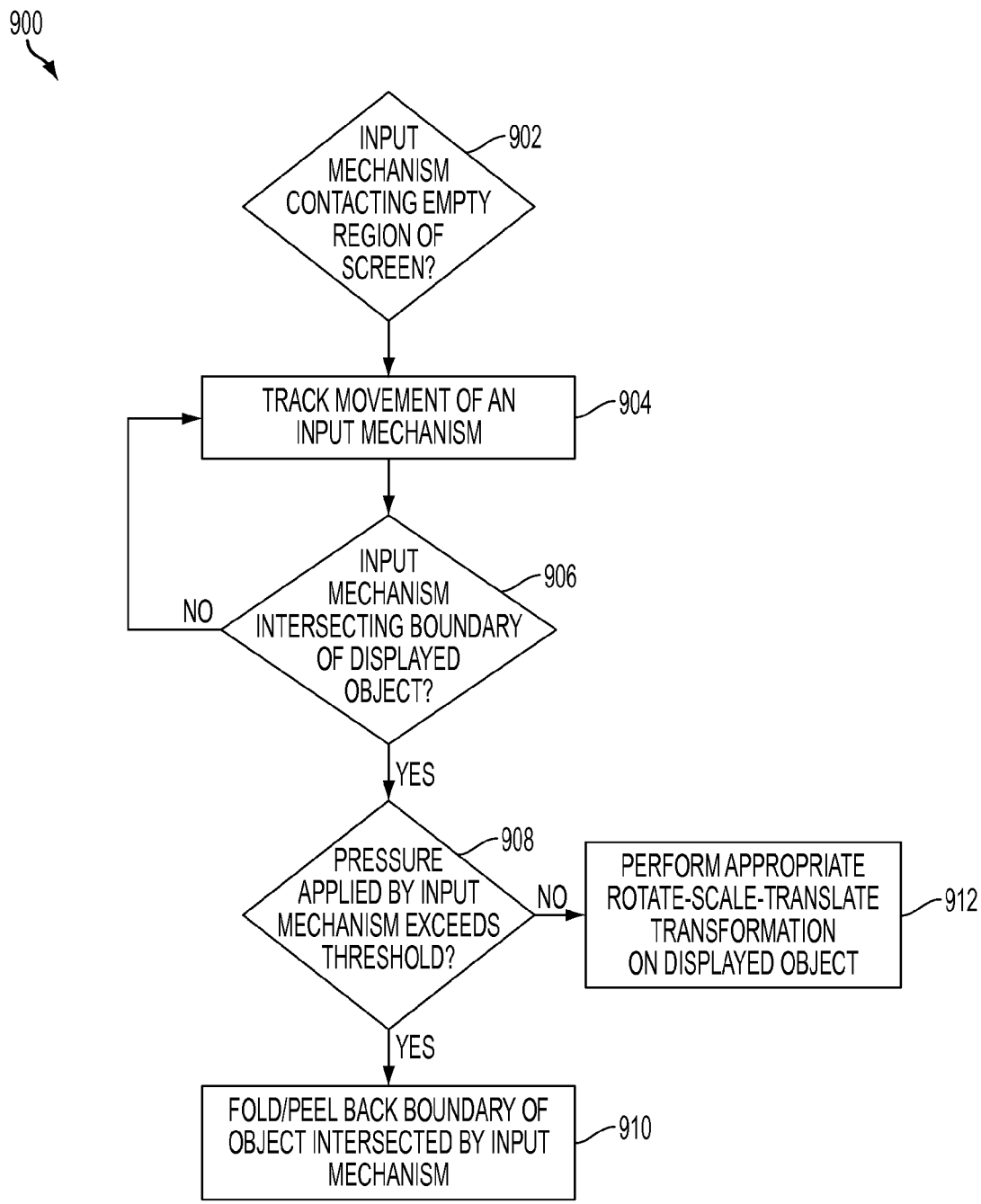
FIG. 9A is a flowchart of a process for implementing a pressure-sensitive object folding/peeling control.

FIG. 9A is a flowchart 900 of a process for implementing a pressure-sensitive object folding/peeling control. The process illustrated in flow chart 900 of FIG. 9A may be implemented by a pressure-sensitive multi-point display device such as, for example, the pressure-sensitive multi-touch display device 200 of FIG. 2A with logical operations in the process being performed by, for example, the computing system 214.

The process 900 begins when the multi-touch display device detects an input mechanism contacting the multi-touch display device in an empty region of the screen (902). In response to detecting the input mechanism contacting the empty region of the screen, the multi-touch display device tracks the movement of the input mechanism while it remains in contact with the screen (904).

In response to detecting that the input mechanism is intersecting the boundary of a displayed object (906), the multi-touch display device determines whether the pressure applied by the input mechanism at the contact point intersecting the boundary of the displayed object exceeds a threshold pressure value. If the multi-touch display device determines that the pressure applied by the input mechanism at the contact point intersecting the boundary of the displayed object exceeds the threshold pressure value (908), the multi-touch display device folds/peels back a portion of the displayed object as a function of subsequent movements by the input mechanism (910). For example, as the input mechanism moves about the multi-touch display device, the multi-touch display device calculates and applies a fold operation to the displayed object that results in a portion of the displayed object being folded back on top of itself such that the contact point on the boundary of the displayed object remains located substantially beneath the input mechanism. In some implementations, the multi-touch display device may provide one or more visual cues to emphasize that the portion of the displayed object has been folded/peeled back. For example, the multi-touch display device may apply different shading to the folded/peeled back portion of the multi-touch display device than the multi-touch display device applies to the remaining portion of the displayed object.

Through this pressure sensitive object folding/peeling control, the multi-touch display device provides a user with the ability to view and/or access content that otherwise may be occluded and inaccessible to the user.

In some implementations, the threshold pressure value required to be applied in order to trigger the folding/peeling back of a portion of a displayed object may be the same for all displayed objects. In alternative implementations, the threshold pressure value may be dependent upon the displayed object. For example, the multi-touch display device may require a user to apply more pressure to trigger the folding/peeling back of portions of some objects than the multi-touch display device requires to trigger the folding/peeling back of other objects. In fact, in some implementations, the amount of pressure that the multi-touch display device requires to trigger the folding/peeling back of a portion of a particular displayed object may be a function of the global ordering index of the displayed object and/or a virtual layer at which the displayed object is displayed. In such implementations, the multi-touch display device may require a user to apply a relatively heavy amount of pressure to trigger the folding/peeling back of displayed objects having relatively low global ordering indices and/or displayed objects that are displayed at relative low virtual layers, while requiring a relatively light amount of pressure to trigger the folding/peeling back of displayed objects having relatively high global ordering indices and/or displayed objects that are displayed at relatively high virtual layers.

Figure 9B:
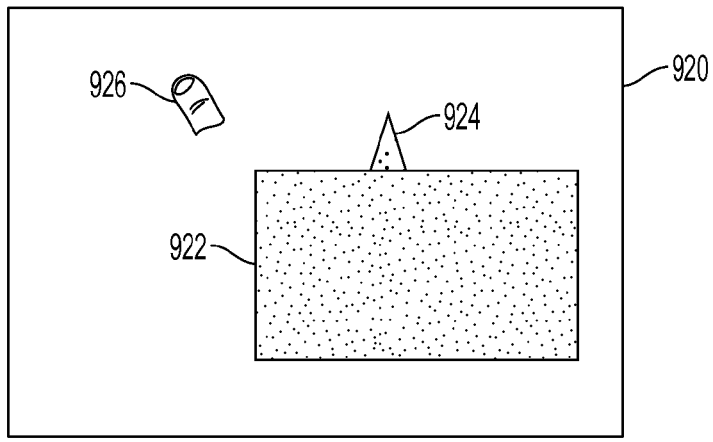
FIG. 9B is a series of diagrams of a multi-touch display device that illustrate a folding/peeling operation being performed.
Figure 9B:
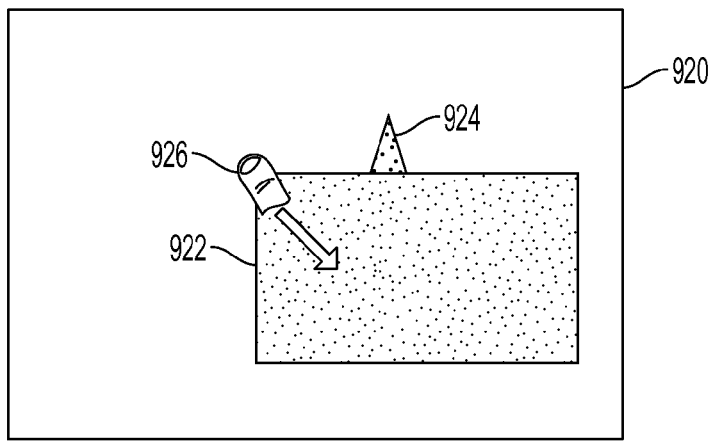
Figure 9B:
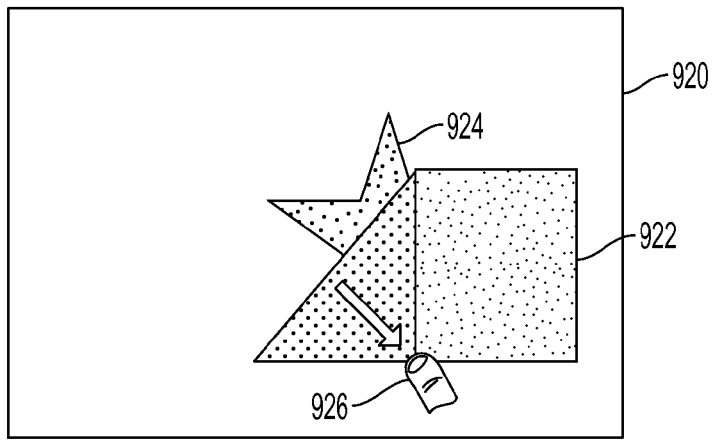

FIG. 9B is a series of diagrams of a multi-touch display 920 device that illustrate a folding/peeling operation being performed. As illustrated in FIG. 9B, a multi-touch display device 920 is displaying objects 922 and 924 such that displayed object 922 overlaps and occludes displayed object 924. In addition, a user is contacting the multi-touch display device 920 with a finger 926 in an empty region of the screen. As illustrated in the series of diagrams presented in FIG. 9B, as the user drags his/her finger 926 across the screen in a generally downward and rightward direction, the multi-touch display device 920 detects that the user's finger 926 is intersecting the upper left corner of displayed object 922 and that the user's finger 926 is contacting the multi-touch display device 920 with sufficient pressure to "depress" below displayed object 922. In response, as the user's finger 926 continues along its generally downward and rightward trajectory, the multi-touch display device 920 folds/peels back the upper left corner of displayed object 922 as a function of the path traced by the user's finger 926 such that the point on displayed object 922 initially contacted by the user's finger 926 remains substantially below the user's finger 926.

As the multi-touch display device 920 continually calculates and applies the appropriate folding/peeling operations to displayed object 922, the multi-touch display device continually updates the scene displayed on the multi-touch display device to reflect the folding/peeling operations applied to displayed object 922. As part of the process of updating the displayed scene, the multi-touch display device identifies content (e.g., other displayed objects, empty space, etc.) that previously was occluded by the folded/peeled back portion of displayed object 922 and updates the display such that such content that previously was occluded by the folded/peeled hack portion of displayed object 922 is revealed. For example, as a result of the multi-touch display device 920 folding/peeling back the upper left corner of displayed object 922, the multi-touch display device 920 reveals a larger portion of displayed object 924, thereby making a larger portion of displayed object 924 visible and accessible to the user. In some implementations, the multi-touch display device 920 may treat displayed object 922 as being folded/peeled back completely on top of itself such that the unfolded portion of object 922 and the folded portion of object 922 both lie on the same plane.

Returning to FIG. 9A, if the multi-touch display device detects that the input mechanism is intersecting the boundary of the displayed object (906) but determines that the pressure applied by the input mechanism at the contact point intersecting the boundary of the displayed object does not exceed the threshold pressure value (908), the multi-touch display device does not fold/peel back the boundary of the displayed object but rather performs an appropriate RST transformation on the displayed object as a function of the input mechanisms currently contacting the displayed object.

The pressure-sensitive object folding/peeling control described above can be coupled with the pressure-sensitive layering control described above to enable a user to perform layering operations involving displayed objects that otherwise might be occluded and/or inaccessible to the user.

Figures 10A, 10B:
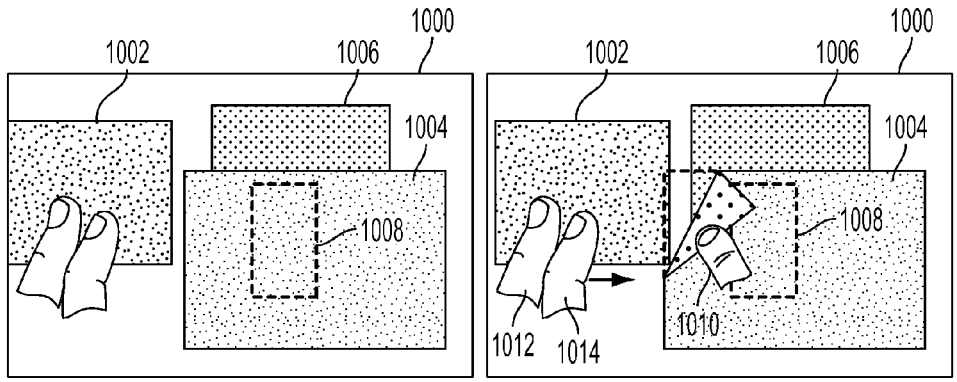
FIG. 10 is a series of diagrams of a multi-touch display device 1000 that illustrate the concurrent implementation of a pressure-sensitive layering control and a pressure-sensitive object folding/peeling control.
Figures 10C, 10D:
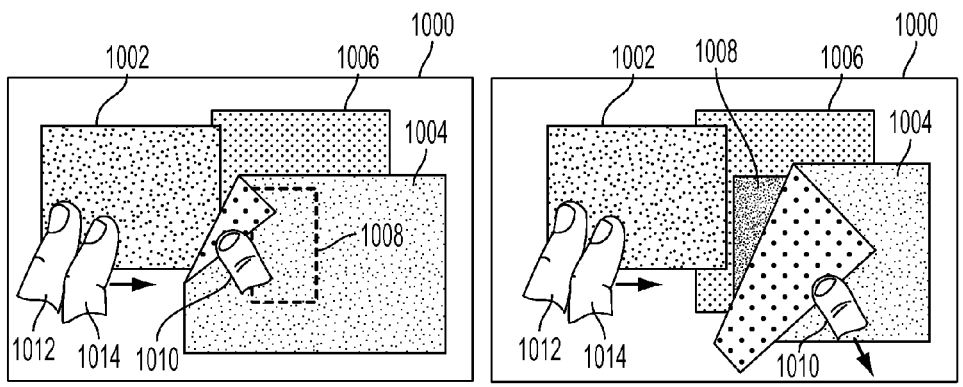

FIG. 10 is a series of diagrams of a multi-touch display device 1000 that illustrate the concurrent implementation of a pressure-sensitive layering control and a pressure-sensitive object folding/peeling control. As illustrated in FIG. 10, the multi-touch display device 1000 is displaying objects 1002, 1004, 1006, and 1008 such that displayed objects 1004, 1006, and 1008 form a cluster of under/overlapping objects while displayed object 1002 is isolated from the cluster of objects 1004, 1006, and 1008. Furthermore, displayed object 1004 partially overlaps displayed object 1006 and fully overlaps displayed object 1008 such that displayed object 1008 is completely occluded by displayed object 1004.

As illustrated in FIG. 10(*b*), a user has activated a pressure-sensitive object folding/peeling control provided by the multi-touch display device 1000 with a finger 1010 causing the multi-touch display device 1000 to fold/peel back the upper left corner of displayed object 1004 such that a larger portion of the left boundary of displayed object 1006 is visible and accessible to the user. In addition, the user also is controlling displayed object 1002 with fingers 1012 and 1014 causing the multi-touch display device 1000 to translate displayed object 1002 in a generally rightward direction across the multi-touch display device 1000 as a function of the movement of fingers 1012 and 1014.

As illustrated in FIG. 10(*b*), the translation of displayed object 1002 has brought displayed object 1002 into a region that previously was occupied by the upper left corner of displayed object 1004 before the multi-touch display device 1000 folded/peeled hack the upper left corner of displayed object 1004. As such, if the multi-touch display device 1000 had not folded/peeled back the upper left corner of displayed object 1004, the multi-touch display device 1000 would have performed a layering operation in response to detecting the potential new intersection of displayed objects 1002 and 1004. However, because the multi-touch display device 1000 has folded/peeled back the upper left corner of displayed object 1004, the multi-touch display device 1000 treats the boundary of displayed object 1004 as being formed by the fold in displayed object 1004 and, therefore, does not perform a layering operation because no potential intersection between the boundaries of displayed objects 1002 and 1004 has occurred yet.

By folding/peeling back the upper left corner of displayed object 1000, the multi-touch display device 1000 makes a larger portion of the left boundary of displayed object 1006 visible and accessible to the user, which may enable the user to more easily perform a layering operation between displayed objects 1002 and 1006 because, for example, the user has a view of a larger portion of any potential intersection between the right-side boundary of displayed object 1002 and the left-side boundary of displayed object 1006.

As illustrated in FIG. 10(*c*), the multi-touch display device 1000 has translated displayed object 1002 further to the right under user control. Furthermore, the multi-touch display device 1000 has performed layering operations on both displayed objects 1002 and 1006 and displayed objects 1002 and 1004 due to the new intersections caused between displayed object 1004 and displayed objects 1006 and 1004 by the rightward translation of displayed object 1002. In particular, the multi-touch display device 1000 has layered displayed objects 1002 and 1006 such that displayed object 1002 overlaps displayed object 1006, while layering displayed objects 1002 and 1004 such that displayed object 1004 overlaps displayed object 1002.

As will he appreciated, the layering operations performed by the multi-touch display device 1000 on displayed objects 1002 and 1006 and displayed objects 1002 and 1004 were performed in accordance with the pressure-sensitive layering control described above. In particular, upon detecting a new potential intersection between the right-side edge of displayed object 1002 and the left-side edge of displayed object 1006, the multi-touch display device 1000 compared the relative depths of the right-side edge of displayed object 1002 and the left-side edge of displayed object 1006, and, as a consequence on the pressure applied to displayed object 1002 by fingers 1012 and 1014, determined that the right-side edge of displayed object 1002 was at a higher depth than the left side edge of displayed object 1006. Accordingly, the multi-touch display device layered displayed objects 1002 and 1006 such that displayed object 1002 is overlapping displayed object 1006.

Similarly, upon detecting a new potential intersection between the right-side edge of displayed object 1002 and the fold along the left side of displayed object 1004, the multi-touch display device 1000 compared the relative depths of the right-side edge of displayed object 1002 and the fold along the left side of displayed object 1004, and, as a consequence on the pressure applied to displayed object 1002 by fingers 1012 and 1014 and the pressure applied to displayed object 1004 by finger 1010, determined that the right-side edge of displayed object 1002 was at a lower depth than the fold along the left side of displayed object 1004. Accordingly, the multi-touch display device 1000 layered displayed objects 1002 and 1004 such that displayed object 1004 is overlapping displayed object 1002.

As illustrated in FIG. 10(*d*), in response to detecting continued movement by finger 1010 in a generally downward and rightward direction, the multi-touch display device 1000 has folded/peeled back the upper left corner of displayed object 1004 even further to reveal a portion of displayed object 1008. In addition, the multi-touch display device 1000 also has translated displayed object 1002 further to the right under user control.

Further folding/peeling back the upper left corner of displayed object 1004 to reveal a portion or displayed object 1008 may enable the user to more easily perform a layering operation between displayed objects 1002 and 1008 because the user now has a view of any potential new intersection between the right-side boundary of displayed object 1002 and the left-side boundary of displayed object 1008. Had the multi-touch display device 1000 not further folded/peeled back the upper left corner of displayed object 1004, displayed object 1008 would have remained fully occluded by displayed object 1004 and the user would have had no view of a potential new intersection between the right-side boundary of displayed object 1002 and the left-side boundary of displayed object 1008.

As illustrated in HG. 10(*e*), the multi-touch display device 1000 has translated displayed object 1002 further to the right under user control. Furthermore, the multi-touch display device 1000 also has performed a layering operation on displayed objects 1002 and 1008 due to the potential new intersection that was caused between displayed objects 1002 and 1008 by the further rightward translation of displayed object 1002. In particular, the multi-touch display device 1000 has layered displayed objects 1002 and 1008 such that displayed object 1008 overlaps displayed object 1002.

As will be appreciated, the layering operation performed by the multi-touch display device 1000 on displayed objects 1002 and 1008 was performed in accordance with the pressure-sensitive layering control described above. In particular, upon detecting a potential new intersection between the right-side edge of displayed object 1002 and the left-side edge of displayed object 1008, the multi-touch display device 1000 compared the relative depths of the right-side edge of displayed object 1002 and the left-side edge of displayed object 1008, and, as a consequence on the pressure applied to displayed object 1002 by fingers 1012 and 1014, determined that the right-side edge of displayed object 1002 was at a lower depth than the left-side edge of displayed object 1008. Accordingly, the multi-touch display device 1000 layered displayed objects 1002 and 1008 such that displayed object 1008 is overlapping displayed object 1002.

Figures 10E, 10F:
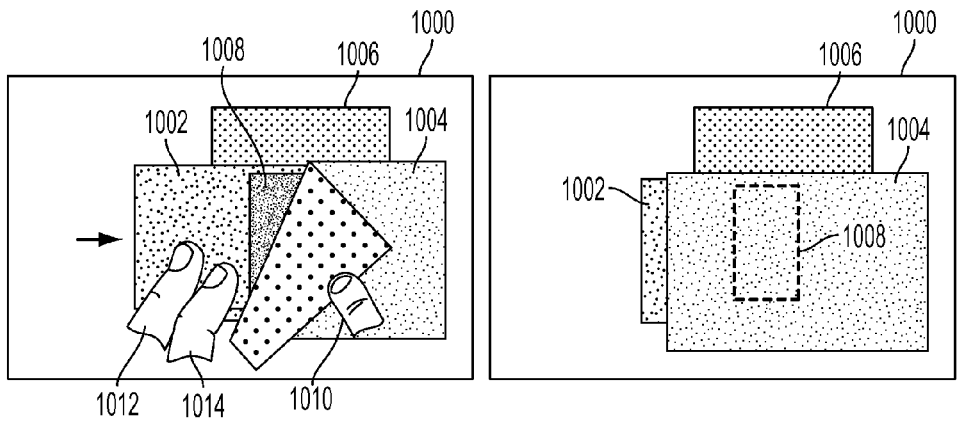

As illustrated in FIG. 10(f), when the user relinquishes control of displayed object 1004 by releasing finger 1010 from the multi-touch display device 1000, the multi-touch display device 1000 unfurls the previously folded/peeled back corner of displayed object 1004 such that it returns to its original two-dimensional position.

As described above in connection with FIG. 10, in some implementations, when a multi-touch display device folds/peels back a portion of a displayed object under control of a pressure-sensitive object folding/peeling control, the multi-touch display device treats the fold in the object as defining a portion of the boundary of the folded object for the purposes of performing layering operations rather than treating the boundary of the folded object as the original boundary of the unfolded object. While the object remains folded, displayed objects can be layered above and/or below the folded portion of the folded object. When the multi-touch display device ultimately unfurls the folded portion of the displayed object, any layering defined while the displayed object was folded is preserved such that the folded portion of the displayed object unfurls over objects underlapping the folded portion of the displayed object and under objects overlapping the folded portion of the displayed object.

Furthermore, as also discussed above, in some implementations, when a multi-touch display device folds/peels back a portion of a displayed object under control of a pressure-sensitive folding/peeling control, the multi-touch display device treats the displayed object as having been folded/peeled back completely on top of itself such that the unfolded portion and the folded portion of the displayed object both lie in the same plane. Thus, when the multi-touch display device performs layering operations on the folded object that involve the folded portion of the folded object, the multi-touch display device calculates the relative depth of the folded portion of the folded object based on the plane on which both the folded portion and the unfolded portion of the displayed object lie.

By defining the boundary of a folded object to include the fold of the folded object instead of treating the boundary of the folded object as the original boundary of the folded object and by treating the folded object as being folded back completely on top of itself such that the folded and unfolded portions of the displayed object both lie on the same plane, a multi-touch display device can perform pressure-sensitive layering operations that involve a folded object by applying the same techniques described above, keeping in mind that potential intersections with the displayed object are defined by the boundary of the displayed object that includes the fold, not the original boundary of the displayed object before the object was folded.

FIGS. 11A-11D are series of diagrams of a multi-touch display device that illustrate layering operations involving a folded object.

Figure 11A:
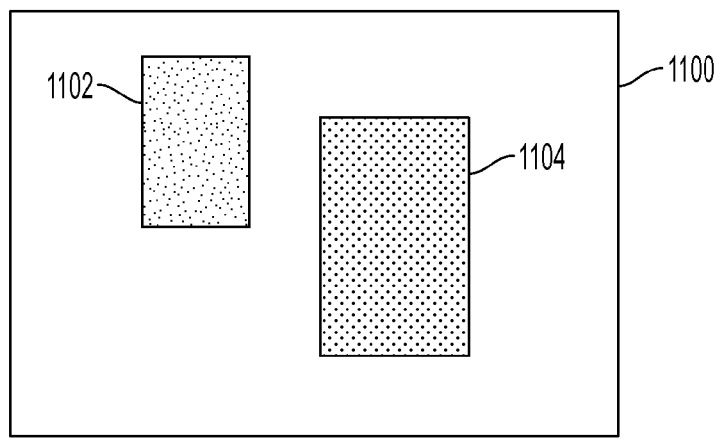
FIGS. 11A-11E are series of diagrams of a multi-touch display device that illustrate layering operations involving a folded object.

As illustrated in FIG. 11A, multi-touch display device 1100 is displaying objects 1102 and 1104 such that initially there is no under/overlapping relationship between displayed objects 1102 and 1104. In response to activation of the object folding/peeling control by finger 1106, the multi-touch display device 1100 folds/peels back the upper left corner of displayed object 1104. While the upper left corner of displayed object 1104 remains folded/peeled back and in response to user control of object 1102 by Finger 1106, the multi-touch display device 1100 also translates displayed object 1102 in a rightward direction such that displayed object 1102 would have under/overlapped displayed object 1104 if the upper left corner of displayed object 1104 had not been folded/peeled back. However, because the multi-touch display device 1100 has folded/peeled back the upper left corner of displayed object 1104, displayed object 1102 does not under/overlap displayed object 1104.

When finger 1106 relinquishes control of displayed object 1104, the multi-touch display device unfurls the upper left corner of displayed object 1104. Because no previous under/overlap relationship existed between displayed objects 1102 and 1104, when the multi-touch display device 1100 unfurls the upper left corner of displayed object 1104, it displays objects 1102 and 1104 such that displayed object 1104 is overlapping displayed object 1102 a. In this manner, the pressure-sensitive folding/peeling control also operates as a layering control.

In some implementations, as the multi-touch display device 1100 is unfurling a folded/peeled back portion of a displayed object, the multi-touch display device 1100 treats the folded/peeled back portion of the displayed object as being raised above the plane of the display as the folded/peeled back portion of the displayed object is unfurled. Therefore, in situations such as that illustrated in FIG. 11A, when the folded/peeled back portion of a displayed object 1104 is unfurled into a region occupied by another displayed object 1102 for which no previous under/overlap relationship exists, the multi-touch display device defines the displayed object 1104 that is being unfurled as overlapping the other displayed object 1102. Additionally or alternatively, in some implementations, the multi-touch display device 1100 may treat and visually display a folded/peeled back portion of a displayed object that is being unfurled as being rolled out from its folded/peeled back position.

Figure 11B:
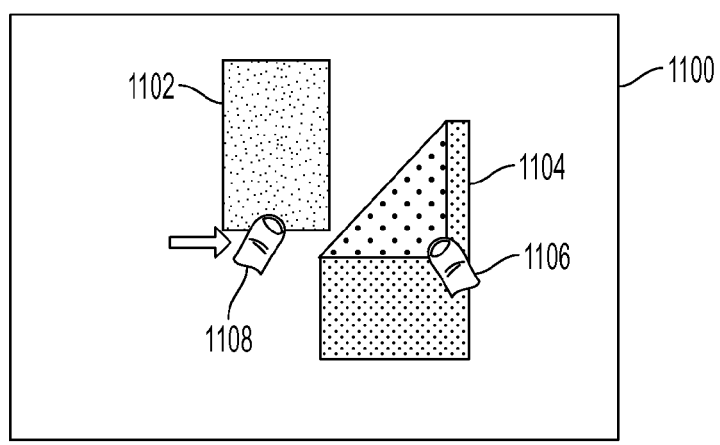

Referring now to FIG. 11B, multi-touch display device 1100 is displaying objects 1102 and 1104 such that initially there is no under/overlapping relationship between displayed objects 1102 and 1104. In response to activation of the object folding/peeling control by finger 1106, the multi-touch display device 1100 folds/peels back the upper left corner of displayed object 1104. While the upper left corner of displayed object 1104 remains folded/peeled hack and in response to user control of object 1102 by finger 1106, the multi-touch display device 1100 also translates displayed object 1102 in a rightward direction such that the lower right corner of displayed object 1102 intersects with the fold of displayed object 1104.

In response to detecting the potential new intersection 1110 between displayed objects 1102 and 1104 and because no previous under/overlap relationship exists between displayed objects 1102 and 1104, the multi-touch display device 1100 compares the relative depths of displayed objects 1102 and 1104 at their intersection 1110 to determine how to layer displayed objects 1102 and 1104. Based on the pressure being applied to displayed object 1102 by finger 1108, the multi-touch display device 1100 determines that the depth of displayed object 1102 is lower than the depth of displayed object 1104 at their intersection 1110. Therefore, the multi-touch display device 1100 defines displayed object 1104 as the overlapping object and displayed object 1102 as the underlapping object.

Thus, as the multi-touch display device 1100 continues to translate displayed object 1102 to the right under control of finger 1108, the multi-touch display device 1100 displays objects 1102 and 1104 such that displayed object 1104 overlaps displayed object 1102. Thereafter, when finger 1106 relinquishes control of displayed object 1104 and the multi-touch display device 1100 unfurls the upper left corner of displayed object 1104 in response, the multi-touch display device 1100 unfurls the upper left corner of displayed object 1104 such that it overlaps displayed object 1102 because the multi-touch display device 1100 defined displayed object 1104 as overlapping displayed object 1102.

Figure 11C:
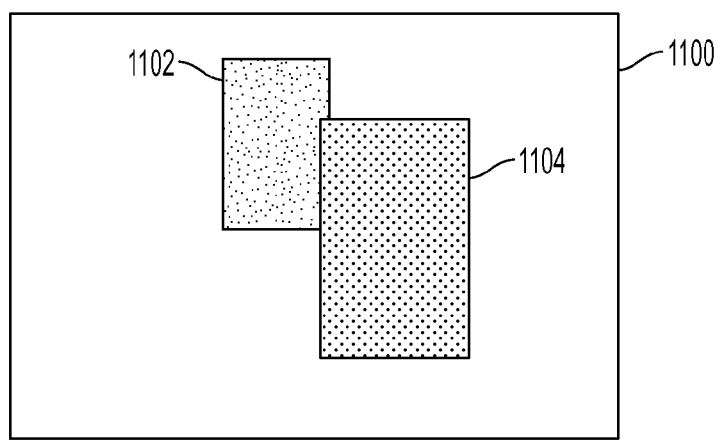
Figure 11B:
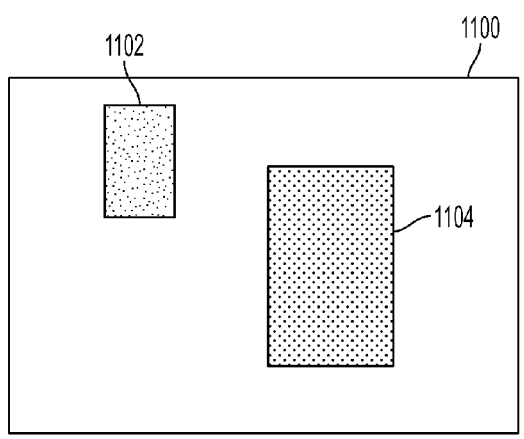
Figure 11B:
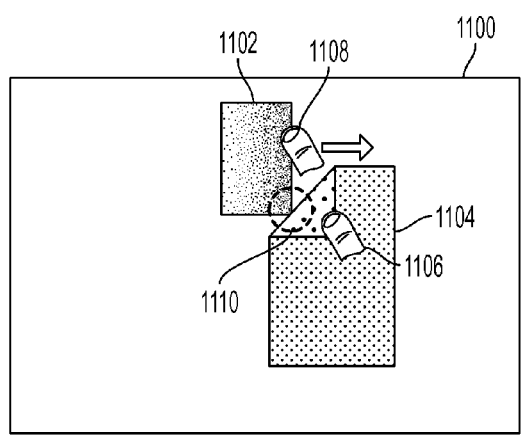
Figure 11B:
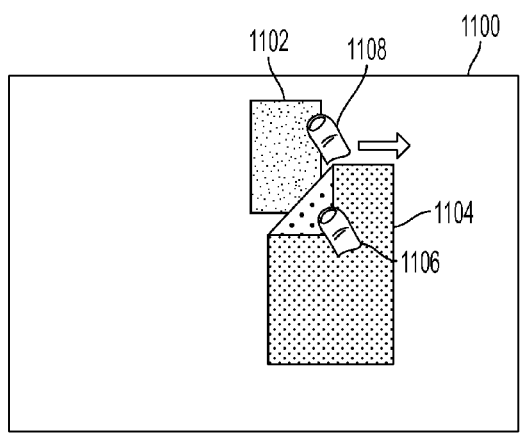
Figure 11B:
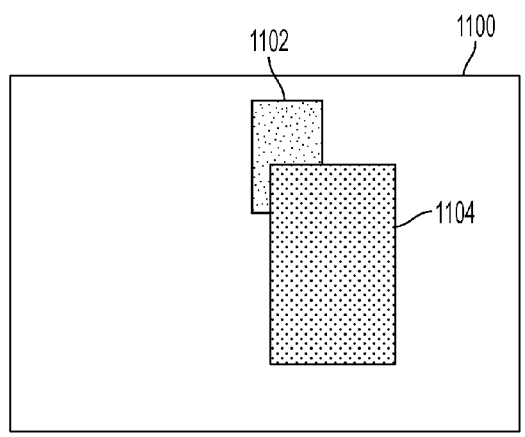
Figure 11C:
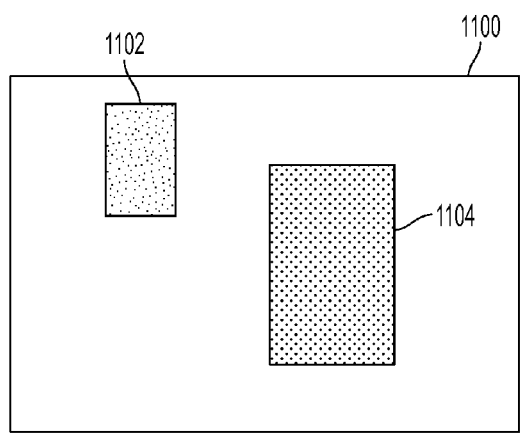
Figure 11C:
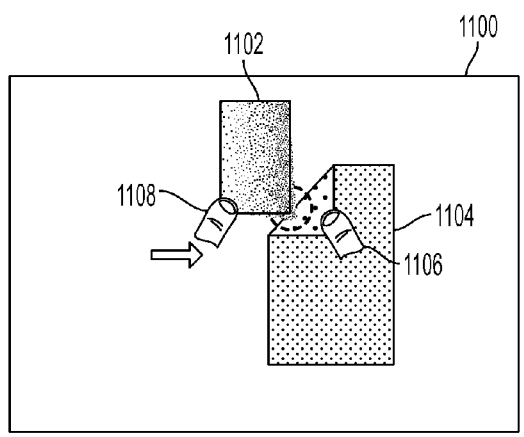
Figure 11C:
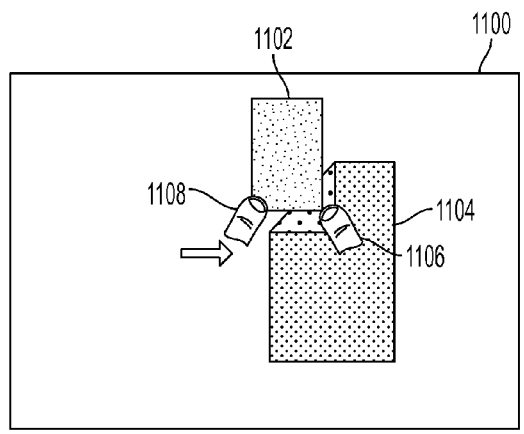
Figure 11C:
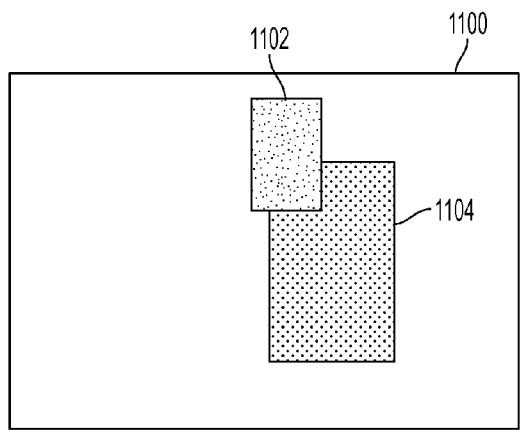

Referring now to FIG. 11C, multi-touch display device 1100 is displaying objects 1102 and 1104 such that initially there is no under/overlapping relationship between displayed objects 1102 and 1104. In response to activation of the object folding/peeling control by finger 1106, the multi-touch display device 1100 folds/peels hack the upper left corner of displayed object 1104. While the upper left, corner of displayed object 1104 remains folded/peeled back and in response to user control of object 1102 by finger 1106, the multi-touch display device 1100 also translates displayed object 1102 in a rightward direction such that the lower right corner of displayed object 1102 intersects with the fold of displayed object 1104.

In response to detecting the potential new intersection 1112 between displayed objects 1102 and 1104 and because no previous under/overlap relationship exists between displayed objects 1102 and 1104, the multi-touch display device 1100 compares the relative depths of displayed objects 1102 and 1104 at their intersection 1112 to determine how to layer displayed objects 1102 and 1104. Based on the pressure being applied to displayed object 1102 by finger 1108, the multi-touch display device 1100 determines that the depth of displayed object 1102 is higher than the depth of displayed object 1104 at their intersection 1112. Therefore, the multi-touch display device 1100 defines displayed object 1102 as the overlapping object and displayed object 1104 as the underlapping object.

Thus, as the multi-touch display device 1100 continues to translate displayed object 1102 to the right under control of finger 1108, the multi-touch display device 1100 displays objects 1102 and 1104 such that displayed object 1102 overlaps displayed object 1104. Thereafter, when finger 1106 relinquishes control of displayed object 1104, and the multi-touch display device 1100 unfurls the upper left corner of displayed object 1104 in response, the multi-touch display device 1100 unfurls the upper left corner of displayed object 1104 such that it underlaps displayed object 1102 because the multi-touch display device 1100 defined displayed object 1104 as underlapping displayed object 1102.

Figure 11D:
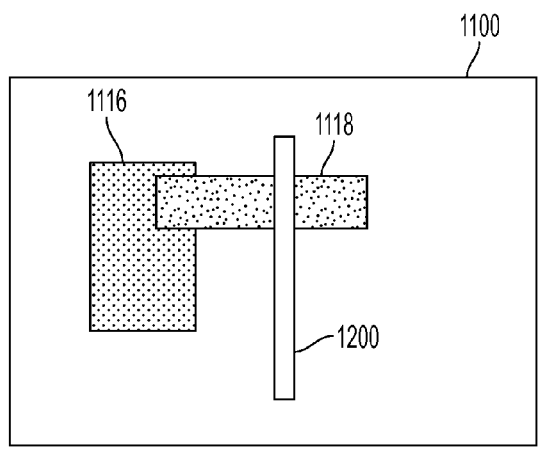
Figure 11D:
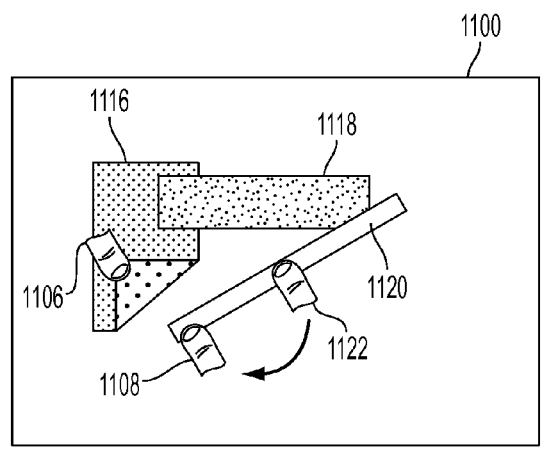
Figure 11D:
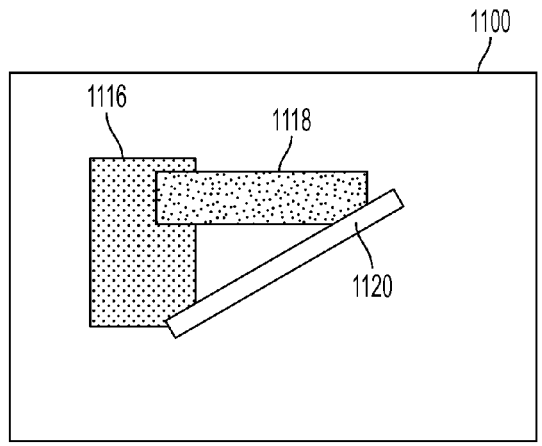

Referring now to FIG. 11D, multi-touch display device 1100 is displaying objects 1116, 1118, and 1120 such that displayed object 1118 overlaps displayed object 1116 while displayed object 1120 overlaps displayed object 1118. Thus, an indirect under/overlap relationship exists between displayed objects 1116 and 1120 by virtue of the pair-wise under/overlap relationships between displayed objects 1116 and 1118 and displayed objects 1118 and 1120. In particular, displayed object 1120 is displayed at a higher virtual layer than displayed object 1116 due to the fact that displayed object 1118 overlaps displayed object 1116 and displayed object 1120 overlaps displayed object 1118.

In response to activation of the object folding/peeling control by finger 1106, the multi-touch display device 1100 folds/peels back the lower right corner of displayed object 1116. While the lower right corner of displayed object 1116 remains folded/peeled back and in response to user control of displayed object 1120 by fingers 1108 and 1122, the multi-touch display device 1100 also rotates displayed object 1120 in a clockwise direction such that the lower end of displayed object 1120 occupies a region of the screen that would have been occupied by the lower right corner of displayed object 1116 if the multi-touch display device 1110 had not folded/peeled back the lower right corner of displayed object 1116.

Thereafter, when finger 1106 relinquishes control of displayed object 1116 and the multi-touch display device 1100 unfurls the lower right corner of displayed object 1116 in response, the multi-touch display device 1100 unfurls the lower right corner of displayed object 1116 such that it underlaps displayed object 1120. This is because, as described above, an under/overlap relationship already exists between displayed objects 1116 and 1120 and the multi-touch display device 1100 preserves that pre-existing under/overlap relationship when unfurling the lower right corner of displayed object 1116.

Figure 11E:
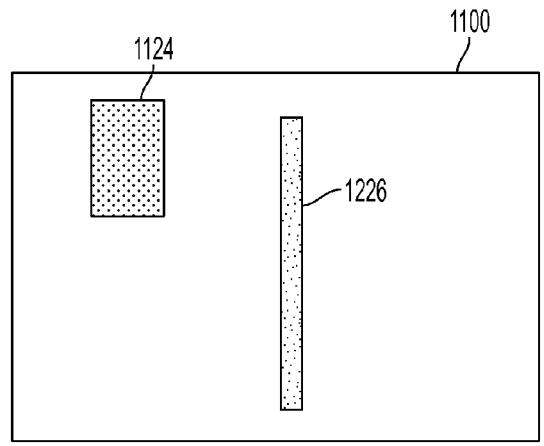
Figure 11E:
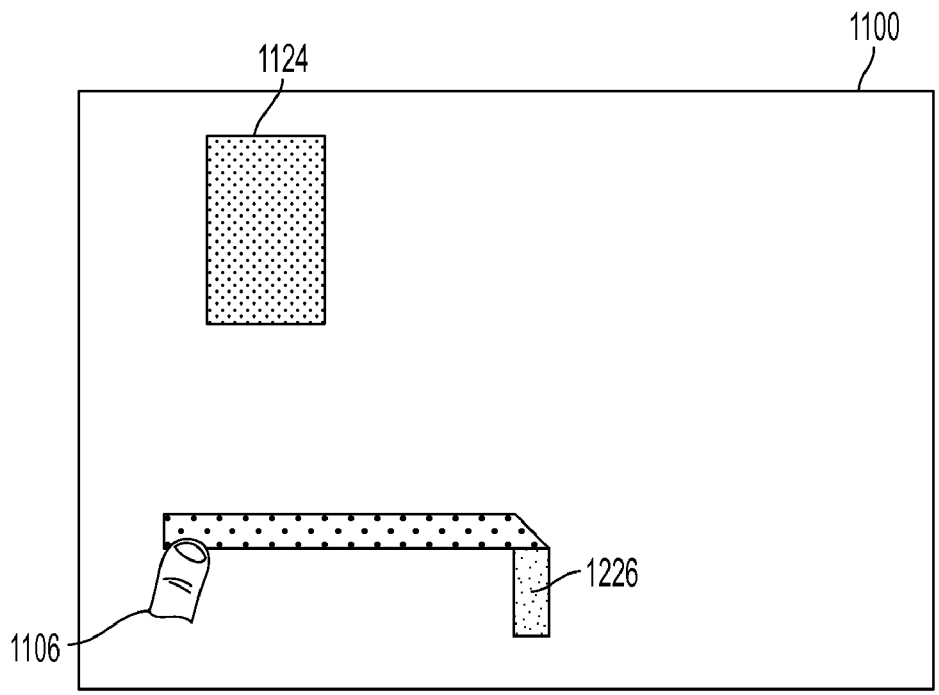
Figure 11E:
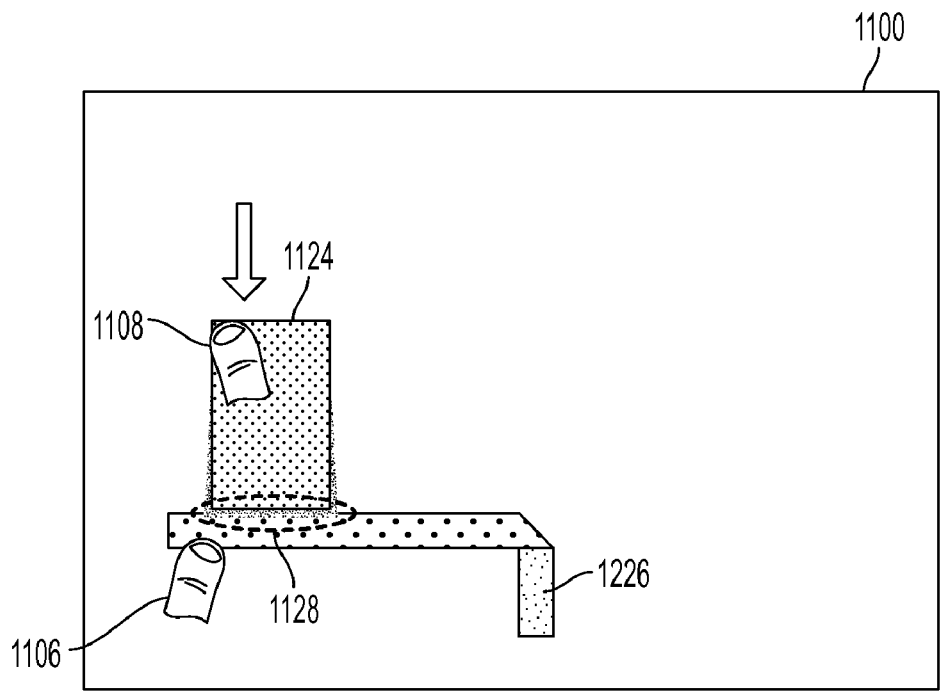
Figure 11E:
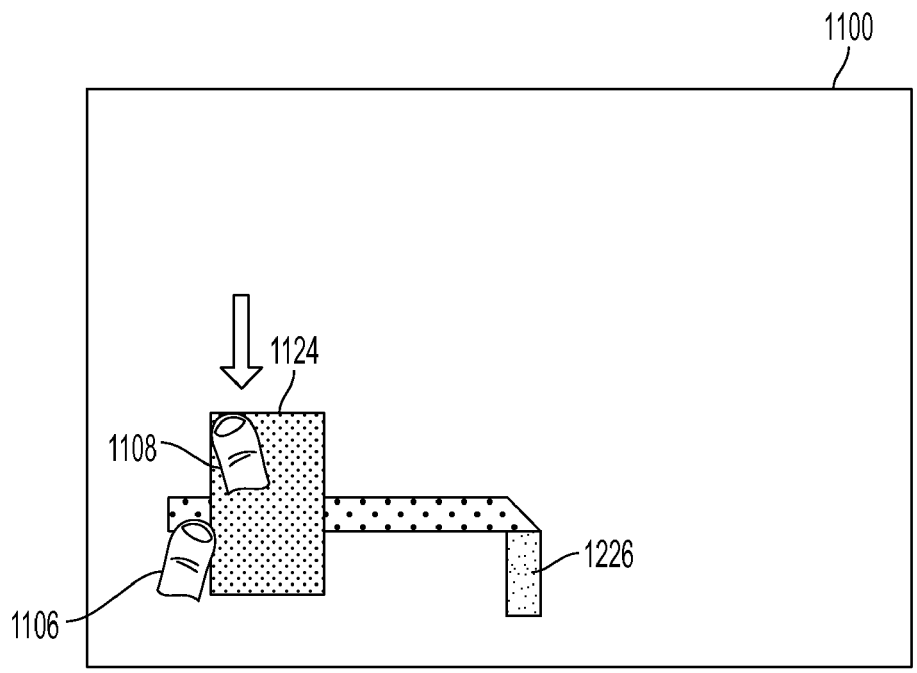
Figure 11E:
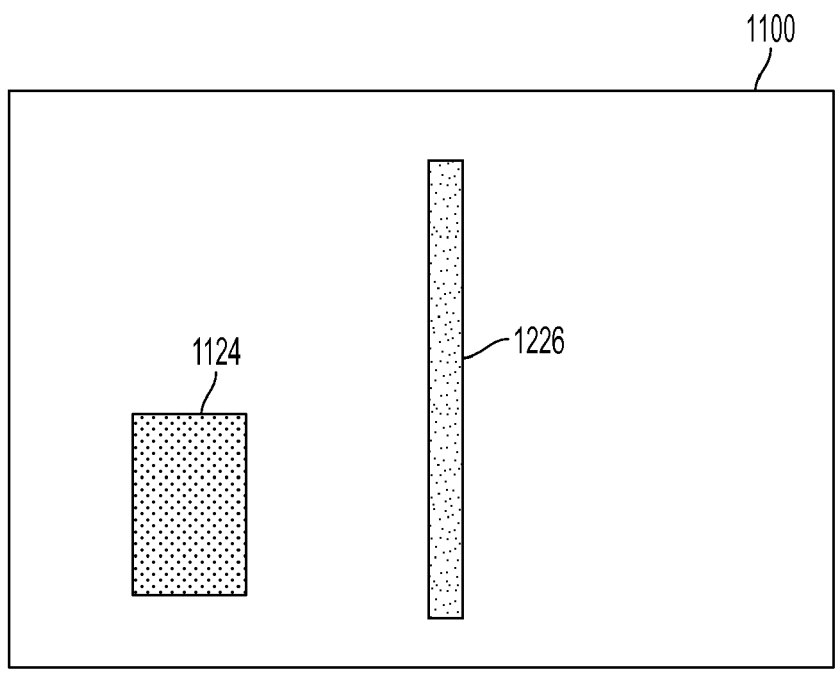

Referring now to FIG. 11E, multi-touch display device 1100 is displaying objects 1124 and 1126 such that initially there is no under/overlapping relationship between displayed objects 1124 and 1126. In response to activation of the object folding/peeling control by finger 1106, the multi-touch display device 1100 folds/peels back the top of displayed object 1126. While the top of displayed object 1126 remains folded/peeled back and in response to user control of object 1124 by finger 1108, the multi-touch display device 1100 also translates displayed object 1124 in a downward direction such that the lower edge of displayed object 1124 intersects with the folded portion of displayed object 1126.

In response to detecting the potential new intersection 1128 between displayed objects 1124 and 1126 and because no previous under/overlap relationship existed between displayed objects 1124 and 1126, the multi-touch display device 1100 compares the relative depths of displayed objects 1124 and 1126 at their intersection 1128 to determine how to layer displayed objects 1124 and 1126. Based on the pressure being applied to displayed object 1124 by finger 1108, the multi-touch display device 1100 determines that the depth of displayed object 1124 is higher than the depth of displayed object 1126 at their intersection 1128. Therefore, the multi-touch display device 1100 defines displayed object 1124 as the overlapping object and displayed object 1126 as the underlapping object.

Thus, as the multi-touch display device 1100 continues to translate displayed object 1124 downward under control of finger 1108, the multi-touch display device 1100 displays objects 1124 and 1126 such that displayed object 1124 overlaps displayed object 1126. Thereafter, when finger 1106 relinquishes control of displayed object 1126, and the multi-touch display device 1100 unfurls the top of displayed object 1126 in response, the multi-touch display device 1100 unfurls the top of displayed object 1126 such that there no longer is any under/overlapping relationship between displayed objects 1124 and 1126.

The described systems, methods, and techniques may be implemented in digital electronic circuitry, computer hardware, firmware, software, or in combinations of these elements. Apparatuses embodying these techniques may include appropriate input and output devices, a computer processor, and a tangible computer-readable storage medium on which a computer program or other computer-readable instructions are stored for execution by one or more processing devices (e.g., a programmable processor).

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

Pressure-sensitive multi-point display devices encompass a wide variety of display devices and associated systems and components. Some pressure-sensitive multi-point display devices require physical contact with a surface of the multi-point display device in order to receive input. For example, such a pressure-sensitive multi-point display device may receive input by detecting contact with a surface of the multi-point display device by a finger, a stylus, some other mechanical, electro-mechanical, or magnetic input mechanism and/or any combination of multiple such input mechanisms at the same time. Furthermore, some such pressure-sensitive multi-point display devices may be configured such that the surface that receives input may appear to be the same surface on which the pressure-sensitive multi-point display device displays objects (whether or not the surface that receives input actually is the same surface as the surface on which the pressure-sensitive multi-point display device displays objects). Alternatively, other such pressure-sensitive multi-point display devices may receive input on a surface that clearly is remote and distinct from the surface on which the pressure-sensitive multi-point display device displays objects. One example of such a pressure-sensitive multi-point display system is a pressure-sensitive multi-point input capable standalone tablet that provides input to a remote and distinct display.

Other pressure-sensitive multi-point display devices do not require physical contact with the surface of the pressure-sensitive multi-point display device in order to receive input. For example, such pressure-sensitive multi-point display devices may receive input by detecting the presence of a finger, a stylus, some other mechanical, electro-mechanical, or magnetic input mechanism and/or any combination of multiple such input mechanisms in the vicinity of the surface of the pressure-sensitive multi-point display device even when such input mechanisms are not actually in physical contact with the surface of the pressure-sensitive multi-point display device. Such pressure-sensitive multi-point display devices may map the distance of the input mechanism from the surface of the pressure-sensitive multi-point display device to the pressure being applied by the input mechanism to the pressure-sensitive multi-point display device. The various different operations and transformations disclosed herein may be implemented by any such pressure-sensitive multi-point devices.

Furthermore, the various different operations and transformations disclosed herein may he implemented by any other type of pressure-sensitive multi-point computing system configured to receive multiple inputs at the same time, including, for example, systems configured to receive concurrent input from multiple pointing devices (e.g., multiple computer mice) and/or concurrent input from one or more pointing devices and another input device (e.g., a keyboard). Moreover, some of the various different operations and transformations disclosed herein are not limited to implementation on a pressure-sensitive multi-point device and thus may be implemented on a pressure-sensitive single-point device.

Various modifications may be made. For example, useful results still may he achieved if steps of the disclosed techniques are performed in a different order. Similarly, useful results also may be achieved by combining various operations of the various disclosed techniques in a different manner and/or if components of the disclosed systems are combined in a different manner and/or replaced or supplemented by other components.

The systems and techniques for implementing a pressure-sensitive tilt control, a pressure-sensitive layering control, and a pressure-sensitive folding/peeling control are described above generally in the context of a system that senses pressure applied to a contact surface. Nevertheless, the pressure-sensitive tilt control, the pressure-sensitive layering control, and the pressure-sensitive folding/peeling control can be implemented on devices that sense proxies for pressure rather than the actual pressure applied to the contact surface. For example, in some implementations, the duration of time during which contact is made with an object on a touch-screen display device may be used as a proxy for applied pressure. In such implementations, the touch-screen display device may equate a relatively long duration of contact made with a displayed object with a relatively high amount of applied pressure and a relatively short duration of contact with a relative low amount of applied pressure.

Furthermore, the pressure-sensitive tilt control, the pressure-sensitive layering control, and the pressure-sensitive folding/peeling control can be implemented on devices that consider the size of a contact point to be a proxy for pressure applied to the contact surface. In such implementations, the device may equate relatively large contact points with relatively high amounts of applied pressure while equating relatively small contacts points with relatively low amounts of applied pressure.

Additionally or alternatively, the pressure-sensitive tilt control, the pressure-sensitive layering control, and the pressure-sensitive folding/peeling control can be implemented using input from such input mechanisms as computer keyboards and/or computer mice. For instance, the pressure-sensitive layering control, and the pressure-sensitive folding/peeling control can be implemented using input from a computer keyboard by defining different keystrokes and/or different durations of holding down a key as corresponding to varying amounts of pressure. In such implementations, a device may detect the amount of pressure being applied to a displayed object based on received keystrokes. Similarly, the pressure-sensitive layering control, and the pressure-sensitive folding/peeling control can be implemented using input from one or more computer mice by defining different mouse buttons (or sequences of mouse clicks) and/or different durations of holding down a mouse button as corresponding to varying amounts of pressure. In such implementations, a device may detect the amount of pressure being applied to a displayed object based on receive button clicks.

Moreover, in some implementations, a device may determine the amount of pressure applied to a displayed object based on the strength of a received input signal. In such implementations, the device may interpret relatively strong input signals as corresponding to relatively high pressure while interpreting relatively weak input signals as corresponding to relatively low pressure.

The systems and techniques for implementing a pressure-sensitive layering control described above generally were described in combination with a pressure-sensitive tilt control. Nevertheless, a pressure-sensitive layering control just as easily can be combined with a pressure-sensitive planar depth control. In such implementations, instead of tilting a displayed object relative to the display plane as a function of the pressure applied to the displayed object by one or more fingers or other input mechanisms, a multi-point display device may average the pressure applied by fingers or other input mechanisms over the entire displayed object to determine a singular planar depth value for the displayed object.

Furthermore, although the pressure-sensitive tilt and layering controls have been described chiefly in the context of two-dimensional objects and the layering of two-dimensional objects, both the pressure-sensitive tilt control and the pressure-sensitive layering controls also can be used to control three-dimensional displayed objects and to manipulate the relative depths of three-dimensional displayed objects.

Moreover, in some implementations, multi-point display devices may apply other deformation methods in addition to or as an alternative to the tilt deformation methods described above. For example, multi-point display devices may apply non-linear bending methods to displayed objects and/or multi-touch display devices may provide for sub-regions of an object to be tilted or lifted differently than other sub-regions. Additionally or alternatively, multi-point display devices may provide for permanently and/or semi-permanently curled or folded boundaries instead of requiring user control to maintain a curled or folded boundary. For example, after a user has activated a pressure-sensitive object folding/peeling control provided by a multi-point display device to fold/peel back a portion of a displayed object, the multi-point display device may maintain the fold in the displayed object even after the user relinquishes control of the displayed object. Thereafter, the user may cause the multi-point display device to unfurl the folded/peeled back portion of the displayed object by again taking control of the displayed object. For instance, the pressure-sensitive object folding/peeling control may enable the user to unfurl the folded/peeled hack portion of the displayed object by first applying a sufficient amount of pressure (e.g., at least a defined threshold amount of pressure) with a finger (or other input mechanism) to depress beneath the folded/peeled back portion of the displayed object and then dragging his/her finger (or other input mechanism) across the folded/peeled back portion of the displayed object in a motion that is substantially opposite from the motion used to inspire the fold in the displayed object in the first place.

The pressure-sensitive layering control may make layering decisions between two displayed objects based on the relative depths of the intersecting edges/boundaries of the two displayed objects. Additionally or alternatively, layering decisions may be made based on the relative depths of other portions of the displayed objects that are in the vicinity of the region of the intersection between the two displayed objects but that are not necessarily on the edges/boundaries of the displayed objects.

It should also be noted that, in some implementations, the object folding/peeling control may be operable without requiring the user to apply more than a threshold amount of pressure in order to fold/peel back a boundary of a displayed object. In such implementations, the object folding/peeling control still may be coupled with the pressure-sensitive layering control to perform layering operations as described above.

In some implementations, the layering models described above may be extended to two and one-half dimensional representations such as planar maps to allow for complex overlap effects such as, for example, self-overlap, or circular overlap patterns. Similarly, the layering models described above also may be extend by inserting prior overlap relationships as lower priority constraints on layering operations or by allowing users to "freeze" layering relationships for groups of displayed objects regardless of overlap state.

Additionally or alternatively, in some implementations, visual clues rendered to facilitate pressure-sensitive tilt and/or layering operations may be augmented (or replaced) with audio cues. For example, when under/overlap relationships begin and end, a multi-point display device may generate "push" and/or "slip" audio cues.

Finally, the techniques and systems described above for implementing a pressure-sensitive layering control may be applied to perform layering operations on any type of displayed object including, for example, generic polygons, free-form shapes, photographs or other image files, videos, documents, and/or active application windows.

What is claimed is:

1. A method for revealing an object displayed on a pressure-sensitive touch-screen display device that is occluded by one or more other objects displayed on the pressure-sensitive touch-screen display device, the method being implemented using a computing system and comprising:

causing a scene to be displayed on a pressure-sensitive touch-screen display device, the scene including empty space and first and second displayed objects, the second displayed object being layered above the first displayed object and occluding at least a part of the first displayed object;

detecting contact with the pressure-sensitive touch-screen display device by an input mechanism in a region of the pressure-sensitive touch-screen display device that corresponds to empty space;

tracking movement of the input mechanism while the input mechanism remains in contact with the pressure-sensitive touch-screen display device;

based on tracking movement of the input mechanism while the input mechanism remains in contact with the pressure-sensitive touch-screen display device, detecting that the input mechanism has moved from contacting the pressure-sensitive touch-screen display device in the region that corresponds to empty space to contacting the pressure-sensitive touch-screen display device at a position that corresponds to a point along the boundary of the second displayed object;

in response to detecting that the input mechanism has moved from contacting the pressure-sensitive touch-screen display device in the region that corresponds to empty space to contacting the pressure-sensitive touch-screen display device at the position that corresponds to the point along the boundary of the second displayed object; sensing pressure applied to the pressure-sensitive touch-screen display device by the input mechanism;

comparing the sensed pressure applied to the pressure-sensitive display device by the input mechanism to a threshold pressure value;

based on a result of comparing the sensed pressure applied to the pressure-sensitive display device by the input mechanism to the threshold pressure value, determining that the sensed pressure applied to the pressure-sensitive display device by the input mechanism exceeds the threshold pressure value;

based on tracking movement of the input mechanism while the input mechanism remains in contact with the pressure-sensitive touch-screen display device, detecting that the input mechanism has moved to a new position on the pressure-sensitive touch-screen display device;

as a consequence of detecting that the input mechanism has moved to the new position on the pressure-sensitive touch-screen display device and determining that the sensed pressure applied to the pressure-sensitive display device by the input mechanism exceeds the threshold pressure value:

calculating, as a function of the movement of the input mechanism to the new position, a fold operation to perform on the second displayed object to fold a part of the second displayed object including the point along the boundary of the second displayed object back on top of itself such that the point along the boundary of the second displayed object is moved to a position substantially at the new location of the input mechanism, applying the calculated fold operation to the second displayed object, determining that when the fold operation is applied to the second displayed object a portion of the folded part of the second displayed object that previously occluded a portion of the occluded part of the first displayed object does not occlude the portion of the occluded part of the first displayed object, and causing the display of the scene to be updated to reflect the folding operation applied to the second displayed object, including causing the second displayed object to be displayed in accordance with the applied fold operation such that the point along the boundary of the second displayed object is located substantially at the new location of the input mechanism and the previously occluded portion of the occluded part of the first displayed object is revealed.

2. The computer-implemented method of claim 1 further comprising:

detecting that the input mechanism no longer is contacting the pressure-sensitive display device; and in response to detecting that the input mechanism no longer is contacting the pressure-sensitive display device:

undoing the fold operation applied to the second displayed object, and causing the display of the scene to be updated to reflect that the fold operation applied to the second displayed object has been undone.

3. The computer-implemented method of claim 1 further comprising:

detecting that the input mechanism no longer is contacting the pressure-sensitive display device; and preserving the fold operation applied to the second displayed object after detecting that the input mechanism no longer is contacting the pressure-sensitive display device.

4. The computer-implemented method of claim 3 further comprising:

after detecting that the input mechanism no longer is contacting the pressure-sensitive display device and preserving the fold operation applied to the second displayed object, detecting that the input mechanism is contacting the pressure-sensitive display device in a region of the pressure-sensitive touch-screen display device that corresponds to the folded part of the second displayed object;

tracking movement of the input mechanism while the input mechanism remains in contact with the pressure-sensitive touch-screen display device;

based on tracking movement of the input mechanism while the input mechanism remains in contact with the pressure-sensitive touch-screen display device, detecting that the input mechanism has moved from contacting the pressure-sensitive touch-screen display device in the region that corresponds to the folded part of the second displayed object to contacting the pressure-sensitive touch-screen display device in a region that corresponds to empty space; and in response to detecting that the input mechanism has moved from contacting the pressure-sensitive touch-screen display device in the region that corresponds to the folded part of the second displayed object to contacting the pressure-sensitive touch-screen display device in the region that corresponds to empty space:

undoing the fold operation applied to the second displayed object, and causing the display of the scene to be updated to reflect that the fold operation applied to the second displayed object has been undone.

5. The computer-implemented method of claim 1 further comprising:

after applying the calculated fold operation to the second displayed object and causing the display of the scene to be updated to reflect the folding operation applied to the second displayed object:

detecting contact with the pressure-sensitive touch-screen display device by another input mechanism in a region of the pressure-sensitive touch-screen display device that corresponds to empty space;

tracking movement of the other input mechanism while the other input mechanism remains in contact with the pressure-sensitive touch-screen display device;

based on tracking movement of the other input mechanism while the other input mechanism remains in contact with the pressure-sensitive touch-screen display device, detecting that the other input mechanism has moved from contacting the pressure-sensitive touch-screen display device in the region that corresponds to empty space to contacting the pressure-sensitive touch-screen display device at a position that corresponds to a point along the boundary of the first displayed object;

in response to detecting that the other input mechanism has moved from contacting the pressure-sensitive touch-screen display device in the region that corresponds to empty space to contacting the pressure-sensitive touch-screen display device at the position that corresponds to the point along the boundary of the first displayed object, sensing pressure applied to the pressure-sensitive touch-screen display device by the other input mechanism;

comparing the sensed pressure applied to the pressure-sensitive display device by the other input mechanism to another threshold pressure value, the other threshold pressure value being greater than the threshold pressure value;

based on a result of comparing the sensed pressure applied to the pressure-sensitive display device by the other input mechanism to the other threshold pressure value, determining that the sensed pressure applied to the pressure-sensitive display device by the other input mechanism exceeds the other threshold pressure value;

based on tracking movement of the other input mechanism while the other input mechanism remains in contact with the pressure-sensitive touch-screen display device, detecting that the other input mechanism has moved to a new position on the pressure-sensitive touch-screen display device;

as a consequence of detecting that the other input mechanism has moved to the new position on the pressure-sensitive touch-screen display device and determining that the sensed pressure applied to the pressure-sensitive display device by the other input mechanism exceeds the other threshold pressure value:

calculating, as a function of the movement of the other input to mechanism to the new position, a fold operation to perform on the first displayed object to fold a part of the first displayed object including the point along the boundary of the first displayed object back on top of itself such that the point along the boundary of the first displayed object is moved to a position substantially at the new location of the other input mechanism, and causing the display of the scene to be updated to reflect the folding operation applied to the first displayed object, including causing the first displayed object to be displayed in accordance with the applied fold operation such that the point along the boundary of the first displayed object is located substantially at the new location of the other input mechanism.

6. The computer-implemented method of claim 1 wherein:
causing the scene to be displayed on the pressure-sensitive touch-screen display device further includes causing a third object to be displayed on the pressure-sensitive touch-screen display device; and the method further comprises:
after applying the calculated fold operation to the second displayed object and causing the display of the scene to be updated to reflect the folding operation applied to the second displayed object, detecting contact with the pressure-sensitive touch-screen display device by another input mechanism in a region of the pressure-sensitive touch-screen display device that corresponds to the third displayed object;

tracking movement of the other input mechanism while the input mechanism remains in contact with the pressure-sensitive touch-screen display device;

based on tracking movement of the other input mechanism while the other input mechanism remains in contact with the pressure-sensitive touch-screen display device, detecting that the other input mechanism has moved from contacting the pressure-sensitive touch-screen display device in the region that corresponds to third displayed object to contacting the pressure-sensitive touch-screen display device at a different position;

in response to detecting that the other input mechanism has moved from contacting the pressure-sensitive touch-screen display device in the region that corresponds to the third displayed object to contacting the pressure-sensitive touch-screen display device at the different position, translating the third displayed object such that a portion of the third displayed object occupies the region that previously was occupied by the folded part of the second displayed object;

undoing the fold operation applied to the second displayed object;

detecting that the portion of the third displayed object occupies the region that previously was occupied by the folded part of the second displayed object;

as a consequence of detecting that the portion of the third displayed object occupies the region that previously was occupied by the folded part of the second displayed object and translating the third displayed object such that a portion of the third displayed object occupies the region that previously was occupied by the folded part of the second displayed object after applying the calculated fold operation to the second displayed object, storing data indicating that the second displayed object overlaps the third displayed object; and causing the display of the scene to be updated to reflect that the folding operation applied to the second displayed object has been undone, including causing the second and third objects to be displayed such that the second displayed object is overlapping the third displayed object.

7. The computer-implemented method of claim 1 wherein:
causing the scene to be displayed on the pressure-sensitive touch-screen display device further includes causing a third object to be displayed on the pressure-sensitive touch-screen display device; and the method further comprises:
after applying the calculated fold operation to the second displayed object and causing the display of the scene to be updated to reflect the folding operation applied to the second displayed object, detecting contact with the pressure-sensitive touch-screen display device by another input mechanism in a region of the pressure-sensitive touch-screen display device that corresponds to the third displayed object;

tracking movement of the other input mechanism while the input mechanism remains in contact with the pressure-sensitive touch-screen display device;

based on tracking movement of the other input mechanism while the other input mechanism remains in contact with the pressure-sensitive touch-screen display device, detecting that the other input mechanism has moved from contacting the pressure-sensitive touch-screen display device in the region that corresponds to the third displayed object to contacting the pressure-sensitive touch-screen display device at a different position;

in response to detecting that the other input mechanism has moved from contacting the pressure-sensitive touch-screen display device in the region that corresponds to the third displayed object to contacting the pressure-sensitive touch-screen display device at the different position, translating the third displayed object;

detecting an intersection between the first displayed object and the third displayed object as a consequence of translating the third displayed object;

in response to detecting the intersection between the first displayed object and the third displayed object, storing data indicating that the third displayed object overlaps the first displayed object; and causing the display of the scene to be updated to reflect that the third displayed object is overlapping the first displayed object.

8. The computer-implemented method of claim 1 wherein:
causing the scene to be displayed on the pressure-sensitive touch-screen display device further includes causing a third object to be displayed on the pressure-sensitive touch-screen display device; and
the method further comprises:
maintaining an overlap list that is associated with the third displayed object for recording other displayed objects that are overlapped by the third displayed object;
after applying the calculated fold operation to the second displayed object and causing the display of the scene to be updated to reflect the folding operation applied to the second displayed object, detecting contact with the pressure-sensitive touch-screen display device by another input mechanism in a region of the pressure-sensitive touch-screen display device that corresponds to the third displayed object;
tracking movement of the other input mechanism while the input mechanism remains in contact with the pressure-sensitive touch-screen display device;
based on tracking movement of the other input mechanism while the other input mechanism remains in contact with the pressure-sensitive touch-screen display device, detecting that the other input mechanism has moved from contacting the pressure-sensitive touch-screen display device in the region that corresponds to the third displayed object to contacting the pressure-sensitive touch-screen display device at a different position;
in response to detecting that the other input mechanism has moved from contacting the pressure-sensitive touch-screen display device in the region that corresponds to the third displayed object to contacting the pressure-sensitive touch-screen display device at the different position, transforming the third displayed object such that a portion of the third displayed object occupies a region that previously was occupied by the folded part of the second displayed object;
undoing the fold operation applied to the second displayed object;
as a consequence of undoing the fold operation applied to the second displayed object, detecting an intersection between the folded part of the second displayed object and the third displayed object;
in response to detecting the intersection between the folded part of the second displayed object and the third displayed object:
accessing the overlap list that is associated with the third displayed object,
determining, based on the overlap list that is associated with the third displayed object, that the third displayed object overlaps the second displayed object, and
storing data indicating that the third displayed object overlaps the second displayed object; and
causing the display of the scene to be updated to reflect that the fold operation applied to the second displayed object has been undone and the third displayed object overlaps the second displayed object.

9. The computer-implemented method of claim 1 wherein detecting that the input mechanism has moved to a new position on the pressure-sensitive touch-screen display device includes detecting that the input mechanism has moved to a new position on the pressure-sensitive touch-screen display device that is across the original boundary of the second displayed object.

10. A non-transitory computer-readable storage medium having stored thereon instructions that, when executed, cause a computer to:
cause a scene to be displayed on a pressure-sensitive touch-screen display device, the scene including empty space and first and second displayed objects, the second displayed object being layered above the first displayed object and occluding at least a part of the first displayed object;
detect contact with the pressure-sensitive touch-screen display device by an input mechanism in a region of the pressure-sensitive touch-screen display device that corresponds to empty space;
track movement of the input mechanism while the input mechanism remains in contact with the pressure-sensitive touch-screen display device;
based on tracking movement of the input mechanism while the input mechanism remains in contact with the pressure-sensitive touch-screen display device, detect that the input mechanism has moved from contacting the pressure-sensitive touch-screen display device in the region that corresponds to empty space to contacting the pressure-sensitive touch-screen display device at a position that corresponds to a point along the boundary of the second displayed object;
in response to detecting that the input mechanism has moved from contacting the pressure-sensitive touch-screen display device in the region that corresponds to empty space to contacting the pressure-sensitive touch-screen display device at the position that corresponds to the point along the boundary of the second displayed object, sense pressure applied to the pressure-sensitive touch-screen display device by the input mechanism;
compare the sensed pressure applied to the pressure-sensitive display device by the input mechanism to a threshold pressure value;
based on a result of comparing the sensed pressure applied to the pressure-sensitive display device by the input mechanism to the threshold pressure value, determine that the sensed pressure applied to the pressure-sensitive display device by the input mechanism exceeds the threshold pressure value;
based on tracking movement of the input mechanism while the input mechanism remains in contact with the pressure-sensitive touch-screen display device, detecting that the input mechanism has moved to a new position on the pressure-sensitive touch-screen display device; and
as a consequence of detecting that the input mechanism has moved to the new position on the pressure-sensitive touch-screen display device and determining that the sensed pressure applied to the pressure-sensitive display device by the input mechanism exceeds the threshold-pressure value:
calculate, as a function of the movement of the input mechanism to the new position, a fold operation to perform on the second displayed object to fold a part of the second displayed object including the point along the boundary of the displayed object back on top of itself such that the point along the boundary of the displayed object is moved to a position substantially at the new location of the input mechanism,
apply the calculated fold operation to the second displayed object,
determine that when the fold operation is applied to the second displayed object a portion of the folded part of the second displayed object that previously occluded a portion of the occluded part of the first displayed object does not occlude the portion of the occluded part of the first displayed object, and cause the display of the scene to be updated to reflect the folding operation applied to the second displayed object, including causing the second displayed object to be displayed in accordance with the applied fold operation such that the point along the boundary of the displayed object is located substantially at the new location of the input mechanism and the previously occluded portion of the occluded part of the first displayed object is revealed.

11. The non-transitory computer-readable storage medium of claim 10, wherein the instructions further include instructions that, when executed, cause a computer to:

detect that the input mechanism no longer is contacting the pressure-sensitive display device; and in response to detecting that the input mechanism no longer is contacting the pressure-sensitive display device:

undo the fold operation applied to the second displayed object, and cause the display of the scene to be updated to reflect that the fold operation applied to the second displayed object has been undone.

12. The non-transitory computer-readable storage medium claim 10, wherein:

the instructions further include instructions that, when executed, cause a computer to:

after applying the calculated fold operation to the second displayed object and causing the display of the scene to be updated to reflect the folding operation applied to the second displayed object:

detect contact with the pressure-sensitive touch-screen display device by another input mechanism in a region of the pressure-sensitive touch-screen display device that corresponds to empty space;

track movement of the other input mechanism while the other input mechanism remains in contact with the pressure-sensitive touch-screen display device;

based on tracking movement of the other input mechanism while the other input mechanism remains in contact with the pressure-sensitive touch-screen display device, detect that the other input mechanism has moved from contacting the pressure-sensitive touch-screen display device in the region that corresponds to empty space to contacting the pressure-sensitive touch-screen display device at a position that corresponds to a point along the boundary of the first displayed object;

in response to detecting that the other input mechanism has moved from contacting the pressure-sensitive touch-screen display device in the region that corresponds to empty space to contacting the pressure-sensitive touch-screen display device at the position that corresponds to the point along the boundary of the first displayed object, sense pressure applied to the pressure-sensitive touch-screen display device by the other input mechanism;

compare the sensed pressure applied to the pressure-sensitive display device by the input mechanism to another threshold pressure value, the other threshold pressure value being greater than the threshold pressure value;

based on a result of comparing the sensed pressure applied to the pressure-sensitive display device by the other input mechanism to the other threshold pressure value, determine that the sensed pressure applied to the pressure-sensitive display device by the other input mechanism exceeds the other threshold pressure value;

based on tracking movement of the other input mechanism while the other input mechanism remains in contact with the pressure-sensitive touch-screen display device, detect that the other input mechanism has moved to a new position on the pressure-sensitive touch-screen display device;

as a consequence of detecting that the other input mechanism has moved to the new position on the pressure-sensitive touch-screen display device and determining that the sensed pressure applied to the pressure-sensitive display device by the other input mechanism exceeds the other threshold pressure value;

calculate, as a function of the movement of the other input mechanism to the new position, a fold operation to perform on the first displayed object to fold a part of the first displayed object including the point along the boundary of the first displayed object back on top of itself such that the point along the boundary of the first displayed object is moved to a position substantially at the new location of the other input mechanism, and cause the display of the scene to be updated to reflect the folding operation applied to the first displayed object, including causing the first displayed object to be displayed in accordance with the applied fold operation such that the point along the boundary of the first displayed object is located substantially at the new location of the other input mechanism.

13. The non-transitory computer-readable storage medium of claim 10 wherein:

the instructions that, when executed, cause a computer to cause the scene to be displayed on the pressure-sensitive touch-screen display device further include instructions that, when executed, cause a computer to cause a third object to be displayed on the pressure-sensitive touch-screen display device; and the instructions further include instructions that, when executed, cause a computer to:

after applying the calculated fold operation to the second displayed object and causing the display of the scene to be updated to reflect the folding operation applied to the second displayed object, detect contact with the pressure-sensitive touch-screen display device by another input mechanism in a region of the pressure-sensitive touch-screen display device that corresponds to the third displayed object;

track movement of the other input mechanism while the input mechanism remains in contact with the pressure-sensitive touch-screen display device;

based on tracking movement of the other input mechanism while the other input mechanism remains in contact with the pressure-sensitive touch-screen display device, detect that the other input mechanism has moved from contacting the pressure-sensitive touch-screen display device in the region that corresponds to third displayed object to contacting the pressure-sensitive touch-screen display device at a different position;

in response to detecting that the other input mechanism has moved from contacting the pressure-sensitive touch-screen display device in the region that corresponds to the third displayed object to contacting the pressure-sensitive touch-screen display device at the different position, translate the third displayed object such that a portion of the third displayed object occupies the region that previously was occupied by the folded part of the second displayed object;

undo the fold operation applied to the second displayed object;

detect that the portion of the third displayed object occupies the region that previously was occupied by the folded part of the second displayed object;

as a consequence of detecting that the portion of the third displayed object occupies the region that previously was occupied by the folded part of the second displayed object and translating the third displayed object such that a portion of the third displayed object occupies the region that previously was occupied by the folded part of the second displayed object after applying the calculated fold operation to the second displayed object, store data indicating that the second displayed object overlaps the third displayed object; and cause the display of the scene to be updated to reflect that the folding operation applied to the second displayed object has been undone, including causing the second and third objects to be displayed such that the second displayed object is overlapping the third displayed object.

14. The non-transitory computer-readable storage medium of claim 10 wherein:

the instructions that, when executed, cause the scene to be displayed on the pressure-sensitive touch-screen display device further include instructions that, when executed, cause a third object to be displayed on the pressure-sensitive touch-screen display device; and the instructions further include instructions that, when executed, cause a computer to:

after applying the calculated fold operation to the second displayed object and causing the display of the scene to be updated to reflect the folding operation applied to the second displayed object, detect contact with the pressure-sensitive touch-screen display device by another input mechanism in a region of the pressure-sensitive touch-screen display device that corresponds to the third displayed object;

track movement of the other input mechanism while the input mechanism remains in contact with the pressure-sensitive touch-screen display device;

based on tracking movement of the other input mechanism while the other input mechanism remains in contact with the pressure-sensitive touch-screen display device, detect that the other input mechanism has moved from contacting the pressure-sensitive touch-screen display device in the region that corresponds to the third displayed object to contacting the pressure-sensitive touch-screen display device at a different position;

in response to detecting that the other input mechanism has moved from to contacting the pressure-sensitive touch-screen display device in the region that corresponds to the third displayed object to contacting the pressure-sensitive touch-screen display device at the different position, translate the third displayed object;

detect an intersection between the first displayed object and the third displayed object as a consequence of translating the third displayed object;

in response to detecting the intersection between the first displayed object and the third displayed object, store data indicating that the third displayed object overlaps the first displayed object; and cause the display of the scene to be updated to reflect that the third displayed object is overlapping the first displayed object.

15. The non-transitory computer-readable storage medium of claim 10 wherein the instructions that, when executed, cause a computer to detect that the input mechanism has moved to a new position on the pressure-sensitive touch-screen display device include instructions that, when executed, cause a computer to detect that the input mechanism moved to a new position on the pressure-sensitive touch-screen display device that is across the original boundary of the second displayed object.

16. A pressure-sensitive touch-screen display device comprising:

a display for displaying output images;

an input surface for receiving user interaction with the pressure-sensitive touch-screen display device;

a processor; and a memory storage device storing instructions that, when executed by the processor, cause the processor to:

cause a scene to be displayed on a pressure-sensitive touch-screen display device, the scene including empty space and first and second displayed objects, the second displayed object being layered above the first displayed object and occluding at least a part of the first displayed object;

detect contact with the pressure-sensitive touch-screen display device by an input mechanism in a region of the pressure-sensitive touch-screen display device that corresponds to empty space;

track movement of the input mechanism while the input mechanism remains in contact with the pressure-sensitive touch-screen display device;

based on tracking movement of the input mechanism while the input mechanism remains in contact with the pressure-sensitive touch-screen display device, detect that the input mechanism has moved from contacting the pressure-sensitive touch-screen display device in the region that corresponds to empty space to contacting the pressure-sensitive touch-screen display device at a position that corresponds to a point along the boundary of the second displayed object;

in response to detecting that the input mechanism has moved from contacting the pressure-sensitive touch-screen display device in the region that corresponds to empty space to contacting the pressure-sensitive touch-screen display device at the position that corresponds to the point along the boundary of the second displayed object, sense pressure applied to the pressure-sensitive touch-screen display device by the input mechanism;

compare the sensed pressure applied to the pressure-sensitive display device by the input mechanism to a threshold pressure value;

based on a result of comparing the sensed pressure applied to the pressure-sensitive display device by the input mechanism to the threshold pressure value, determine that the sensed pressure applied to the pressure-sensitive display device by the input mechanism exceeds the threshold pressure value;

based on tracking movement of the input mechanism while the input mechanism remains in contact with the pressure-sensitive touch-screen display device, detecting that the input mechanism has moved to a new position on the pressure-sensitive touch-screen display device; and as a consequence of detecting that the input mechanism has moved to the new position on the pressure-sensitive touch-screen display device and determining that the sensed pressure applied to the pressure-sensitive display device by the input mechanism exceeds the threshold pressure value:

calculate, as a function of the movement of the input mechanism to the new position, a fold operation to perform on the second displayed object to fold a part of the second displayed object including the point along the boundary of the displayed object back on top of itself such that the point along the boundary of the displayed object is moved to a position substantially at the new location of the input mechanism, apply the calculated fold operation to the second displayed object, determine that when the fold operation is applied to the second displayed object a portion of the folded part of the second displayed object that previously occluded a portion of the occluded part of the first displayed object does not occlude the portion of the occluded part of the first displayed object, and cause the display of the scene to be updated to reflect the folding operation applied to the second displayed object, including causing the second displayed object to be displayed in accordance with the applied fold operation such that the point along the boundary of the displayed object is located substantially at the new location of the input mechanism and the previously occluded portion of the occluded part of the first displayed object is revealed.

17. The pressure-sensitive touch-screen display device of claim 16 wherein the memory storage device further stores instructions that, when executed by the processor, cause the processor to:

detect that the input mechanism no longer is contacting the pressure-sensitive display device; and in response to detecting that the input mechanism no longer is contacting the pressure-sensitive display device:

undo the fold operation applied to the second displayed object, and cause the display of the scene to be updated to reflect that the fold operation applied to the second displayed object has been undone.

18. The pressure-sensitive touch-screen display device of claim 16 wherein the memory storage device further stores instructions that, when executed by the processor, cause the processor to:

after applying the calculated fold operation to the second displayed object and causing the display of the scene to be updated to reflect the folding operation applied to the second displayed object:

detect contact with the pressure-sensitive touch-screen display device by another input mechanism in a region of the pressure-sensitive touch-screen display device that corresponds to empty space;

track movement of the other input mechanism while the other input mechanism remains in contact with the pressure-sensitive touch-screen display device;

based on tracking movement of the other input mechanism while the other input mechanism remains in contact with the pressure-sensitive touch-screen display device, detect that the other input mechanism has moved from contacting the pressure-sensitive touch-screen display device in the region that corresponds to empty space to contacting the pressure-sensitive touch-screen display device at a position that corresponds to a point along the boundary of the first displayed object;

in response to detecting that the other input mechanism has moved from contacting the pressure-sensitive touch-screen display device in the region that corresponds to empty space to contacting the pressure-sensitive touch-screen display device at the position that corresponds to the point along the boundary of the first displayed object, sense pressure applied to the pressure-sensitive touch-screen display device by the other input mechanism;

compare the sensed pressure applied to the pressure-sensitive display device by the input mechanism to another threshold pressure value, the other threshold pressure value being greater than the threshold pressure value;

based on a result of comparing the sensed pressure applied to the pressure-sensitive display device by the other input mechanism to the other threshold pressure value, determine that the sensed pressure applied to the pressure-sensitive display device by the other input mechanism exceeds the other threshold pressure value;

based on tracking movement of the other input mechanism while the other input mechanism remains in contact with the pressure-sensitive touch-screen display device, detect that the other input mechanism has moved to a new position on the pressure-sensitive touch-screen display device;

as a consequence of detecting that the other input mechanism has moved to the new position on the pressure-sensitive touch-screen display device and determining that the sensed pressure applied to the pressure-sensitive display device by the other input mechanism exceeds the other threshold pressure value:

calculate, as a function of the movement of the other input mechanism to the new position, a fold operation to perform on the first displayed object to fold a part of the first displayed object including the point along the boundary of the first displayed object back on top of itself such that the point along the boundary of the first displayed object is moved to a position substantially at the new location of the other input mechanism, and cause the display of the scene to be updated to reflect the folding operation applied to the first displayed object, including causing the first displayed object to be displayed in accordance with the applied fold operation such that the point along the boundary of the first displayed object is located substantially at the new location of the other input mechanism.

19. The pressure-sensitive touch-screen display device of claim 16 wherein:

the instructions that, when executed by the processor, cause the processor to cause the scene to be displayed on the pressure-sensitive touch-screen display device further include instructions that, when executed by the processor, cause the processor to cause a third object to be displayed on the pressure-sensitive touch-screen display device; and the memory storage device further stores instructions that, when executed by the processor, cause the processor to:

after applying the calculated fold operation to the second displayed object and causing the display of the scene to be updated to reflect the folding operation applied to the second displayed object, detect contact with the pressure-sensitive touch-screen display device by another input mechanism in a region of the pressure-sensitive touch-screen display device that corresponds to the third displayed object;

track movement of the other input mechanism while the input mechanism remains in contact with the pressure-sensitive touch-screen display device;

based on tracking movement of the other input mechanism while the other input mechanism remains in contact with the pressure-sensitive touch-screen display device, detect that the other input mechanism has moved from contacting the pressure-sensitive touch-screen display device in the region that corresponds to third displayed object to contacting the pressure-sensitive touch-screen display device at a different position;

in response to detecting that the other input mechanism has moved from contacting the pressure-sensitive touch-screen display device in the region that corresponds to the third displayed object to contacting the pressure-sensitive touch-screen display device at the different position, translate the third displayed object such that a portion of the third displayed object occupies the region that previously was occupied by the folded part of the second displayed object;

undo the fold operation applied to the second displayed object;

detect that the portion of the third displayed object occupies the region that previously was occupied by the folded part of the second displayed object;

as a consequence of detecting that the portion of the third displayed object occupies the region that previously was occupied by the folded part of the second displayed object and translating the third displayed object such that a portion of the third displayed object occupies the region that previously was occupied by the folded part of the second displayed object after applying the calculated fold operation to the second displayed object, store data indicating that the second displayed object overlaps the third displayed object; and cause the display of the scene to be updated to reflect that the folding operation applied to the second displayed object has been undone, including causing the second and third objects to be displayed such that the second displayed object is overlapping the third displayed object.

20. The pressure-sensitive touch-screen display device of claim 16 wherein the instructions that, when executed by the processor, cause the processor to detect that the input mechanism has moved to a new position on the pressure-sensitive touch-screen display device include instructions that, when executed by the processor, cause the processor to detect that the input mechanism has moved to a new position on the pressure-sensitive touch-screen display device that is across the original boundary of the second displayed object.

* * * * *